(12) United States Patent
Mihara et al.

(10) Patent No.: US 7,002,755 B2
(45) Date of Patent: Feb. 21, 2006

(54) ZOOM LENS, AND ELECTRONIC IMAGING SYSTEM USING THE SAME

(75) Inventors: Shinichi Mihara, Tama (JP); Masahito Watanabe, Hachioji (JP); Toru Miyajima, Hachioji (JP); Yuji Miyauchi, Machida (JP)

(73) Assignee: Olympus Corporation, Tokyo (JP)

( * ) Notice: Subject to any disclaimer, the term of this patent is extended or adjusted under 35 U.S.C. 154(b) by 43 days.

(21) Appl. No.: 10/298,574

(22) Filed: Nov. 19, 2002

(65) Prior Publication Data

US 2003/0210471 A1    Nov. 13, 2003

(30) Foreign Application Priority Data

Nov. 26, 2001 (JP) .............................. 2001-358775
Jul. 17, 2002 (JP) .............................. 2002-207797

(51) Int. Cl.
G02B 15/14 (2006.01)
(52) U.S. Cl. .................... 359/680; 359/691
(58) Field of Classification Search ............... 359/680, 359/691
See application file for complete search history.

(56) References Cited

U.S. PATENT DOCUMENTS

| | | | | |
|---|---|---|---|---|
| 5,321,553 A * | 6/1994 | Ishiyama et al. | ........... | 359/684 |
| 5,329,402 A * | 7/1994 | Sato | ............................. | 359/691 |
| 5,528,428 A * | 6/1996 | Ohtake et al. | ............... | 359/684 |
| 5,539,581 A * | 7/1996 | Sato | ............................. | 359/676 |
| 5,563,739 A * | 10/1996 | Sato | ............................. | 359/691 |
| 5,604,637 A * | 2/1997 | Goosey, Jr. | .................. | 359/689 |
| 5,999,337 A * | 12/1999 | Ozaki | ........................... | 359/793 |
| 6,124,984 A | 9/2000 | Shibayama et al. | ......... | 359/689 |
| 6,169,635 B1 * | 1/2001 | Ozaki et al. | ................. | 359/691 |
| 6,185,048 B1 | 2/2001 | Ishii et al. | .................... | 359/687 |
| 6,308,011 B1 | 10/2001 | Wachi et al. | ................... | 396/72 |
| 6,331,917 B1 | 12/2001 | Ishii et al. | .................... | 359/687 |
| 6,545,819 B1 * | 4/2003 | Nanba et al. | ................ | 359/689 |
| 6,570,716 B1 * | 5/2003 | Morooka et al. | ........... | 359/692 |
| 6,804,064 B1 * | 10/2004 | Hirakawa | .................... | 359/682 |
| 2002/0057502 A1 | 5/2002 | Ishii et al. | .................... | 359/687 |
| 2003/0048543 A1 * | 3/2003 | Ohno | .......................... | 359/691 |
| 2003/0184876 A1 * | 10/2003 | Tomioka | ..................... | 359/691 |

FOREIGN PATENT DOCUMENTS

JP     2000-275520     10/2000

OTHER PUBLICATIONS

Patent Abstracts of Japan, JP-2000-267009 Sep. 29, 2000, Minolta Co Ltd.

* cited by examiner

*Primary Examiner*—Georgia Epps
*Assistant Examiner*—M. Hasan
(74) *Attorney, Agent, or Firm*—Kenyon & Kenyon

(57) ABSTRACT

The invention provides a zoom lens that comprises a reduced number of lens elements, is compact and simplified, and has high image-formation capability, thereby achieving thorough size reductions in video cameras or digital cameras, and an electronic imaging system using the same. The zoom lens comprises, in order from its object side, a lens group A (G1) having negative refracting power and a lens group B (G2) having positive refracting power. For zooming, the lens groups A and B are designed to move. The lens group B is composed of three meniscus lenses, each convex on its object side.

36 Claims, 37 Drawing Sheets

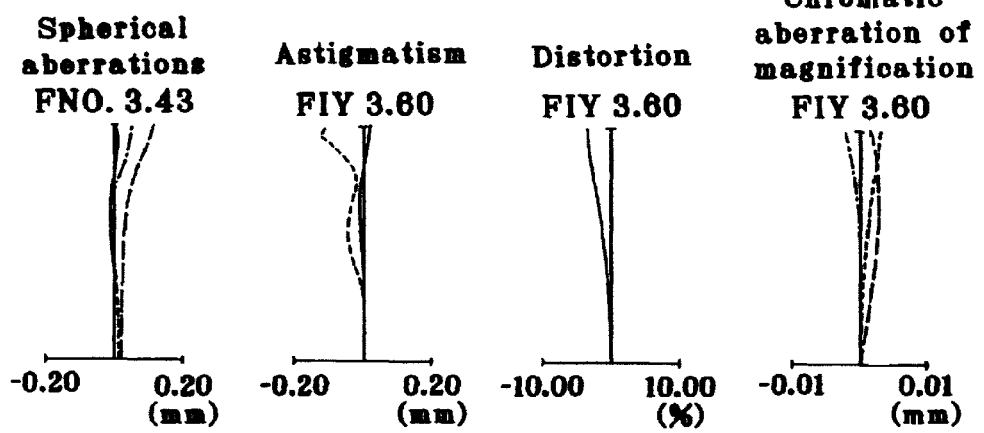
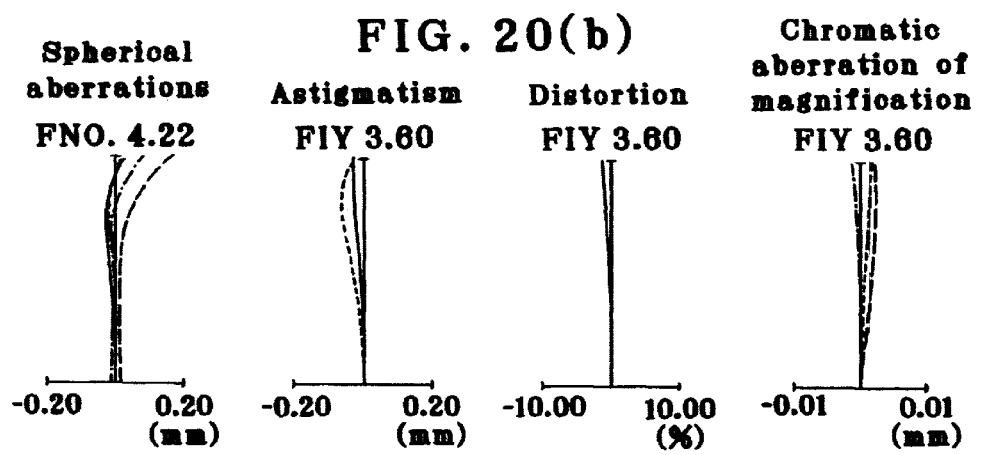
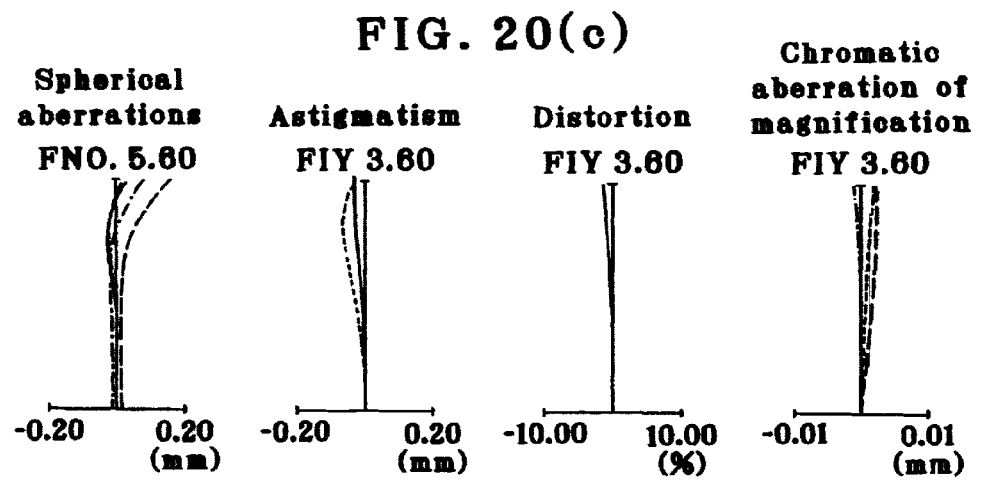

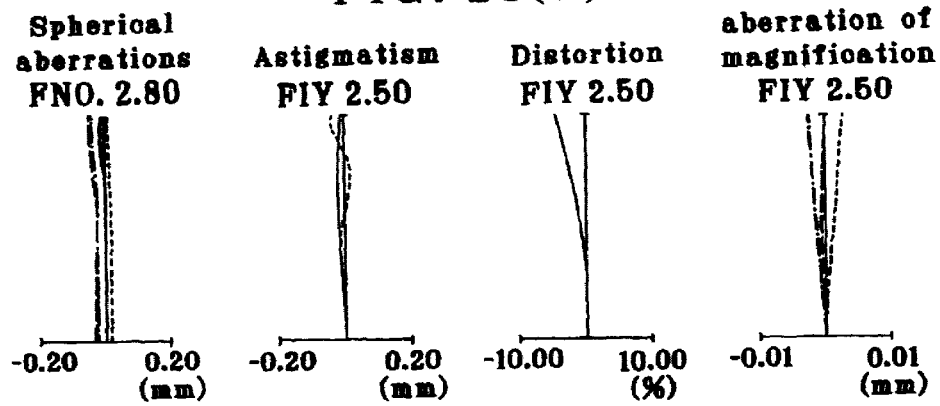
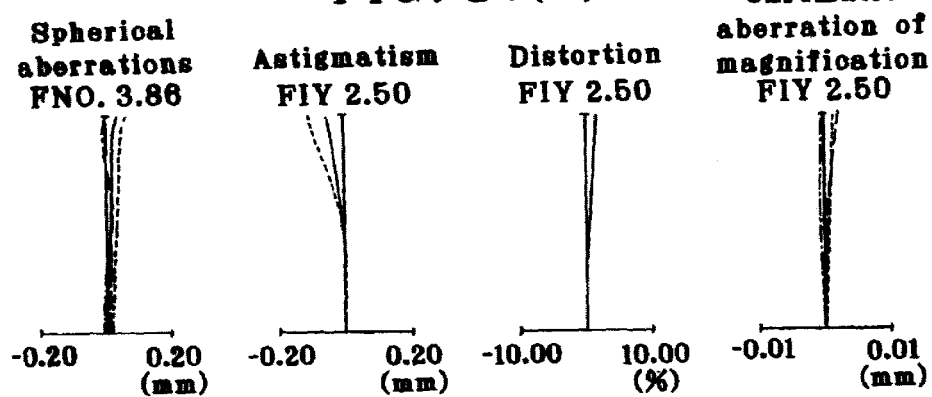
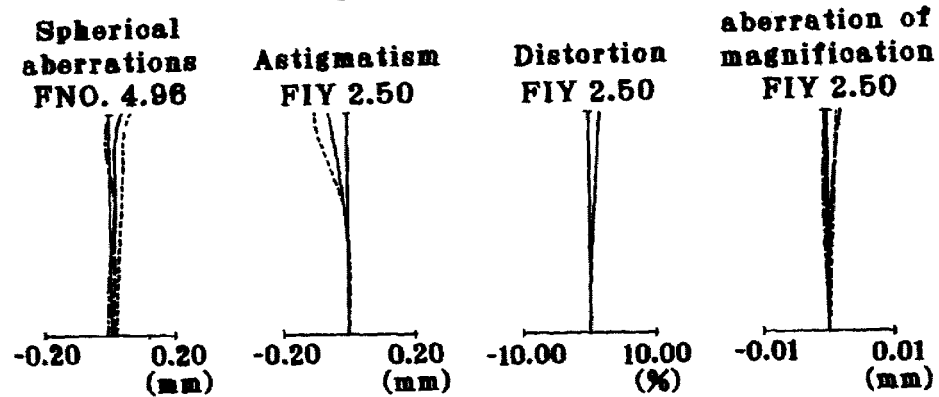

C : Cyan   M : Magenta
Ye : Yellow   G : Green

ZOOM LENS, AND ELECTRONIC IMAGING SYSTEM USING THE SAME

This application claims benefits of Japanese Application Nos. 2001-358775 and 2002-207797 filed in Japan on Nov. 26, 2001 and Jul. 17, 2002, respectively, the contents of which are incorporated by this reference.

BACKGROUND OF THE INVENTION

The present invention relates generally to a zoom lens and an electronic imaging system, and more particularly to a zoom lens, the depth dimension of which is diminished by providing some contrivances to an optical system portion such as a zoom lens portion and an electronic imaging system using the same, such as a video or digital camera.

In recent years, digital cameras (electronic cameras) have received attention as cameras of the next generation, an alternative to silver-halide 35 mm-film (usually called Leica format) cameras. Currently available digital cameras are broken down into some categories in a wide range from the high-end type for commercial use to the portable low-end type.

In view of the category of the portable low-end type in particular, the primary object of the present invention is to provide the technology for implementing video or digital cameras whose depth dimension is reduced while high image quality is ensured. The gravest bottleneck in diminishing the depth dimension of cameras is the thickness of an optical system, especially a zoom lens system from the surface located nearest to its object side to an image pickup plane. To make use of a collapsible lens mount that allows the optical system to be taken out of a camera body for phototaking and received therein for carrying now becomes mainstream.

However, the thickness of an optical system received in a collapsible lens mount varies largely with the lens type or filters used. Especially in the case of a so-called+precedent type zoom lens wherein a lens group having positive refracting power is positioned nearest to its object side, the thickness of each lens element and dead space are too large to set such requirements as zoom ratios and F-numbers at high values; in other words, the optical system does not become thin as expected, even upon received in the lens mount (JP-A 11-258507). A –precedent type zoom lens, especially of two or three-group construction is advantageous in this regard. However, this type zoom lens, too, does not become slim upon received in a collapsible lens mount, even when the lens positioned nearest to the object side is formed of a positive lens (JP-A 11-52246), because the lens groups are each composed of an increased number of lens elements, and the thickness of lens elements is large. Among zoom lenses known so far in the art, those set forth typically in JP-A's 11-287953, 2000-267009 and 2000-275520 are suitable for use with electronic imaging systems with improved image-formation capabilities including zoom ratios, angles of view and F-numbers, and may possibly be reduced in thickness upon received in collapsible lens mounts.

To make the first lens group thin, it is preferable to make an entrance pupil position shallow; however, the magnification of the second lens group must be increased to this end. For this reason, some considerable load is applied on the second lens group. Thus, it is not only difficult to make the second lens group itself thin but it is also difficult to make correction for aberrations. In addition, the influence of production errors grows. Thickness and size reductions may be achieved by making the size of an image pickup device small. To ensure the same number of pixels, however, the pixel pitch must be diminished and insufficient sensitivity must be covered by the optical system. The same goes true for the influence of diffraction.

SUMMARY OF THE INVENTION

In view of such problems as referred to above, the primary object of the invention is to thoroughly slim down a video or digital camera by singling out a zoom mode or zoom construction wherein a reduced number of lens elements are used to reduce the size of a zoom lens and simplify the layout thereof and stable yet high image-formation capabilities are kept all over the zooming range, and optionally making lens elements and air spaces thin thereby reducing the total thickness of each lens group and slimming down a zoom lens thoroughly by selection of filters.

To attain this object, the zoom lens of the present invention relies on one or two or more of the following 14 zoom lens arrangements.

First Zoom Lens (I)

A zoom lens comprising, in order from an object side thereof, a lens group A having negative refracting power and a lens group B having positive refracting power, in which for zooming at least the lens group A and the lens group B move, characterized in that:

the lens group B consists of three meniscus lens elements, each configured to be convex on an object side thereof.

Second Zoom Lens (II)

A zoom lens comprising, in order from an object side thereof, a lens group A having negative refracting power and a lens group B having positive refracting power, in which for zooming at least the lens group A and the lens group B move, characterized in that:

the lens group B includes at least one aspheric surface and comprises a total of three lens elements inclusive of a cemented lens component, wherein all refracting surfaces of the cemented lens component are configured to be convex in the same direction, and upon zooming from a wide-angle end to a telephoto end of the zoom lens, the lens group A moves in a convex locus toward an image plane side of the zoom lens.

Third Zoom Lens (III)

A zoom lens comprising, in order from an object side thereof, a lens group A having negative refracting power and a lens group B having positive refracting power, in which for zooming at least the lens group A and the lens group B move, characterized in that:

the lens group B consists of, in order from an object side thereof, a cemented lens component consisting of a positive meniscus lens element convex on an object side thereof and a negative meniscus lens element convex on an object side thereof and a positive meniscus single lens component convex in an object side thereof, two components/three lens elements in all.

Fourth Zoom Lens (IV)

A zoom lens comprising, in order from an object side thereof, a lens group A having negative refracting power and a lens group B having positive refracting power, in which for zooming at least the lens group A and the lens group B move, characterized in that:

the lens group B consists of, in order from an object side thereof, a cemented lens component consisting of a positive meniscus lens element convex on an object side thereof and a negative meniscus lens element convex on an object side thereof and a positive single lens component, two components/three lens elements in all, and upon zooming from a wide-angle end to a telephoto end of the zoom lens, the lens group A moves in a convex locus toward an image plane side of the zoom lens.

Fifth Zoom Lens (V)

A zoom lens comprising, in order from an object side thereof, a lens group A having negative refracting power and a lens group B having positive refracting power, in which for zooming at least the lens group A and the lens group B move, characterized in that:

the lens group B consists of, in order from an object side thereof, a positive meniscus lens element an object side-surface of which is defined by an aspheric surface and which is configured to be convex on an object side thereof, a negative lens element and a positive lens element, three lens elements in all, and upon zooming from a wide-angle end to a telephoto end of the zoom lens, the lens group A moves in a convex locus toward an image plane side of the zoom lens.

Sixth Zoom Lens (VI)

A zoom lens comprising, in order from an object side thereof, a lens group A having negative refracting power and a lens group B having positive refracting power, in which for zooming the lens group A and the lens group B move, characterized in that:

the lens group B consists of a total of three lens elements inclusive of a cemented lens component in a meniscus form convex on an object side thereof, and upon zooming from a wide-angle end to a telephoto end of the zoom lens, the lens group A moves in a convex locus toward an image plane side of the zoom lens.

Seventh Zoom Lens (VII)

A zoom lens comprising, in order from an object side thereof, a lens group A having negative refracting power and a lens group B having positive refracting power, in which for zooming the lens group A and the lens group B move, characterized in that:

the lens group B consists of a total of three lens elements inclusive of a cemented lens component, wherein all refracting surfaces of the cemented lens component are configured to be convex in the same direction, and upon zooming from a wide-angle end to a telephoto end of the zoom lens, the lens group A moves in a convex locus toward an image plane side of the zoom lens.

Eighth Zoom Lens (VIII)

A zoom lens comprising in order from an object side thereof, a lens group A having negative refracting power and a lens group B having positive refracting power, and consisting of a total of three lens groups each having positive refracting power, in which for zooming at least the lens group A and the lens group B move, characterized in that:

the lens group B consists of, in order from an object side thereof, a cemented lens component and a double-convex single lens component, two lens components/three lens elements in all.

Ninth Zoom Lens (IX)

A zoom lens comprising in order from an object side thereof, a lens group A having negative refracting power and a lens group B having positive refracting power, and consisting of a total of three lens groups each having positive refracting power, in which for zooming at least the lens group A and the lens group B move, characterized in that:

the lens group B consists of, in order from an object side thereof, a cemented lens component consisting of a positive meniscus lens element configured to be convex on an object side thereof and a negative meniscus lens element configured to be convex on an object side thereof and a positive single lens component, two components/three lens elements in all.

Tenth Zoom Lens (X)

A zoom lens comprising in order from an object side thereof, a lens group A having negative refracting power and a lens group B having positive refracting power, and consisting of a total of three lens groups each having positive refracting power, in which for zooming at least the lens group A and the lens group B move, characterized in that:

the lens group B consists of, in order from an object side thereof, a positive meniscus lens element at least an object side-surface of which is defined by an aspheric surface and which is configured to be convex on an object side thereof, a negative lens element and a positive lens element, three lens elements in all.

Eleventh Zoom Lens (XI)

A zoom lens, characterized in that a lens group that moves upon zooming includes a lens component in which cementing surfaces are equal or greater in number to or than air contact surfaces, i.e., a lens component in which at least three lens elements are cemented one upon another.

Twelfth Zoom Lens (XII)

A zoom lens, characterized in that a lens group that moves upon zooming includes a lens component in which cementing surfaces are equal or greater in number to or than air contact surfaces, i.e., a lens component in which at least three lens elements that are cemented one upon another, wherein the air contact surfaces of the cemented lens component are each defined by an aspheric surface.

Thirteenth Zoom Lens (XIII)

A zoom lens, characterized in that a lens group that moves upon zooming includes a cemented lens component consisting of, in order from an object side thereof, a positive lens element, a negative lens element and a positive lens element.

Fourteenth Zoom Lens (XIV)

A zoom lens comprising, in order from an object side thereof, a lens group A having negative refracting power and a lens group B having positive refracting power, in which for zooming at least the lens group A and the lens group B moves, characterized in that:

the lens group B includes a lens component in which cementing surfaces are equal or greater in number to or than air contact surfaces, i.e., a cemented lens component in which at least three lens elements are cemented one upon another.

In the aforesaid zoom lenses (II), (IV), (V), (VI) and (VII), the phrase "upon zooming from the wide-angle end to the telephoto end, the lens group A moves in a convex locus toward the image plane side" may be replaced by the phrase "upon the zooming from the wide-angle end to the telephoto end, the stop moves together with the lens group B". In the zoom lens of the present invention in general, the lens group A refers to a lens group comprising up to four lenses, and a lens group other than the lens groups A and B is understood to comprise up to two lenses.

An additional prerequisite for the present invention is that the lens group A be primarily located nearest to the object side of the zoom lens.

While the cemented lens component in the lens group B is described as consisting mainly of an object side-positive lens and a negative lens, it is understood that the order may be reversed, i.e., the negative lens and the image side-positive lens may be cemented together in this order. Alternatively, the lens group B may consist of, in order from its object side, an object side-positive lens (a single lens), and a cemented lens component consisting of an image side-positive lens and a negative lens. Still alternatively, the cemented lens component may consist of three lenses, i.e., an object side-positive lens, a negative lens and an image side-positive lens. In other words, the cemented lens component may have cementing surfaces as many as or more than air contact surfaces.

In the present disclosure, the cemented lens component, by definition, comprises a plurality of lenses provided that a lens consisting of a single medium is regarded as one unit, and the lens component means a lens group with no air separation therein, typically a single lens or a cemented lens.

The advantages, and the requirements for, the aforesaid zoom lens arrangements are now explained.

For a camera having a limited depth dimension, it is very effective to adopt a so-called collapsible lens mount designed to take an optical system out of a camera body during a shooting and receive the optical system in the camera body upon carrying. It is then most important that each lens group is kept thin.

In a conventional zoom lens having a relatively diminished depth dimension, a lens group equivalent to the lens group A used herein is composed of two lenses, the spacing between which is reduced as much as possible for the purpose of correction of aberrations. Although depending on the moving locus of the lens group during zooming, however, the diameter of the lens group may increase, resulting in a thickness increase. A lens group corresponding to the lens group B used herein has still some thickness partly because of an increased number of lenses and partly because each lens element therein is thick. In the present invention, therefore, aberrations are well corrected while the lens group B is composed of three lenses.

Especially if the lens group B is composed of three meniscus lenses, each configured to be convex on the object side, as is the case with the zoom lens (I), the thickness per lens can be diminished. In addition, the principal point can be located at a position favorable for the length of the optical system so that satisfactory correction of aberrations can be made throughout the zooming range.

With the zoom lens (II) wherein the magnification of the lens group B is kept as high as possible in view of correction of aberrations and the movement of the lens group A from the wide-angle end to the telephoto end takes a convex locus form toward the image side of the zoom lens, it is possible to diminish the diameter and, hence, the thickness of the lens group A because the entrance pupil position becomes shallow on a wide-angle shot. The lens group B is similar in construction to that of the zoom lens (I) with the exception that the thickness of the lens group A is diminished by adding constraints to the moving locus thereof. Accordingly, at least one aspheric surface can be introduced to the lens group B and the positive lens located nearest to the image side thereof can be freely configured so that the degree of freedom in correction of aberrations can be imparted thereto.

The zoom lens (III) further defines the zoom lens (I) for better correction of aberrations; that is, the lens group B is composed of three lenses or, in order from its object side, a positive meniscus lens, a negative meniscus lens and a positive meniscus lens. When two of three lens elements are cemented together, not only can the amount of decentration between two such lens elements be easily reduced but also the relative decentration sensitivity of the cemented lens to the remaining lens element can effectively be subdued. By cementing together two object side-lens elements of three lens elements in the lens group B, it is thus possible to make reasonable correction for the decentration sensitivity between the adjacent lens elements in the lens group B.

In the zoom lens (IV), the lens group A moves in the same locus as in the zoom lens (II), and the lens group B is constructed in the same manner as in the zoom lens (III) with the exception that the thickness of the lens group A is diminished by adding restraints to its moving locus. Accordingly, the degree of freedom is given to the positive lens located nearest to the image side of the lens group B so that it is easy to make correction for aberrations.

The zoom lens (V) is a modification to the zoom lens (IV), wherein the lens group B is composed of separate lenses to give weight to correction of coma in particular by separation of the lenses from one another and the introduction of an aspheric surface, rather than to decentration sensitivity.

In the zoom lens (VI), thickness reductions are achieved by limiting the zooming arrangement to only two lens groups to give the degree of freedom to the directions of the cementing surface in the cemented lens component in the lens group B and the refracting surface of the positive lens located nearest to the image side of the lens group B. For thickness reductions, it is more preferable to place the direction of the cementing surface or the refracting surface of the positive lens located nearest to the image side in alignment with the air contact surfaces of the cemented lens component.

The zoom lens (VII) corresponds to the former case.

In the zoom lens (VIII), (IX), and (X), one additional lens group is added to the lens groups A and B.

In the zoom lens (VIII), the lens group B is composed of a cemented lens component and a double-convex lens component having a relatively strong power, two components/three lenses in all. In the zoom lens (IX), the lens group B is composed of a cemented lens component consisting of a positive meniscus lens and a negative meniscus lens, each convex on its object side, and a positive single lens component, two lens components/three lenses in all. In the zoom lens (X), the lens group B is composed of three lenses, i.e., a positive meniscus lens at least the object side-surface of which is defined by an aspheric surface and which is convex on its object side, a negative lens and a positive lens. In any case, the lens group B can be made thin enough to slim down a camera. The one additional lens group other than the lens groups A and B should preferably be composed of a positive single lens. As compared with a zoom lens consisting only of two lens groups, it is easier to achieve a larger aperture ratio or a telecentric arrangement on the exit side without incurring any considerable thickness increase.

In the zoom lens (XI), the lens group that moves for zooming is constructed of lens elements in such a number that the number of cementing surfaces is equal to or greater than the number of air contact surfaces. In other words, at least three lenses are cemented one upon another. Cementing also contributes to improvements in the assembly accuracy of the lens system.

The zoom lens (XII) is a modification to the zoom lens (XI), wherein the air contact surfaces at both ends of the lens component, in which the number of cementing surfaces is equal to or greater than the number of air contact surfaces, are each defined by an aspheric surface, thereby making up for the ability to correct aberrations, which has suffered degradation by cementing.

In the zoom lens (XIII), the lens component in which the number of cementing surfaces is equal to or greater than the number of air contact surfaces is composed of, in order from its object side, a positive lens, a negative lens and a positive lens in such a way that lenses of opposite signs are alternately arranged so that sufficient correction of field curvature and chromatic aberrations in particular can be made.

The ideas behind the zoom lenses (XI) to (XII) may be applicable to the movable group of every zoom lens system, contributing to length reductions of zoom lens systems.

Referring to the zoom lens (XIV), the ideas behind the zoom lenses (XI) to (XIII) are applied to a zoom lens which comprises, in order from its object side, a lens group A having negative refracting power and a lens group B having positive refracting power, wherein the lens group A and the lens group B move for zooming. It is thus possible to achieve a zoom lens whose thickness upon received in a collapsible lens mount is reduced to the limit with well-corrected aberrations, while ensuring a high zoom ratio, a small F-number and so on.

When a cemented lens component with three or more lenses cemented together is used, the respective cementing surfaces should preferably have some refracting power so as to make correction aberrations occurring at the cemented lens component itself.

To increase the refracting power of each cementing surface, the difference in the index of refraction between the lenses on both sides of the cementing surface should preferably be large because the radius of curvature of the cementing surface is prevented from becoming too small, making correction of aberrations easy.

As the difference in the index of refraction between the lenses on both sides of the cementing surface becomes large, on the other hand, unnecessary reflected light tends to occur at that cementing surface.

If a plurality of cementing surfaces in the aforesaid cemented lens component are coated in such a way as to prevent reflections at those cementing surfaces, the unnecessary reflected light can then be so subdued that clearer images can be obtained. Specifically, such coatings may be each formed of a multilayer film.

In the present invention, one or more of the following conditions should be satisfied thereby reducing the size of the respective lens systems and making more favorable correction for aberrations.

$$0.75 < R_{B4}/R_{B1} < 4.0 \quad (1)$$

It is here noted that condition (1) does not hold true for the case where the image side-positive lens forms a part of the cemented lens component.

$$0.00 < f_W/R_{B2} < 2.0 \quad (2)$$

It is here noted that when the image side-positive lens forms a part of the cemented lens component, $R_{B4}$ should be used for $R_{B2}$.

$$0.005 < d_B/f_W < 0.2 \quad (3)$$

It is here noted that when the image side-positive lens forms a part of the cemented lens component, $d_B$ should be substituted by the axial air separation between the object side-positive lens and the cemented lens component.

$$1.0 < f_{B3}/f_W < 4.0 \quad (4)$$

$$0 < n_{B2} - n_{B1} < 0.4 \quad (5)$$

It is here noted that conditions (4) and (5) do not hold true for the case where the image side-positive lens forms a part of the cemented lens component.

$$10 < v_{B1} - v_{B2} < 70 \quad (6)$$

It is here noted that when the image side-positive lens forms a part of the cemented lens component, the absolute value of the difference in Abbe number between the cemented lenses should be used for $v_{B1} - v_{B2}$.

$$40 < v_{B1} \quad (7)$$

$$-0.01 < (\Delta\theta gF)_{B1} < 0.08 \quad (8)$$

$$0.2 \leq (\exp(T)/\exp(W))/\gamma < 1 \quad (9)$$

It is here noted that conditions (7), (8) and (9) do not hold true for the case where an additional lens group is present in addition to the lens groups A and B.

In these conditions, $R_{B1}$, $R_{B2}$, $R_{B3}$, $R_{B4}$, $R_{B5}$ and $R_{B6}$ are the axial radii of curvature of the object and image side-surfaces of the object side-positive lens, the object and image side-surfaces of the negative lens, and the object and image-side surfaces of the image side-positive lens in the lens group B, respectively, $f_W$ is the focal length of the zoom lens at its wide-angle end, $d_B$ is the axial air separation between the negative lens and the image side-positive lens in the lens group B, $f_{B3}$ is the focal length of the positive lens on the image side of the lens group B, $n_{B1}$ and $n_{B2}$ are the d-line refractive indices of the media that form the object side-positive lens and the negative lens in the lens group B, respectively, $v_{B1}$ and $v_{B2}$ are the d-line based Abbe numbers of the object side-positive lens and the negative lens in the lens group B, respectively, $(\Delta\theta gF)_{B1}$ is the anomalous dispersion of the medium that forms the object side-positive lens in the lens group B, exp(W) and exp(T) are the distances of the zoom lens from a Gauss image plane to an exit pupil position at the wide-angle end and the telephoto end, respectively, and $\gamma$ is the zoom ratio of the zoom lens from the wide-angle end to the telephoto end upon focused on an infinite object point, provided that $\gamma > 1$.

The anomalous dispersion is here defined as follow.

The anomalous dispersion of each medium (vitreous material), $\Delta\theta gF$, is defined by $$\theta gF = AgF + BgF \cdot v_d + \Delta\theta gF$$

where $\theta gF = (n_g - n_F)/(n_F - n_C)$ $$v_d = (n_d - 1)/(n_F - n_C)$$

Here AgF and BgF are the linear coefficients that are determined by two vitreous material types, i.e., glass code 511605 (available under the trade name of NSL7 from Ohara Co., Ltd. with $\theta gF = 0.5436$ and $v_d = 60.49$) and glass code 620363 (available under the trade name of PBM2 from Ohara Co., Ltd. with $\theta gF = 0.5828$ and $v_d = 36.26$).

It is noted that for the zoom lenses (XI) to (XIV) inclusive, one or more of the following conditions (18) to (22) should preferably be satisfied.

$$-2 < (R_{CF} + R_{CR})/(R_{CF} - R_{CR}) < 0.5 \quad (18)$$

Here $R_{CF}$ and $R_{CR}$ are the axial radii of curvature of the surfaces positioned nearest to the object side and the image side, respectively, of the cementing lens component that is incorporated in the lens group that moves upon zooming, and has m cementing surfaces ($m \geq 2$).

$$0.7 < D_c/f_W < 1.6 \tag{19}$$

Here $D_c$ is the axial distance (apex-to-apex distance) between the surfaces positioned nearest to the object side and the image side, respectively, of the cemented lens component that is incorporated in the lens group that moves upon zooming, and has m cementing surfaces (m≧2).

$$0.002 < \Sigma\{(1/R_{ci}) - (1/R_{ca})\}^2 < 0.05 \tag{20}$$

Here $R_{ci}$ is the axial radius of curvature of an i-th cementing surface as counted from the object side of the cemented lens component that is incorporated in the lens group that moves upon zooming, and has m cementing surfaces (m≧2), and $R_{ca} = m/\{\Sigma(1/R_{ci})\}$ where i=1, ..., m.

$$5 \times 10^{-5} < \Sigma\{(1/\nu_{cj+1}) - (1/\nu_{cj})\}^2 < 4 \times 10^{-3} \tag{21}$$

Here $\nu_{cj}$ is the Abbe number (on a d-line basis) of the medium that forms a j-th lens element as counted from the object side of the cemented lens component which is incorporated in the lens group that moves upon zooming and in which n lens elements (n≧3) are consecutively cemented one upon another, where j=1, ..., n−1.

$$0.04 < \Sigma(n_{cj+1} - n_{cj})^2 < 0.5 \tag{22}$$

Here $n_{cj}$ is the refractive index (on a d-line basis) of the medium that forms a j-th lens element as counted from the object side of the cemented lens component which is incorporated in the lens group that moves upon zooming and in which n lens elements (n≧3) are consecutively cemented one upon another, where j=1, ..., n−1.

The cemented lens component is incorporated in the lens group B for the purpose of canceling out aberration coefficients therein, thereby reducing the sensitivity to decentration. Condition (1) defines the radius-of-curvature ratio between two air contact surfaces of the cemented lens component, and condition (2) defines the radii of curvature of the cementing surfaces therein. When the cemented lens component is incorporated in the lens group B, exceeding the upper limit of 4.0 to condition (1) may be favorable for correction of spherical aberrations, coma and astigmatism throughout the zoom lens; however, it is less effective for the slacking of decentration sensitivity by cementing. As the lower limit of 0.75 is not reached, correction of spherical aberrations, coma and astigmatism throughout the zoom lens tends to become difficult.

Condition (2), too, is applied to the lens group B that includes the cemented lens component therein. Falling short of the lower limit of 0.00 may be favorable for correction of longitudinal chromatic aberration and chromatic aberration of magnification; however, it is not preferable because of the likelihood of chromatic aberration of spherical aberration. In addition, although spherical aberrations at the reference wavelength are well corrected, spherical aberrations at short wavelengths remain considerably over-corrected, causing chromatic blurring of an image. Moreover, there is no option but to increase the thickness of the cemented lens component, offering an obstacle to diminishing the thickness of the zoom lens upon received in a collapsible lens mount. As the upper limit of 2.0 is exceeded, longitudinal chromatic aberration and chromatic aberration of magnification tend to suffer under-correction.

Condition (3) defines the axial air separation $d_B$ between the negative lens and the image side-positive lens in the lens group B. Unless this separation is of some magnitude, it is impossible to make full correction of astigmatism. This also offers an obstacle to making the lens group B thin. Thus, coma and astigmatism should be corrected by the introduction of an aspheric surface to any surface of the lens group A or B. Nonetheless, as the lower limit of 0.005 is not reached, it is impossible to make full correction of coma or astigmatism, and as the upper limit of 0.2 is exceeded, thickness increases unacceptably.

Condition (4) defines the focal length $f_{B3}$ of the positive lens on the image side of the lens group. As the upper limit of 4.0 is exceeded, the exit pupil position comes close to the image plane, leading to the likelihood of shading, and there is an increase in the relative decentration sensitivity of the positive lens on the image side of the lens group B. As the lower limit of 1.0 is not reached, it is difficult to make full correction of spherical aberrations, coma and astigmatism, and to ensure any high zoom ratio in a compact arrangement.

Condition (5) defines the difference in the index of refraction between the object side-positive lens and the negative lens in the lens group B. Falling short of the lower limit of 0 may be effective for diminishing the relative decentration sensitivity between the cemented lens component and the positive single lens in the lens group B, but renders it difficult to make correction of coma, etc. Exceeding the upper limit of 0.4 may favor correction of aberrations all over the zooming range, but counts against improvements in the relative decentration sensitivity between the cemented lens component and the positive single lens in the lens group B.

Condition (6) defines correction of longitudinal chromatic aberration and chromatic aberration of magnification. Especially in the cemented lens component, the direction of curvature of a given cementing surface should be in alignment with that of the adjacent refracting surface as much as possible. Falling short of the lower limit of 10 incurs under-correction of longitudinal chromatic aberration. The upper limit of 70 is prima facie set because of the absence of any practically suitable lens medium.

Alternatively, as defined by condition (7), it is acceptable to use a vitreous material having a very large Abbe number for the positive lens, especially the object side-positive lens in the lens group B. Then, a lens medium having positive anomalous dispersion can be used for the positive lens itself while, where possible, a lens medium having negative anomalous dispersion can be used for the negative lens, thereby facilitating removal of chromatic aberrations due to secondary spectra.

Condition (8) defines that for correction of chromatic aberrations due to secondary spectra, it is preferable to use a lens medium having a positive, large anomalous dispersion for the positive lens, especially the object side-positive lens in the lens group B. As the lower limit of −0.01 is not reached, correction of chromatic aberrations due to secondary spectral becomes difficult, and as the upper limit of 0.08 is exceeded, there is no practically usable medium for real optical systems.

Condition (9) defines the exit pupil position. Ideally, light rays should be incident vertically on an image pickup device for the reason that the angle of incidence of light rays takes part in shading; however, this is little achievable by size reductions, etc. of lenses. Recently developed image pickup devices, on the other hand, can somehow keep up with the oblique incidence of light rays by some contrivances to aperture configuration. However, they cannot still address changes of the angle of incidence with zooming. Therefore, fluctuations of the exit pupil position with zooming should be reduced as much as possible. As the upper limit of 1 is exceeded, shading is likely to occur at the wide-angle end or the telephoto end.

Condition (18) defines the shape factor of the cemented lens component, which is incorporated in the zoom lens group that moves upon zooming and has m cementing surfaces (m≧2). As the lower limit of −2 is not reached, it is difficult to ensure any desired zoom ratio or cut down the length of the zoom lens during use (which has some relations to the volume of the zoom lens upon received in a collapsible lens mount). As the upper limit of 0.5 is exceeded, correction of spherical aberrations and coma becomes difficult even with the introduction of an aspheric surface. As the lower limit of 0.5 is exceeded, correction of spherical aberrations and coma becomes difficult even with the introduction of an aspheric surface.

Condition (19) defines the axial distance (thickness) between the surfaces located nearest to the object side and the image side of the cemented lens component, which is incorporated in the lens group that moves upon zooming and has m cementing surfaces. As the upper limit of 1.6 is exceeded, the thickness of the zoom lens upon received in a collapsible lens mount does not become small. As the lower limit of 0.7 is not reached, it is impossible to diminish the radius of curvature of each cementing surface and, hence, make full use of cementing (correction of chromatic aberrations, etc.).

Condition (20) is provided to allow each cementing surface to be effective for correction of aberrations. As the upper limit of 0.05 is exceeded, correction of aberrations is advantageously achievable, but there is a fear of exceeding the upper limit to condition (19). Falling short of the lower limit of 0.002 is not preferable because the effects on correction of aberrations are canceled out, although this may be faborable for thickness reductions.

Condition (21) defines correction of chromatic aberrations of the cemented lens component, which is incorporated in the lens group that moves upon zooming and has m cementing surfaces (m≧2). As the lower limit of $5 \times 10^{-5}$ is not reached, correction of chromatic aberrations becomes insufficient, and as the upper limit of $4 \times 10^{-3}$ is exceeded, chromatic aberrations are often overcorrected.

Condition (22) defines correction of spherical aberrations, coma and field curvature of the cemented lens component, which is incorporated in the lens group that moves upon zooming and has m cementing surfaces (m≧2). As the lower limit of 0.04 is not reached, correction of spherical aberrations and coma becomes insufficient and the Petzval sum tends to have a negative large value. As the upper limit of 0.5 is exceeded, higher-order components of spherical aberrations and coma tend to occur and the Petzval sum tends to have a positive large value. It is noted that conditions (21) and (22) hold true for the case where the positive lens is lower in the index of refraction and higher in Abbe number than the negative lens.

For further size reductions and further performance improvements, the following conditions (1)' to (9)' should be satisfied instead of the aforesaid conditions (1) to (9).

$$1.1 < R_{B4}/R_{B1} < 3.5 \quad (1)'$$

It is here noted that condition (1)' does not hold true for the case where the image side-positive lens forms a part of the cemented lens component.

$$0.03 < f_W/R_{B2} < 1.7 \quad (2)'$$

It is here noted that when the image side-positive lens forms a part of the cemented lens component, $R_{B4}$ should be used for $R_{B2}$.

$$0.008 < d_B/f_W < 0.17 \quad (3)'$$

It is here noted that when the image side-positive lens forms a part of the cemented lens component, $d_B$ should be substituted by the axial air separation between the object side-positive lens and the cemented lens component.

$$1.2 < f_{B3}/f_W < 3.0 \quad (4)'$$

$$0.05 < n_{B2} - n_{B1} < 0.4 \quad (5)'$$

It is here noted that conditions (4)' and (5)' do not hold true for the case where the image side-positive lens forms a part of the cemented lens component.

$$25 < \nu_{B1} - \nu_{B2} < 70 \quad (6)'$$

It is here noted that when the image side-positive lens forms a part of the cemented lens component, the absolute value of the difference in Abbe number between the cemented lenses should be substituted for $\nu_{B1} - \nu_{B2}$.

$$60 < \nu_{B1} \quad (7)'$$

$$0 < (\Delta \theta gF)_{B1} < 0.07 \quad (8)'$$

$$0.3 < (\exp(T)/\exp(W)/\gamma < 0.9 \quad (9)'$$

It is here noted that conditions (7)', (8)' and (9)' do not hold true for the case where an additional lens group is present in addition to the lens groups A and B.

For further size reductions and further performance improvements, the following conditions (18)' to (22)' should be satisfied instead of the aforesaid conditions (18) to (22).

$$-1.4 < (R_{CF} + R_{CR})/(R_{CF} - R_{CR}) < 0.2 \quad (18)'$$

$$0.8 < D_c/f_W < 1.4 \quad (19)'$$

$$0.004 < \Sigma\{(1/R_{ci}) - (1/R_{ca})\}^2 < 0.04 \quad (20)'$$

Here $R_{ci}$ is the axial radius of curvature of an i-th cementing surface as counted from the object side of the cemented lens component, which is incorporated in the lens group that moves upon zooming, and has m cementing surfaces (m≧2), and $R_{ca} = m/\{\Sigma(1/R_{ci})\}$ where i=1, ..., m.

$$1 \times 10^{-4} < \Sigma\{(1/\nu_{cj+1}) - (1/\nu_{cj})\}^2 < 3 \times 10^{-3} \quad (21)'$$

Here $\nu_{cj}$ is the Abbe number (on a d-line basis) of the medium that forms a j-th lens element as counted from the object side of the cemented lens component, which is incorporated in the lens group that moves upon zooming and in which n lens elements (n≧3) are consecutively cemented one upon another, where j=1, ..., n−1.

$$0.05 < \Sigma(n_{cj+1} - n_{cj})^2 < 0.4 \quad (22)'$$

Here $n_{cj}$ is the refractive index (on a d-line basis) of the medium that forms a j-th lens element as counted from the object side of the cemented lens component, which is incorporated in the lens group that moves for zooming and in which n lens elements (n≧3) are consecutively cemented one upon another, where j=1, ..., n−1.

For the best thickness reductions and the best performance improvements, the following conditions (1)" to (9)" should be satisfied instead of conditions (1) to (9).

$$1.2 < R_{B4}/R_{B1} < 3.0 \quad (1)''$$

It is here noted that condition (1)" does not hold true for the case where the image side-positive lens forms a part of the cemented lens component.

$$0.06 < f_W/R_{B2} < 1.4 \quad (2)''$$

It is here noted that when the image side-positive lens forms a part of the cemented lens component, $R_{B4}$ should be used for $R_{B2}$.

$$0.01 < d_B/f_W < 0.15 \quad (3)''$$

It is here noted that when the image side-positive lens forms a part of the cemented lens component, $d_B$ should be substituted by the axial air separation between the object side-positive lens and the cemented lens component.

$$1.4 < f_{B3}/f_W < 2.4 \quad (4)''$$

$$0.1 < n_{B2} - n_{B1} < 0.36 \quad (5)''$$

It is here noted that conditions (4)'' and (5)'' do not hold true for the case where the image side-positive lens forms a part of the cemented lens component.

$$40 < \nu_{B1} - \nu_{B2} < 70 \quad (6)''$$

It is here noted that when the image side-positive lens forms a part of the cemented lens component, the absolute value of the difference in Abbe number between the cemented lenses should be substituted for $\nu_{B1} - \nu_{B2}$.

$$80 < \nu_{B1} \quad (7)''$$

$$0.01 < (\Delta\theta gF)_{B1} < 0.06 \quad (8)''$$

$$0.4 < (\exp(T)/\exp(W))/\gamma < 0.8 \quad (9)''$$

It is here noted that conditions (7)'', (8)'' and (9)'' do not hold true for the case where an additional lens group is present in addition to the lens groups A and B.

For the best thickness reductions and the best performance improvements, the following conditions (18)'' to (22)'' should be satisfied instead of the aforesaid conditions (18) to (22).

$$-0.9 < (R_{CF} + R_{CR})/(R_{CF} - R_{CR}) < -0.1 \quad (18)''$$

$$0.9 < D_c/f_W < 1.2 \quad (19)''$$

$$0.006 < \Sigma\{(1/R_{ci}) - (1/R_{ca})\}^2 < 0.03 \quad (20)''$$

Here $R_{ci}$ is the axial radius of curvature of an i-th cementing surface as counted from the object side of the cemented lens component that is incorporated in the lens group that moves upon zooming, and has m cementing surfaces (m≧2), and $R_{ca} = m/\{\Sigma(1/R_{ci})\}$ where i=1, . . . , m.

$$2 \times 10^{-4} < \Sigma\{(1/\nu_{cj+1}) - (1/\nu_{cj})\}^2 < 2 \times 10^{-3} \quad (21)''$$

Here $\nu_{cj}$ is the Abbe number (on a d-line basis) of the medium that forms a j-th lens element as counted from the object side of the cemented lens component which is incorporated in the lens group that moves upon zooming and in which n lens elements (n≧3) are consecutively cemented one upon another, where j=1, . . . , n−1.

$$0.06 < \Sigma(n_{cj+1} - n_{cj})^2 < 0.3 \quad (22)''$$

Here $n_{cj}$ is the refractive index (on a d-line basis) of the medium that forms a j-th lens element as counted from the object side of the cemented lens component which is incorporated in the lens group that moves for zooming and in which n lens elements (n≧3) are consecutively cemented one upon another, where j=1, . . . , n−1.

To add to this, it is acceptable to use conditions (2)*, (3)*, (5)* and (9)* instead of conditions (2), (3), (5) and (9).

$$0.25 < f_W/R_{B2} < 1.3 \quad (2)*$$

It is here noted that when the image side-positive lens forms a part of the cemented lens component, $R_{B4}$ should be used for $R_{82}$.

$$.01 < d_B/f_W < 0.035 \quad (3)*$$

It is here noted that when the image side-positive lens forms a part of the cemented lens component, $d_B$ should be substituted by the axial air separation between the image side-positive lens and the cemented lens component.

$$0.24 < n_{B2} - n_{B1} < 0.36 \quad (5)*$$

It is here noted that condition (5)* does not hold true for the case where the image side-positive lens forms a part of the cemented lens component.

$$0.45 < (\exp(T)/\exp(W))/\gamma < 0.7 \quad (9)*$$

It is here noted that condition (9)* does not hold true for the case where an additional lens group is present in addition to the lens groups A and B.

As can be seen from the examples given later, the aperture stop is located on the image side of the lens group B, moving together with the lens group B.

The aspheric surface to be introduced in the lens group B is now explained. The introduction of an aspheric surface to the object side-positive lens, especially the refracting surface on the object side thereof, in the lens group B is effective for correction of spherical aberrations and coma. At the same time, the presence of a strong diverging surface on the image side-refracting surface of the negative lens in the lens group B allows aberration coefficients therein to be put in such a direction as to be canceled out, so that the relative de-centration sensitivity between the object side-positive lens and the image side-positive lens in the lens group B can be subdued. Due to a reduced number of lenses, aberrations (coma) by light rays passing through the rim of the lens group B tend to remain. It is thus preferable to introduce another aspheric surface to the image side-positive lens, especially the surface located on the image side thereof. To keep low the relative decentration sensitivity between the image side-positive lens and the object side-cemented lens component, the second aspheric surface should preferably be configured to be concave with such a curvature that the average curvature in the range where the height of the aspheric surface from the optical axis corresponds to a half the full-aperture stop radius is weaker than that outside that range.

The lens arrangement of the lens group A is now explained. If the lens group A is composed of only two lenses, i.e., a negative lens (including an aspheric surface) and a positive lens while satisfying the following conditions (10), (11) and (12), chromatic aberrations and each Seidel off-axis aberration can then be well correctable, contributing significantly to thickness reductions.

Conditions (10), (11) and (12) are each provided to more advantageously achieve size reductions of the zoom lens system and correction of aberrations, and one or more of them should preferably be satisfied.

$$1.55 < n_{A1} < 1.9 \quad (10)$$

$$20 < \nu_{A1} - \nu_{A2} < 70 \quad (11)$$

$$-8 < (R_{A3} + R_{A4})/(R_{A3} - R_{A4}) < -2 \quad (12)$$

Here $n_{A1}$ is the d-line refractive index of the medium that forms the negative lens in the lens group A, $\nu_{A1}$ and $\nu_{A2}$ are the d-line based Abbe numbers of the media that form the negative and positive lenses in the lens group A, respectively, and $R_{A3}$ and $R_{A4}$ are the axial radii of curvature of the object and image side-surfaces of the positive lens in the lens group A, respectively.

Condition (10) defines the refractive index of the negative lens in the lens group A in such a way as to favor correction of Petzval sum. As the upper limit of 1.9 is exceeded, the Petzval sum tends to have a positive, large value, and falling short of the lower limit of 1.55 tends to count against correction of coma and distortion.

Condition (11) defines fluctuations of longitudinal chromatic aberration and chromatic aberration of magnification with zooming. As the lower limit of 20 is exceeded, fluctuations of longitudinal chromatic aberration and chromatic aberration of magnification tend to become large, and the upper limit of 70 is prima facie set because of the absence of no practically suitable medium. Preferably, $\nu_{A1}$ should be 50 or greater.

Condition (12) defines the shape factor of the positive lens in the lens group A. Exceeding the upper limit of −2 is unfavorable not only for correction of astigmatism but also in that an extra spacing is needed between the lens groups A and B for the purpose of avoiding mechanical interferences during zooming. Falling short of the lower limit of −8 often counts against correction of distortion.

For further size reductions and further performance improvements, conditions (10), (11) and (12) should be replaced by conditions (10)', (11)' and (12)'.

$$1.60 < n_{A1} < 1.9 \tag{10}'$$

$$25 < \nu_{A1} - \nu_{A2} < 60 \tag{11}'$$

$$-8 < (R_{A3} + R_{A4})/(R_{A3} - R_{A4}) < -3.0 \tag{12}'$$

For the best size reductions and the best performance improvements, conditions (10), (11) and (12) should be substituted by conditions (10)", (11)" and (12)".

$$1.65 < n_{A1} < 1.85 \tag{10}''$$

$$30 < \nu_{A1} - \nu_{A2} < 50 \tag{11}''$$

$$-8 < (R_{A3} + R_{A4})/(R_{A3} - R_{A4}) < -3.7 \tag{12}''$$

Thus, the present invention provides means for improving the image-formation capability of the zoom lens part while diminishing the thickness of the zoom lens upon received in a collapsible lens mount.

Next, how and why the thickness of filters is reduced is now explained. In an electronic imaging system, an infrared absorption filter having a certain thickness is usually inserted between an image pickup device and the object side of a zoom lens, so that the incidence of infrared light on the image pickup plane is prevented. Here consider the case where this filter is replaced by a coating devoid of thickness. In addition to the fact that the system becomes thin as a matter of course, there are spillover effects. When a near-infrared sharp cut coat having a transmittance ($\tau_{600}$) of at least 80% at 600 nm and a transmittance ($\tau_{700}$) of up to 8% at 700 nm is introduced between the image pickup device in the rear of the zoom lens system and the object side of the system, the transmittance at a near-infrared area of 700 nm or longer is relatively lower and the transmittance on the red side is relatively higher as compared with those of the absorption type, so that the tendency of bluish purple to turn into magenta—a defect of a CCD or other solid-state image pickup device having a complementary colors mosaic filter—is diminished by gain control and there can be obtained color reproduction comparable to that by a CCD or other solid-state image pickup device having a primary colors filter.

Thus, it is preferable to satisfy conditions (13) and (14):

$$\tau_{600}/\tau_{550} \geq 0.8 \tag{13}$$

$$\tau_{700}/\tau_{550} \leq 0.08 \tag{14}$$

Here $\tau_{550}$ is the transmittance at a wavelength of 550 nm.

More preferably, the following conditions (13)' and/or (14)' should be satisfied:

$$\tau_{600}/\tau_{550} \geq 0.85 \tag{13}'$$

$$\tau_{700}/\tau_{550} \leq 0.05 \tag{14}'$$

Even more preferably, the following conditions (13)" or (14)" should be satisfied:

$$\tau_{600}/\tau_{550} \geq 0.9 \tag{13}''$$

$$\tau_{700}/\tau_{550} \leq 0.03 \tag{14}''$$

Most preferably, both conditions (13)" and (14)" should be satisfied.

Another defect of the CCD or other solid-state image pickup device is that the sensitivity to the wavelength of 550 nm in the near ultraviolet area is considerably higher than that of the human eye. This, too, makes noticeable chromatic blurring at the edges of an image due to chromatic aberrations in the near ultraviolet area. Such chromatic blurring is fatal to a compact optical system. Accordingly, if an absorber or reflector is inserted on the optical path, which is designed such that the ratio of the transmittance ($\tau_{400}$) at 400 nm wavelength to that ($\tau_{550}$) at 550 nm wavelength is less than 0.08 and the ratio of the transmittance ($\tau_{440}$) at 440 nm wavelength to that ($\tau_{550}$) at 550 nm wavelength is greater than 0.4, it is then possible to considerably reduce noises such as chromatic blurring while the wavelength area necessary for color reproduction (satisfactory color reproduction) is kept intact.

It is thus preferably to satisfy conditions (15) and (16):

$$\tau_{400}/\tau_{550} \leq 0.08 \tag{15}$$

$$\tau_{440}/\tau_{550} \geq 0.4 \tag{16}$$

More preferably, the following conditions (15)' and/or (16)' should be satisfied.

$$\tau_{400}/\tau_{550} \leq 0.06 \tag{15}'$$

$$\tau_{440}/\tau_{550} \geq 0.5 \tag{16}'$$

Even more preferably, the following condition (15)" or (16)" should be satisfied.

$$\tau_{400}/\tau_{550} \leq 0.04 \tag{15}''$$

$$\tau_{440}/\tau_{550} \geq 0.6 \tag{16}''$$

Most preferably, both condition (15)" and (16)" should be satisfied.

It is noted that these filters should preferably be located between the image-formation optical system and the image pickup device.

On the other hand, a complementary colors filter is higher in substantial sensitivity and more favorable in resolution than a primary colors filter-inserted CCD due to its high transmitted light energy, and provides a great merit when used in combination with a small-size CCD. Regarding an optical low-pass filter that is another filter, too, its total thickness $t_{LPF}$ (mm) should preferably satisfy condition (17):

$$0.15 < t_{LPF}/a < 0.45 \quad (17)$$

Here a is the horizontal pixel pitch (in μm) of the image pickup device, and 5 μm or lower.

Reducing the thickness of the optical low-pass filter, too, is effective for making the thickness of the zoom lens upon received in a collapsible mount; however, this is generally not preferred because the moiré preventive effect becomes slender. On the other hand, as the pixel pitch becomes small, the contrast of frequency components greater than Nyquist threshold decreases under the influence of diffraction of an image-formation lens system and, consequently, the decrease in the moiré preventive effect is more or less acceptable. For instance, it is known that when three different filters having crystallographic axes in directions where upon projected onto the image plane, the azimuth angle is horizontal (=0°) and ±45° are used while they are put one upon another, some moiré preventive effect is obtainable. According to the specifications known to make the filter assembly thinnest, each filter is displaced by a μm in the horizontal and by SQRT(½)*a μm in the ±45° directions. Here SQRT means a square root. The then filter thickness is approximately given by [1+2*SQRT(½)]*a/5.88 (mm). This is the specification where the contrast is reduced down to zero at a frequency corresponding just to Nyquist threshold. At a thickness a few % to a few tens of % smaller than this, a little more contrast of the frequency corresponding to Nyquist threshold appears; however, this can be suppressed under the influence of the aforesaid diffraction.

In other filter embodiments where two filters are placed one upon another or one single filter is used, too, it is preferable to meet condition (17). When the upper limit of 0.45 is exceeded, the optical low-pass filter becomes too thick, contrary to size reduction requirements. When the lower limit of 0.15 is not reached, moiré removal becomes insufficient. In this condition, a should be 5 μm or less.

When a is 4 μm or less or where the optical low-pass filter is more susceptible to diffraction, it is preferable that $$0.13 < t_{LPF}/a < 0.42 \quad (17)'$$

Depending on the number of low-pass filters put on the horizontal pixel pitch, it is also acceptable to meet condition (17)":

$$0.3 < t_{LPF}/a < 0.4 \quad (17)''$$

where three filters are placed one upon another and 4≦a<5 μm, $$0.2 < t_{LPF}/a < 0.28$$

where two filters are placed one upon another and 4≦a<5 μm, $$0.1 < t_{LPF}/a < 0.16$$

where one filter is used 4≦a<5 μm, $$0.25 < t_{LPF}/a < 0.37$$

where three filters are placed one upon another and a<4 μm, $$0.16 < t_{LPF}/a < 0.25$$

where two filters are placed one upon another and a<4 μm, $$0.08 < t_{LPF}/a < 0.14$$

where one filter is used and a<4 μm.

When an image pickup device having a small pixel pitch is used, there is degradation in image quality under the influence of diffraction effect by stop-down. In this case, the electronic image pickup system is designed in such a way as to have a plurality of apertures each of fixed aperture size, one of which can be inserted into any one of optical paths between the lens surface located nearest to the image side of the lens group A and the lens surface located nearest to the object side of the lens group B and can be replaced with another as well, so that illuminance on the image plane can be adjusted. Then, media whose transmittances with respect to 550 nm are different but less than 80% are filled in some of the plurality of apertures for light quantity control. Alternatively, when control is carried out in such a way as to provide a light quantity corresponding to such an F-number as given by a (μm)/F-number<4.0, it is preferable to fill the apertures with medium whose transmittance with respect to 550 nm are different but less than 80%. In the range of the full-aperture value to values deviating from the aforesaid condition as an example, any medium is not used or dummy media having a transmittance of at least 91% with respect to 550 nm are used. In the range of the aforesaid condition, it is preferable to control the quantity of light with an ND filter or the like, rather than to decrease the diameter of the aperture stop to such an extent that the influence of diffraction appears.

Alternatively, it is acceptable to uniformly reduce the diameters of a plurality of apertures inversely with the F-numbers, so that optical low-pass filters having different frequency characteristics can be inserted in place of ND filters. As degradation by diffraction becomes worse with stop-down, it is desirable that the smaller the aperture diameter, the higher the frequency characteristics the optical low-pass filters have.

In the case where F>a where F is a full-aperture F number at the wide-angle end and a is the pixel pitch in μm, it is noted that the optical low-pass filter may be dispensed with. In other words, all media on the optical path between the zoom lens system and the image pickup device may be defined by air or non-crystalline media. This is because thanks to degradation of the image-formation capability by diffraction and geometrical aberrations, there is little or no frequency component that may possibly produce turn-back aberrations.

In the present invention, in consideration of size reductions of the front lens and the telecentric exit pupil and for the purpose of prevention of changes of F-number with zooming, the aperture stop, located on the object side of the lens group B. is designed to move in unison with the lens group B during zooming. On the other hand, the lens surface nearest to the image side of the lens group A, which comes closest to the aperture stop at the telephoto end or upon the zoom lens received in a collapsible lens mount, is configured to be convex toward the aperture stop. To avoid mechanical interferences, much space is taken between the lens groups A and B; however, this counts against size reductions. Thus, while the fact that the pixel pitch is small and the image-formation capability is best in a full-aperture state is utilized, it is preferable that an aperture stop having a fixed inside diameter is always used in the full-aperture state. The lens surface located nearest to the object side of the lens group B and defining another lens surface adjacent to the aperture stop is configured to be convex toward the aperture stop. When this lens surface is passed through the aperture of the aperture stop, there is no useless space due to the stop, contributing to length reductions of the zoom lens. It is also preferably to locate an optical element (that, where possible, has planar entrance and exit surfaces) having a transmittance of up to 90% in any optical axis-including space spaced away from the aperture stop with one lens surface interposed between them (for the space an air space having opposite convex surfaces is preferable), or have means that allows that optical element to be replaced by an optical element having a different transmittance.

Still other objects and advantages of the invention will in part be obvious and will in part be apparent from the specification.

The invention accordingly comprises the features of construction, combinations of elements, and arrangement of parts that will be exemplified in the construction hereinafter set forth, and the scope of the invention will be indicated in the claims.

BRIEF DESCRIPTION OF THE DRAWINGS

FIGS. 20(a), 20(b) and 20(c) are aberration diagrams for Example 3 upon focused on an object point at infinity.

FIGS. 26(a), 26(b) and 26(c) are aberration diagrams for Example 9 upon focused on an object point at infinity.

DESCRIPTION OF THE PREFERRED EMBODIMENTS

Examples 1 to 17 of the zoom lens of the present invention are now explained. Sectional lens configurations of these examples at the wide-angle end (a), in an intermediate state (b) and at the telephoto end (c) upon focused on an object point at infinity are shown in FIGS. 1 through 17 wherein G1 represents a first lens group, S a stop, G2 a second lens group, G3 a third lens group, capital P a group of plane-parallel plates such as infrared cut absorption filters, low-pass filters and cover glasses for CCD, and I the image plane of CCD. Instead of the infrared cut absorption filter, it is acceptable to use a transparent plane plate with a near-infrared sharp cut coat applied on the entrance surface or a low-pass filter that is directly provided with a near-infrared sharp cut coat.

EXAMPLE 1

Figure 1A:
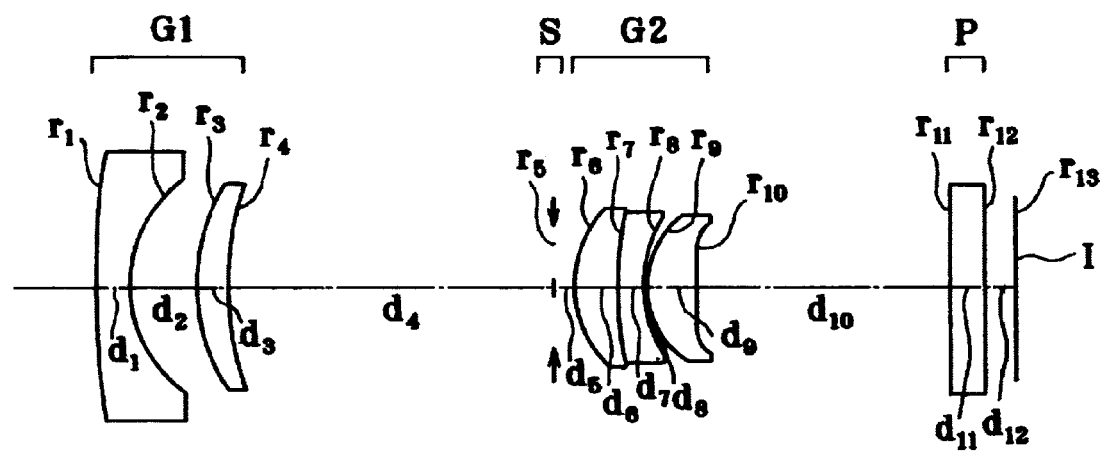
FIGS. 1(a), 1(b) and 1(c) are illustrative in section of Example 1 of the zoom lens used with the electronic imaging system of the present invention at the wide-angle end (a), in an intermediate state (b) and at the telephoto end (c) when the zoom lens is focused on an object point at infinity.
Figure 1B:
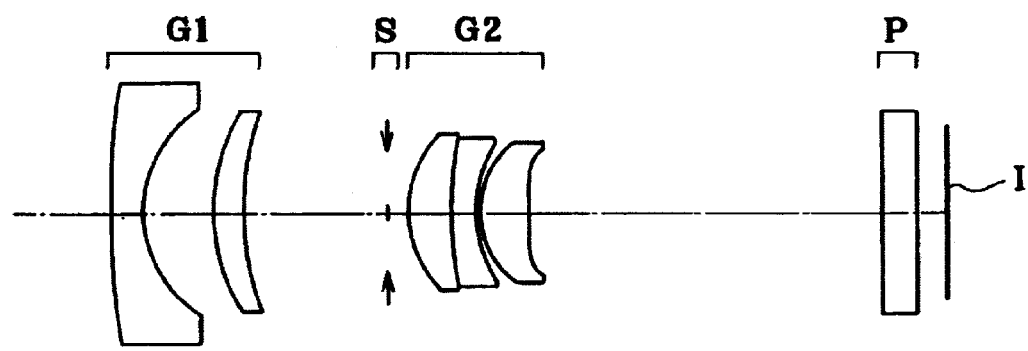
Figure 1C:
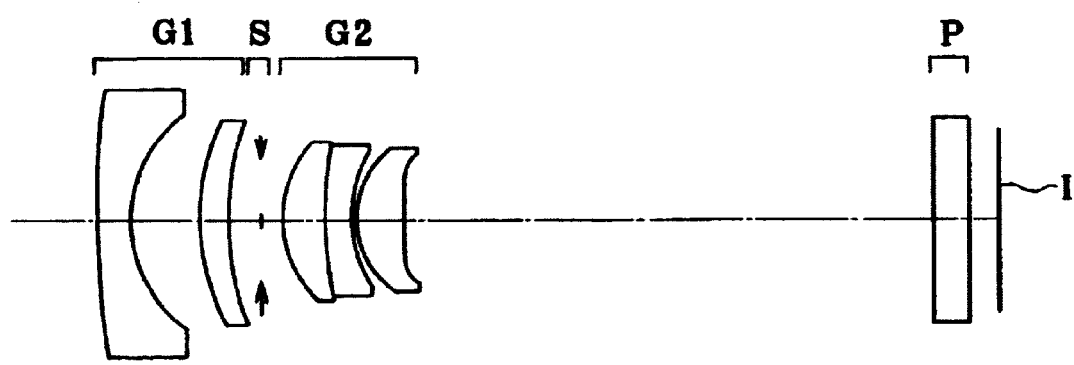

As shown in FIGS. 1(a), 1(b) and 1(c), Example 1 is directed to a zoom lens made up of a first lens group G1 having negative refracting power and composed of a negative meniscus lens convex on its object side and a positive meniscus lens convex on its object side, an aperture stop S, and a second lens group G2 having positive refracting power and composed of a doublet consisting of a positive meniscus lens convex on its object side and a negative meniscus lens convex on its object side and a positive meniscus lens convex on its object side. Upon zooming from the wide-angle end to the telephoto end of the zoom lens, the first lens group G1 moves in a convex locus toward the image plane side of the zoom lens and is positioned slightly nearer to the image plane side at the telephoto end than at the wide-angle end, and the second lens group G2 moves together with the aperture stop S toward the object side of the zoom lens.

Five aspheric surfaces are used; two at both surfaces of the negative meniscus lens in the first lens group G1, one at the object side-surface of the doublet in the second lens group G2 and two at both surfaces of the positive meniscus lens in the second lens group G2.

EXAMPLE 2

Figure 2A:
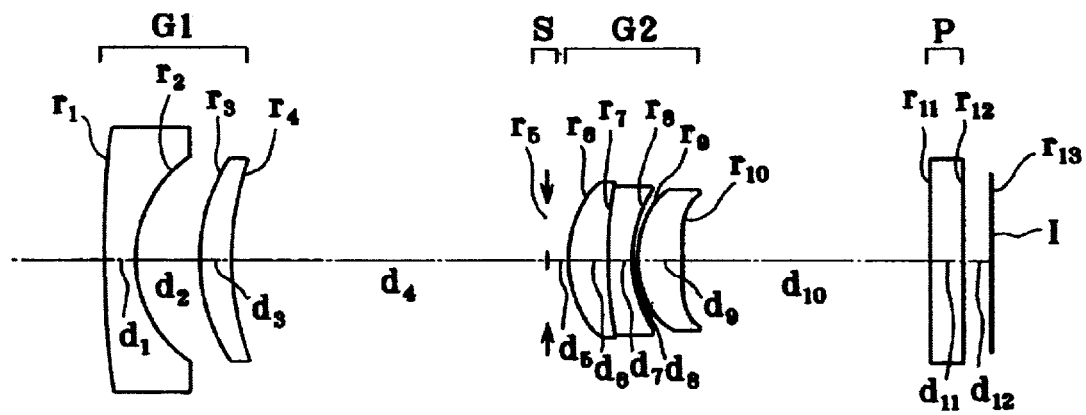
FIGS. 2(a), 2(b) and 2(c) are sectional views of Example 2 of the zoom lens, similar to FIGS. 1(a) to 1(c).
Figure 2B:
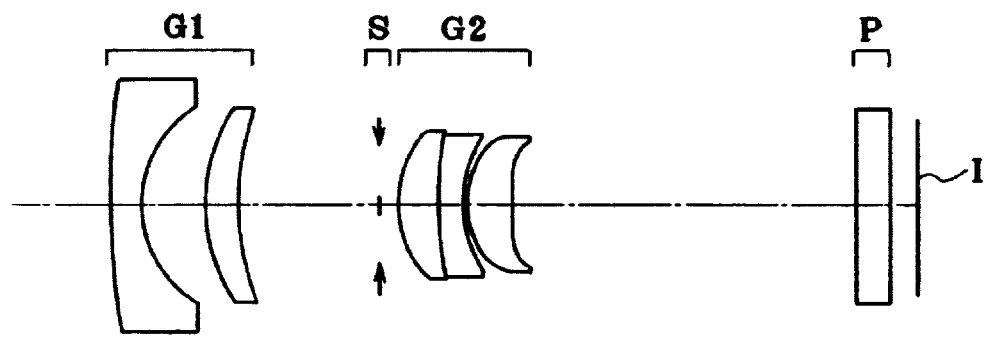
Figure 2C:
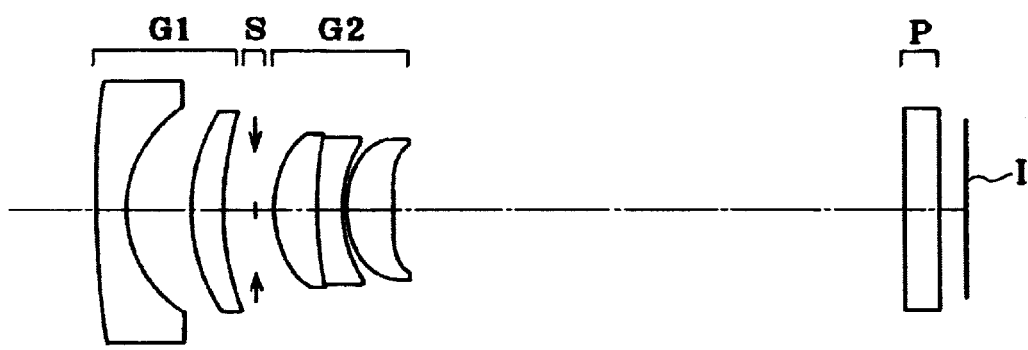

As shown in FIGS. 2(a), 2(b) and 2(c), Example 2 is directed to a zoom lens made up of a first lens group G1 having negative refracting power and composed of a negative meniscus lens convex on its object side and a positive meniscus lens on convex on its object side, an aperture stop S, and a second lens group G2 having positive refracting power and composed of a doublet consisting of a positive meniscus lens convex on its object side and a negative meniscus lens convex on its object side and a positive meniscus lens convex on its object side. Upon zooming from the wide-angle end to the telephoto end of the zoom lens, the first lens group G1 moves in a convex locus toward the image plane side of the zoom lens and is positioned slightly nearer to the image plane side at the telephoto end than at the wide-angle end, and the second lens group G2 moves together with the aperture stop S toward the object side of the zoom lens.

Five aspheric surfaces are used; two at both surfaces of the negative meniscus lens in the first lens group G1, one at the object side-surface of the doublet in the second lens group G2 and two at both surfaces of the positive meniscus lens in the second lens group G2.

EXAMPLE 3

Figure 3A:
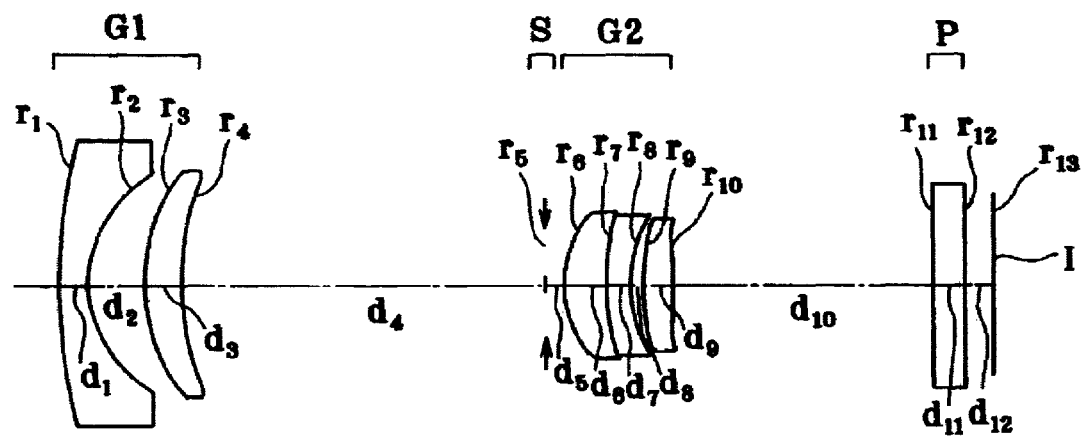
FIGS. 3(a), 3(b) and 3(c) are sectional views of Example 3 of the zoom lens, similar to FIGS. 1(a) to 1(c).
Figure 3B:
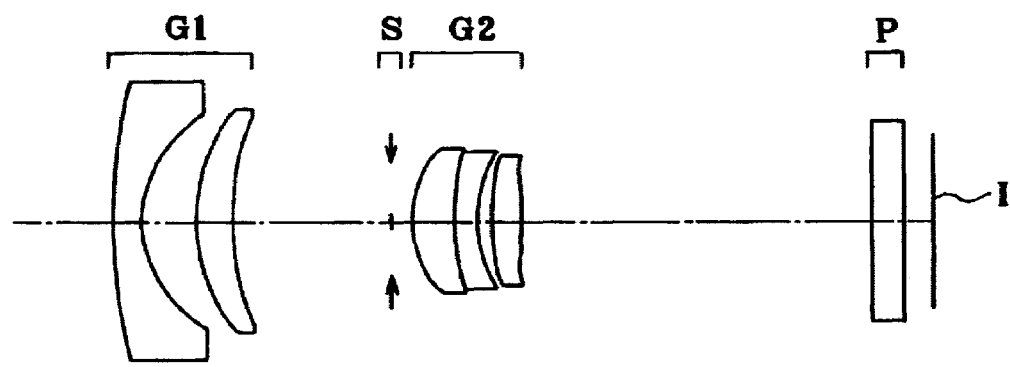
Figure 3C:
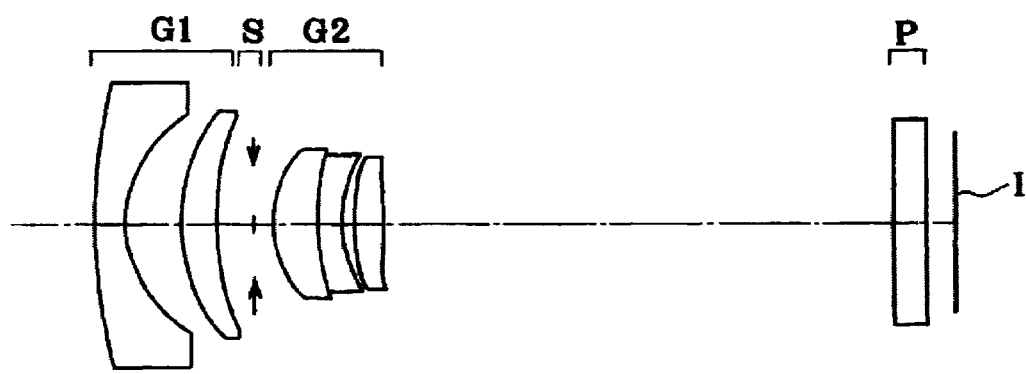

As shown in FIGS. 3(a), 3(b) and 3(c), Example 3 is directed to a zoom lens made up of a first lens group G1 having negative refracting power and composed of a negative meniscus lens convex on its object side and a positive meniscus lens on convex on its object side, an aperture stop S, and a second lens group G2 having positive refracting power and composed of a doublet consisting of a positive meniscus lens convex on its object side and a negative meniscus lens convex on its object side and a double-convex positive lens. Upon zooming from the wide-angle end to the telephoto end of the zoom lens, the first lens group G1 moves in a convex locus toward the image plane side of the zoom lens and is positioned slightly nearer to the image plane side at the telephoto end than at the wide-angle end, and the second lens group G2 moves together with the aperture stop S toward the object side of the zoom lens.

Five aspheric surfaces are used; two at both surfaces of the negative meniscus lens in the first lens group G1, one at the object side-surface of the doublet in the second lens group G2 and two at both surfaces of the double-convex positive lens in the second lens group G2.

EXAMPLE 4

Figure 4A:
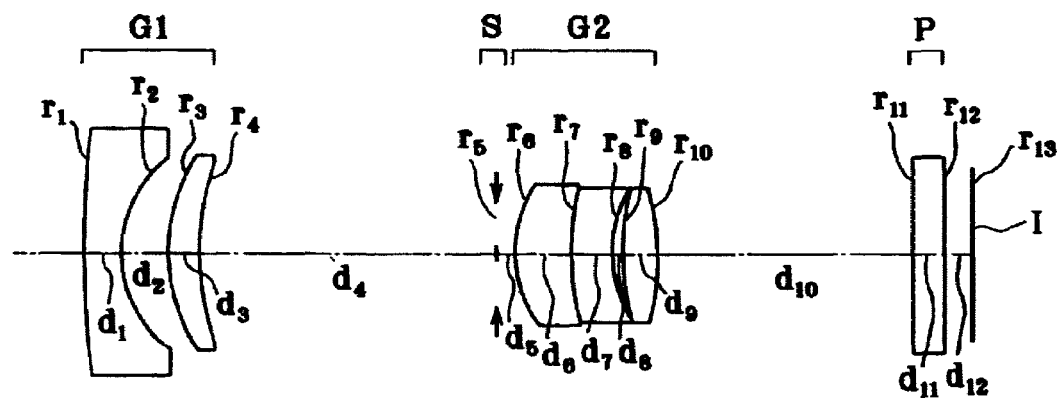
FIGS. 4(a), 4(b) and 4(c) are sectional views of Example 4 of the zoom lens, similar to FIGS. 1(a) to 1(c).
Figure 4B:
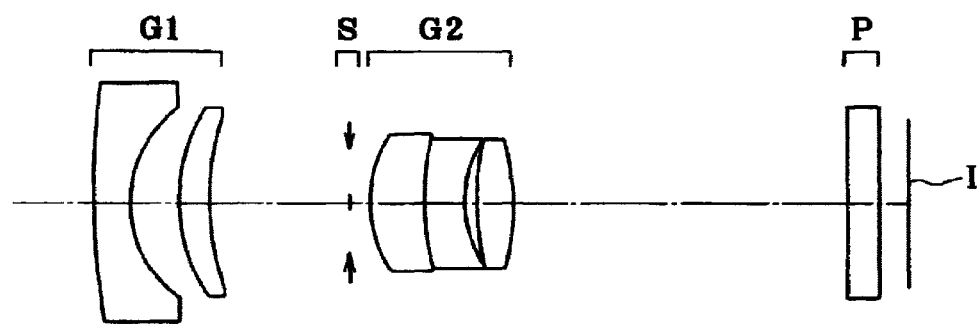
Figure 4C:
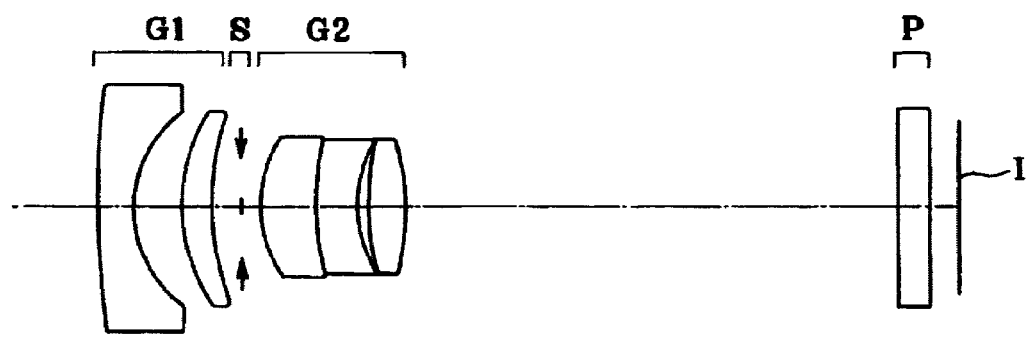

As shown in FIGS. 4(a), 4(b) and 4(c), Example 4 is directed to a zoom lens made up of a first lens group G1 having negative refracting power and composed of a negative meniscus lens convex on its object side and a positive meniscus lens on convex on its object side, an aperture stop S, and a second lens group G2 having positive refracting power and composed of a doublet consisting of a positive meniscus lens convex on its object side and a negative meniscus lens convex on its object side and a double-convex positive lens. Upon zooming from the wide-angle end to the telephoto end of the zoom lens, the first lens group G1 moves in a convex locus toward the image plane side of the zoom lens and is positioned slightly nearer to the image plane side at the telephoto end than at the wide-angle end, and the second lens group G2 moves together with the aperture stop S toward the object side of the zoom lens.

Three aspheric surfaces are used; two at both surfaces of the negative meniscus lens in the first lens group G1, and one at the object side-surface of the doublet in the second lens group G2.

EXAMPLE 5

Figure 5A:
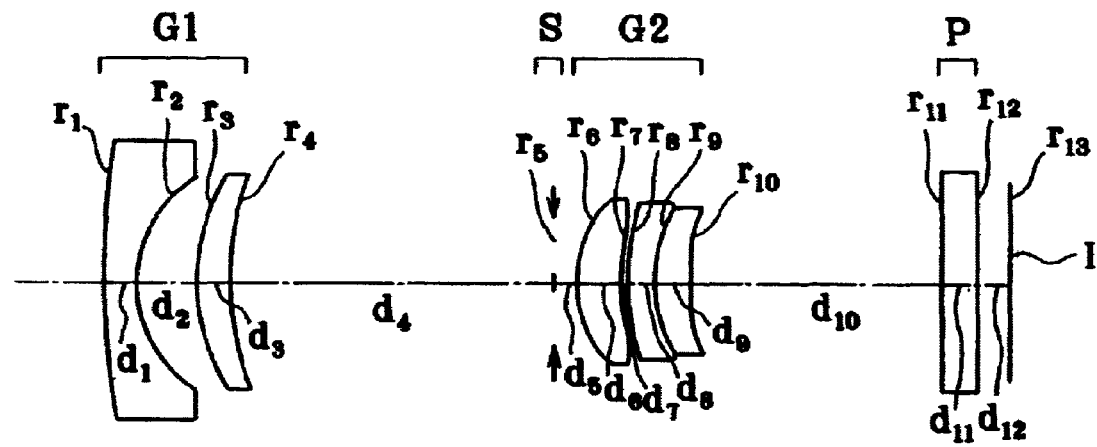
FIGS. 5(a), 5(b) and 5(c) are sectional views of Example 5 of the zoom lens, similar to FIGS. 1(a) to 1(c).
Figure 5B:
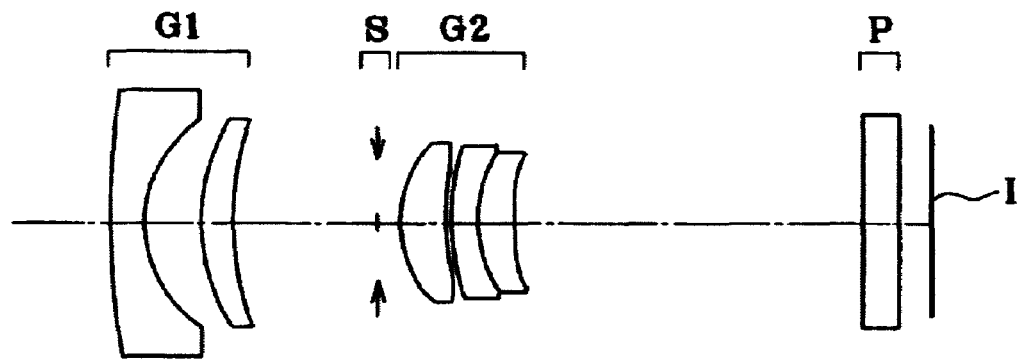
Figure 5C:
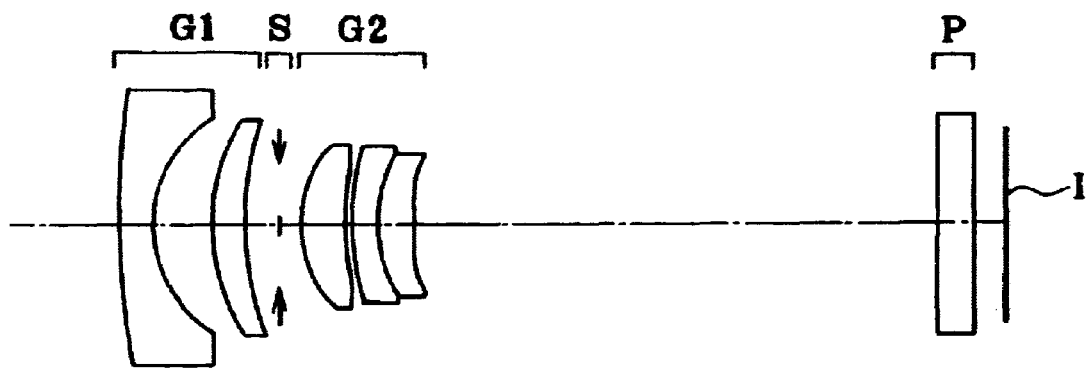

As shown in FIGS. 5(a), 5(b) and 5(c), Example 5 is directed to a zoom lens made up of a first lens group G1 having negative refracting power and composed of a negative meniscus lens convex on its object side and a positive meniscus lens on convex on its object side, an aperture stop S, and a second lens group G2 having positive refracting power and composed of a positive meniscus lens convex on its object side and a doublet consisting of a negative meniscus lens convex on its object side and a positive meniscus lens convex on its object side. Upon zooming from the wide-angle end to the telephoto end of the zoom lens, the first lens group G1 moves in a convex locus toward the image plane side of the zoom lens and is positioned slightly nearer to the image plane side at the telephoto end than at the wide-angle end, and the second lens group G2 moves together with the aperture stop S toward the object side of the zoom lens.

Five aspheric surfaces are used; two at both surfaces of the negative meniscus lens in the first lens group G1, two at both surface of the positive meniscus lens in the second lens group G2 and one at the image plane side-surface of the doublet in the second lens group G2.

EXAMPLE 6

Figure 6A:
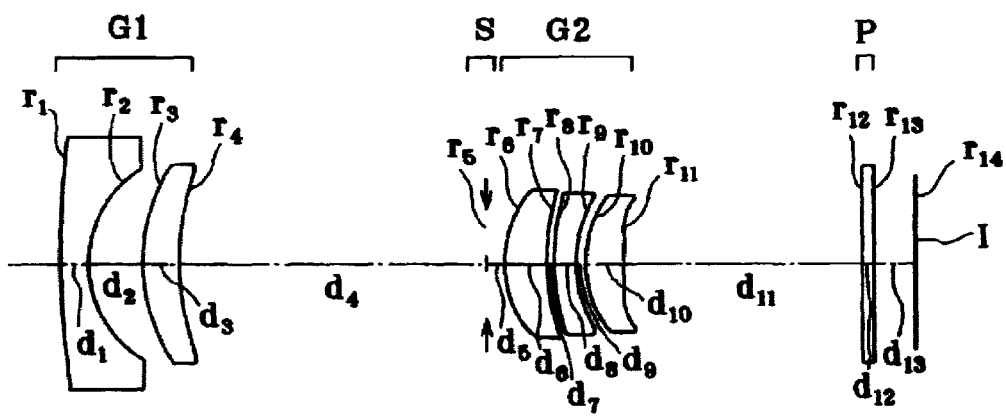
FIGS. 6(a), 6(b) and 6(c) are sectional views of Example 6 of the zoom lens, similar to FIGS. 1(a) to 1(c).
Figure 6B:
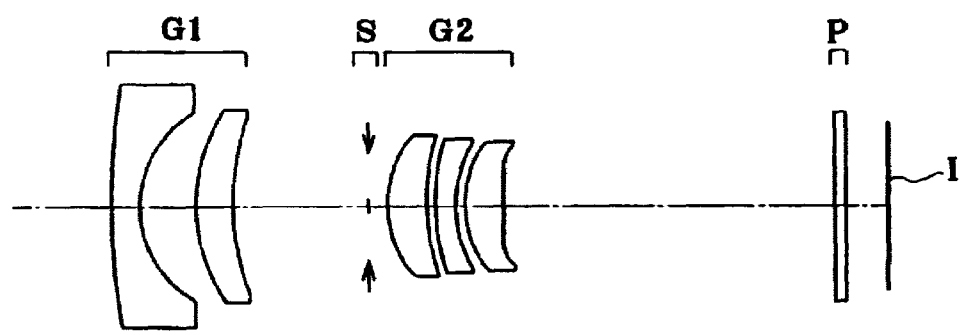
Figure 6C:
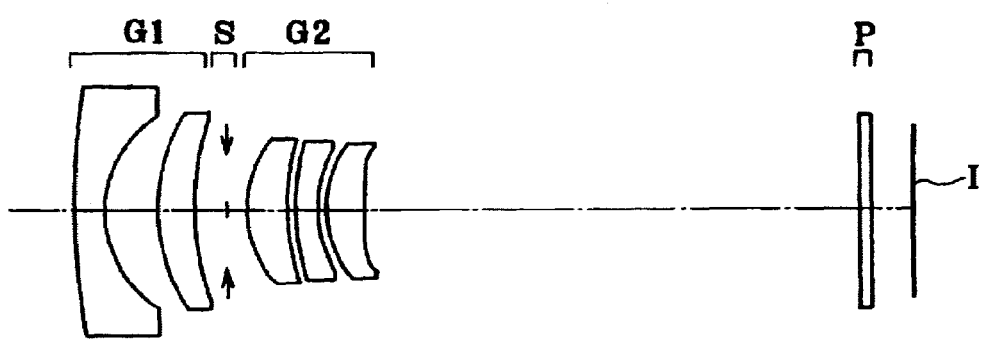

As shown in FIGS. 6(a), 6(b) and 6(c), Example 6 is directed to a zoom lens made up of a first lens group G1 having negative refracting power and composed of a negative meniscus lens convex on its object side and a positive meniscus lens on convex on its object side, an aperture stop S, and a second lens group G2 having positive refracting power and composed of a positive meniscus lens convex on its object side, a negative meniscus lens convex on its object side and a positive meniscus lens convex on its object side. Upon zooming from the wide-angle end to the telephoto end of the zoom lens, the first lens group G1 moves in a convex locus toward the image plane side of the zoom lens and is positioned slightly nearer to the image plane side at the telephoto end than at the wide-angle end, and the second lens group G2 moves together with the aperture stop S toward the object side of the zoom lens.

Five aspheric surfaces are used; two at both surfaces of the negative meniscus lens in the first lens group G1, one at the object side-surface of the positive meniscus lens on the object side of the second lens group G2 and two at both surfaces of the positive meniscus lens on the image side of the second lens group G2.

EXAMPLE 7

Figure 7A:
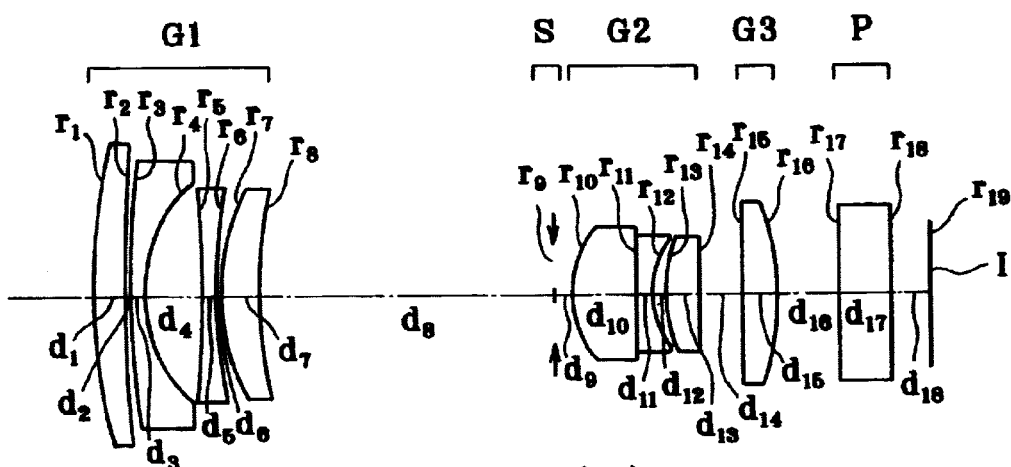
FIGS. 7(a), 7(b) and 7(c) are sectional views of Example 7 of the zoom lens, similar to FIGS. 1(a) to 1(c).
Figure 7B:
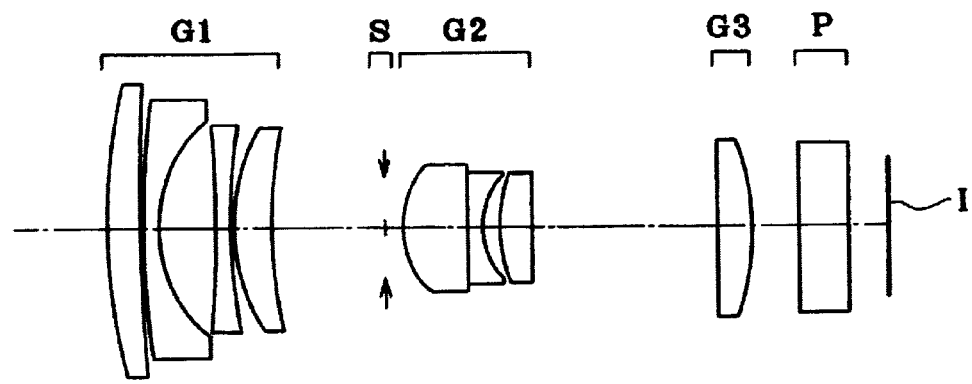
Figure 7C:
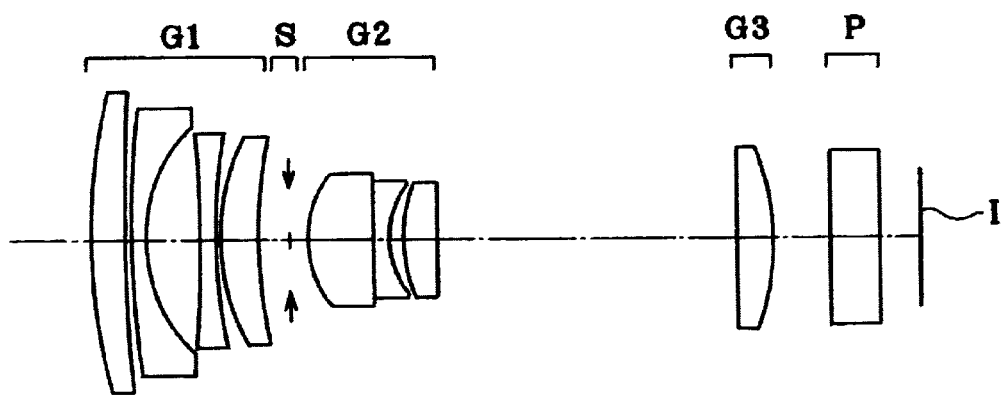

As shown in FIGS. 7(a), 7(b) and 7(c), Example 7 is directed to a zoom lens made up of a first lens group G1 having negative refracting power and composed of a negative meniscus lens convex on its object side and a positive meniscus lens on convex on its object side, an aperture stop S, a second lens group G2 having positive refracting power and composed of a doublet consisting of a positive meniscus lens convex on its object side and a negative meniscus lens convex on its object side and a double-convex positive lens, and a third lens group G3 having positive refracting power and composed of one positive meniscus lens convex on its image plane side. Upon zooming from the wide-angle end to the telephoto end of the zoom lens, the first lens group G1 moves in a convex locus toward the image plane side of the zoom lens and is positioned slightly nearer to the image plane side at the telephoto end than at the wide-angle end, the second lens group G2 moves together with the aperture stop S toward the object side of the zoom lens, and the third lens group G3 moves in a convex locus toward the image plane side and is positioned slightly nearer to the image plane side at the telephoto end than at the wide-angle end.

Two aspheric surfaces are used; one at the object side-surface of the doublet in the second lens group G2 and another at the object side-surface of the double-convex positive lens in the second lens group G2.

EXAMPLE 8

Figure 8A:
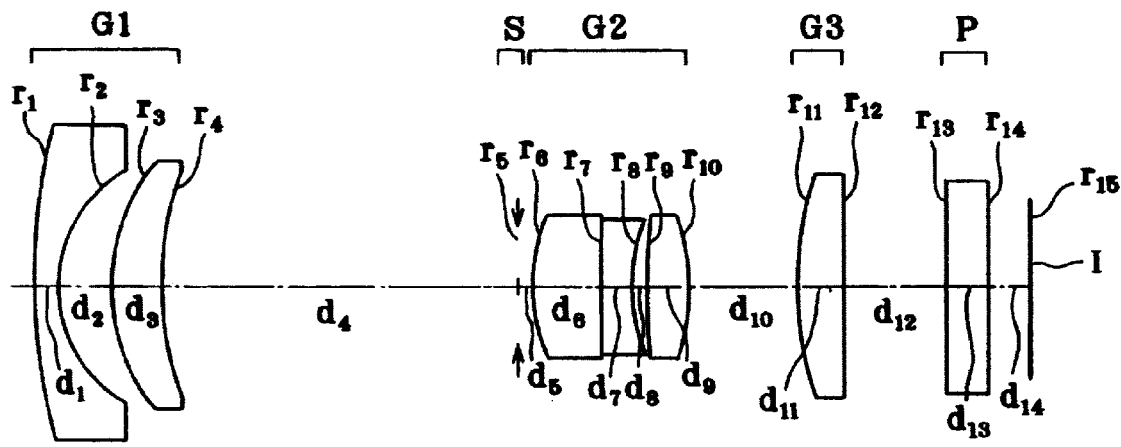
FIGS. 8(a), 8(b) and 8(c) are sectional views of Example 8 of the zoom lens, similar to FIGS. 1(a) to 1(c).
Figure 8B:
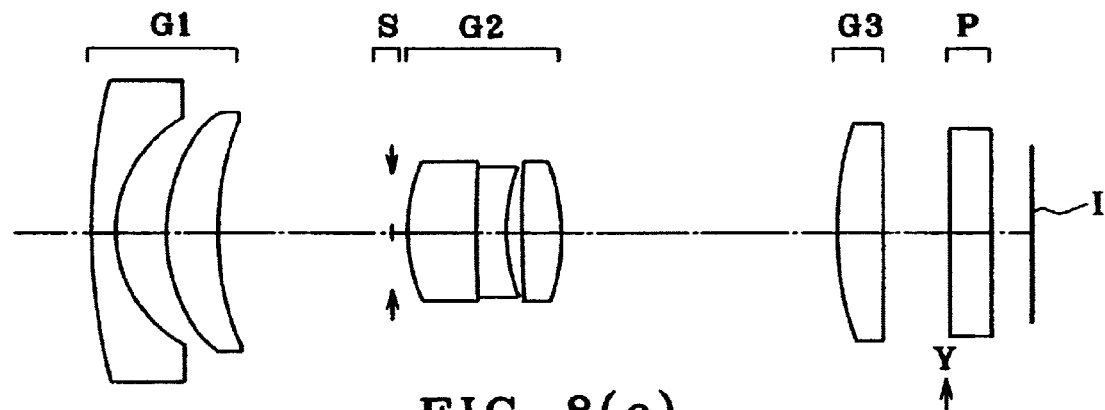
Figure 8C:
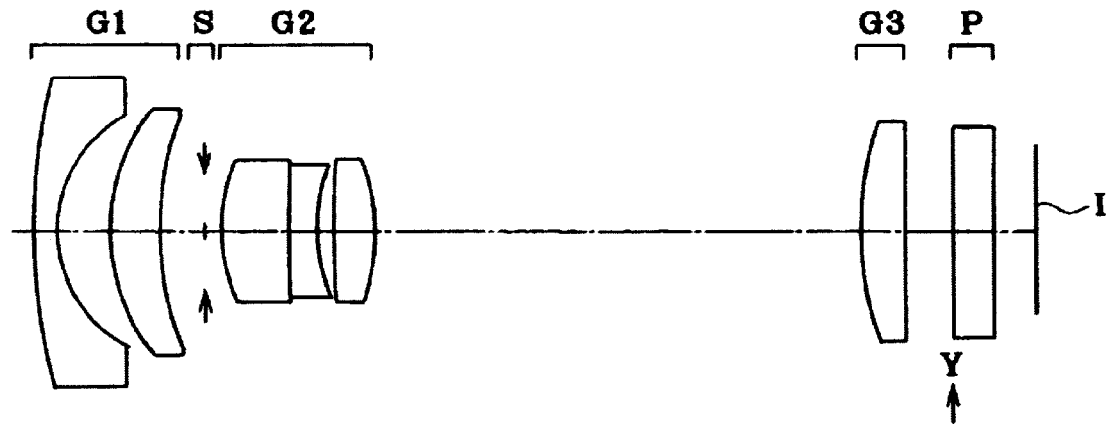

As shown in FIGS. 8(a), 8(b) and 8(c), Example 8 is directed to a zoom lens made up of a first lens group G1 having negative refracting power and composed of a negative meniscus lens convex on its object side and a positive meniscus lens on convex on its object side, an aperture stop S, a second lens group G2 having positive refracting power and composed of a doublet consisting of a positive meniscus lens convex on its object side and a negative meniscus lens convex on its object side and a double-convex positive lens, and a third lens group G3 having positive refracting power and composed of one positive meniscus lens convex on its object side. Upon zooming from the wide-angle end to the telephoto end of the zoom lens, the first lens group G1 moves in a convex locus toward the image plane side of the zoom lens and is positioned slightly nearer to the object side at the telephoto end than at the wide-angle end, the second lens group G2 moves together with the aperture stop S toward the object side of the zoom lens, and the third lens group G3 moves slightly toward the image plane side.

Two aspheric surfaces are used; one at the image plane side-surface of the negative meniscus lens in the first lens group G1 and another at the object side-surface of the doublet in the second lens group G2.

EXAMPLE 9

Figure 9A:
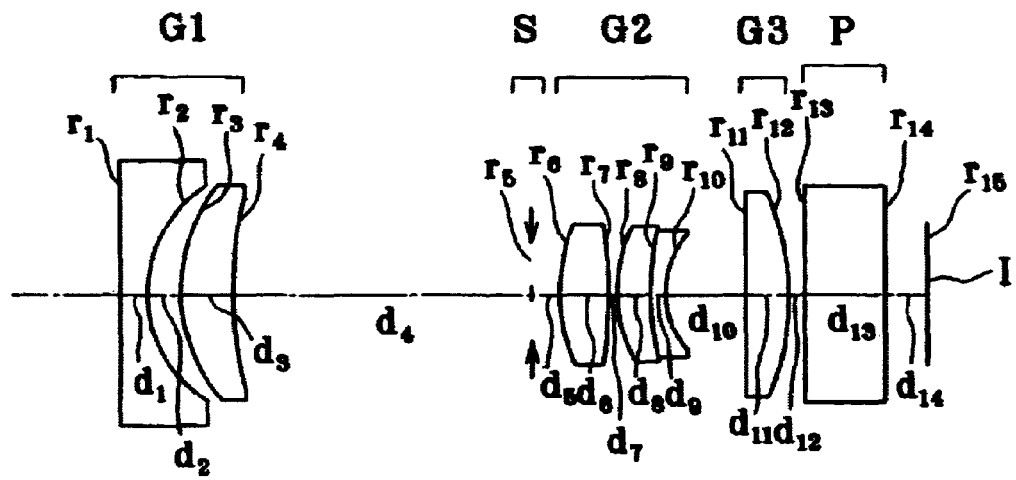
FIGS. 9(a), 9(b) and 9(c) are sectional views of Example 9 of the zoom lens, similar to FIGS. 1(a) to 1(c).
Figure 9B:
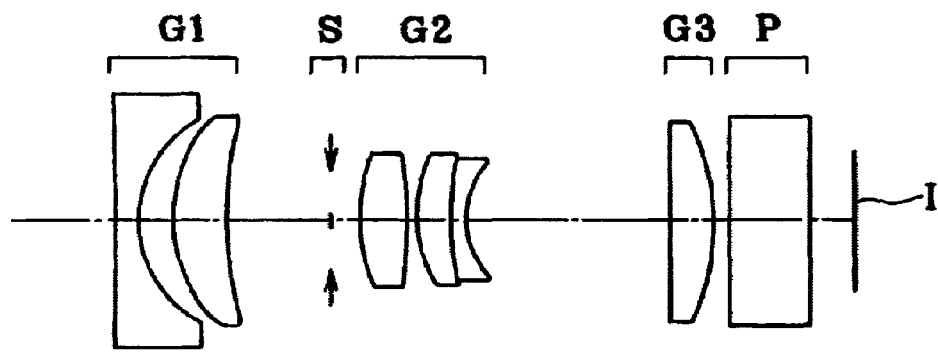
Figure 9C:
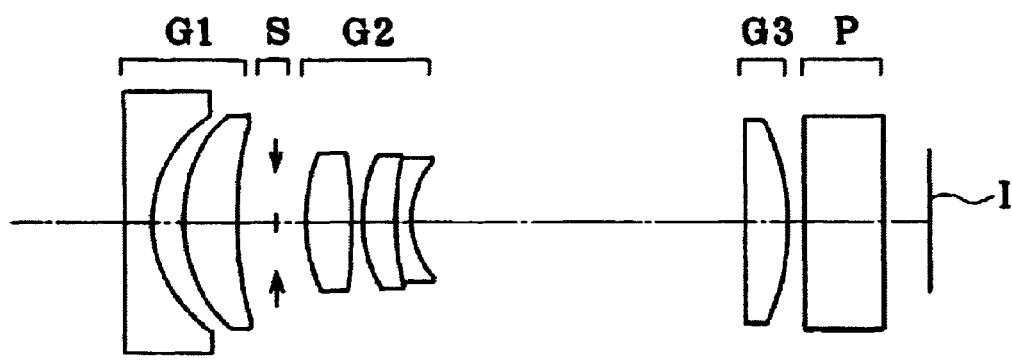

As shown in FIGS. 9(a), 9(b) and 9(c), Example 9 is directed to a zoom lens made up of a first lens group G1 having negative refracting power and composed of a negative meniscus lens convex on its object side and a positive meniscus lens convex on its object side, an aperture stop S, a second lens group G2 having positive refracting power and composed of a double-convex positive lens and a doublet consisting of a positive meniscus lens convex on its object side and a negative meniscus lens convex on its object side, and a third lens group G3 composed of one double-convex positive lens. Upon zooming from the wide-angle end to the telephoto end of the zoom lens, the first lens group G1 moves in a convex locus toward the image plane side of the zoom lens and is positioned slightly nearer to the image plane side at the telephoto end than at the wide-angle end, the second lens group G2 moves together with the aperture stop S toward the object side of the zoom lens, and the third lens group G3 remains fixed.

Three aspheric surfaces are used; one at the image plane side-surface of the negative meniscus lens in the first lens group G1, one at the object side-surface of the double-convex positive lens in the second lens group G2, and one at the image plane side-surface of the double-convex positive lens in the third lens group G3.

EXAMPLE 10

Figure 10A:
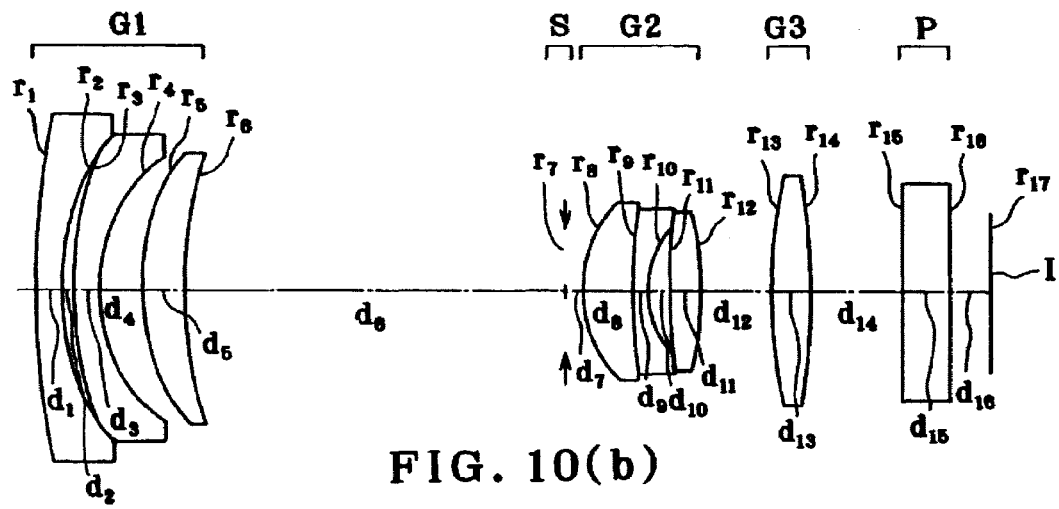
FIGS. 10(a), 10(b) and 10(c) are sectional views of Example 10 of the zoom lens, similar to FIGS. 1(a) to 1(c).
Figure 10B:
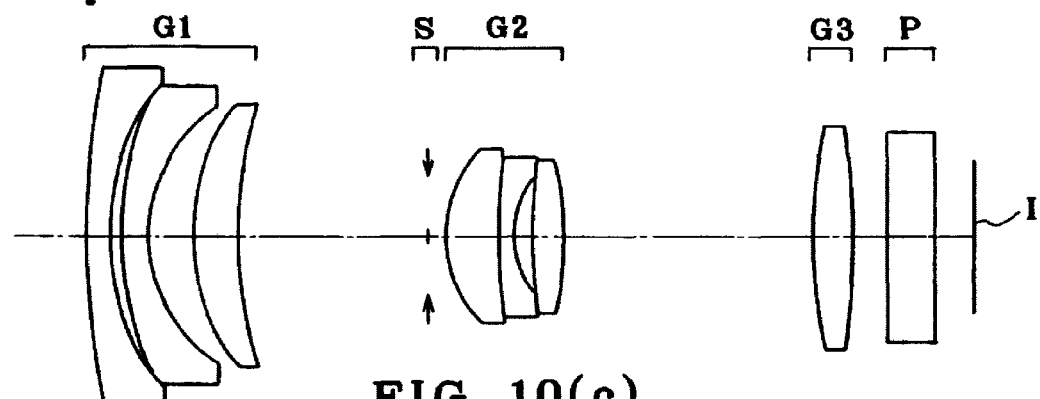
Figure 10C:
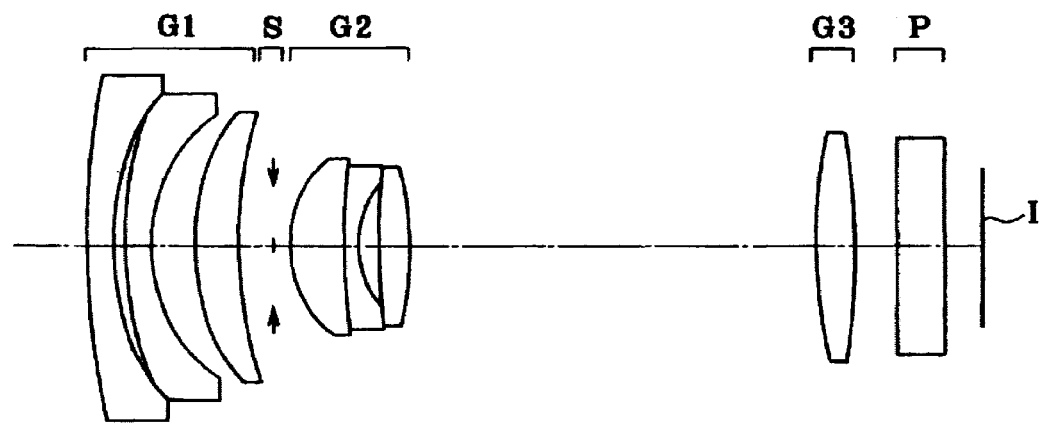

As shown in FIGS. 10(a), 10(b) and 10(c), Example 10 is directed to a zoom lens made up of a first lens group G1 having negative refracting power and composed of a two negative meniscus lenses each convex on its object side and a positive meniscus lens convex on its object side, an aperture stop S, a second lens group G2 having positive refracting power and composed of a doublet consisting of a positive meniscus lens convex on its object side and a negative meniscus lens convex on its object side and a double-convex positive lens, and a third lens group G3 having positive refracting power and composed of one double-convex positive lens. Upon zooming from the wide-angle end to the telephoto end of the zoom lens, the first lens group G1 moves in a convex locus toward the image plane side of the zoom lens and is positioned slightly nearer to the image plane side at the telephoto end than at the wide-angle end, the second lens group G2 moves together with the aperture stop S toward the object side of the zoom lens, and the third lens group G3 moves in a convex locus toward the image plane side and is positioned nearer to the image plane side at the telephoto end than at the wide-angle end.

Two aspheric surfaces are used; one at the object side-surface of the second negative meniscus lens in the first lens group G1, and another at the object side-surface of the doublet in the second lens group G2.

EXAMPLE 11

Figure 11A:
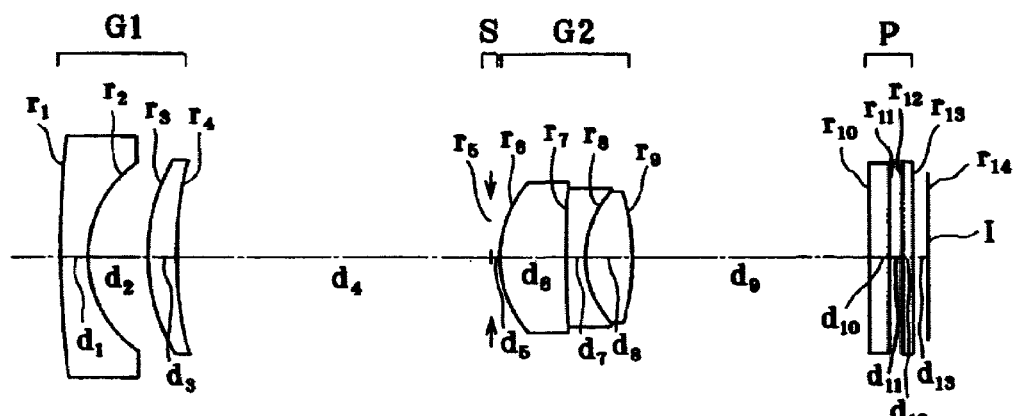
FIGS. 11(a), 11(b) and 11(c) are sectional views of Example 11 of the zoom lens, similar to FIGS. 1(a) to 1(c).
Figure 11B:
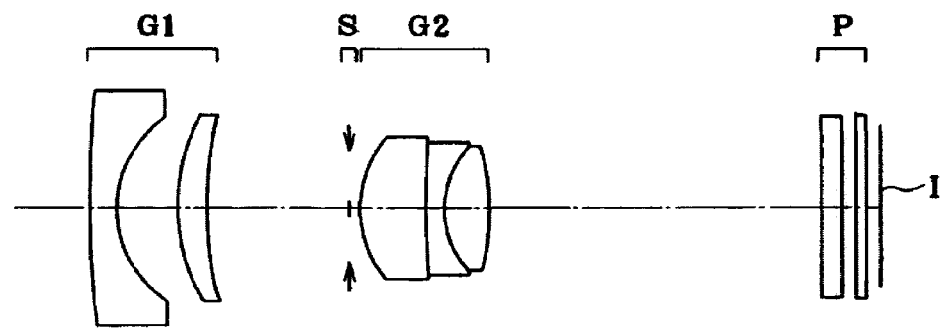
Figure 11C:
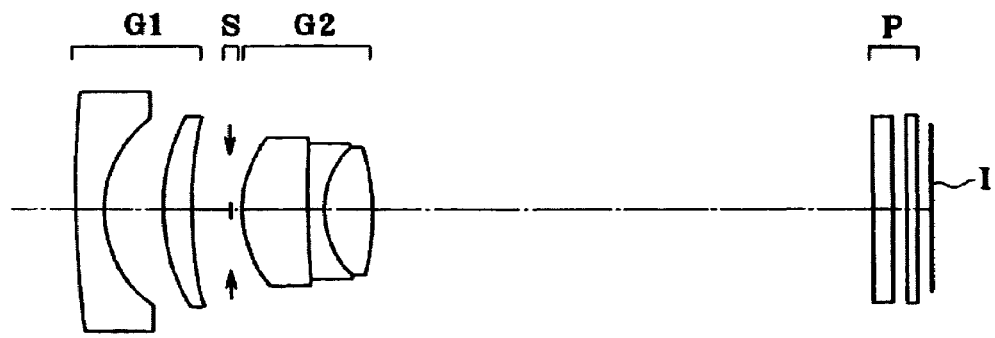

As shown in FIGS. 11(a), 11(b) and 11(c), Example 11 is directed to a zoom lens made up of a first lens group G1 having negative refracting power and composed of a negative meniscus lens convex on its object side and a positive meniscus lens convex on its object side, an aperture stop S, and a second lens group G2 having positive refracting power and composed of a triplet consisting of a positive meniscus lens convex on its object side, a negative meniscus lens convex on its object side and a double-convex positive lens. Upon zooming from the wide-angle end to the telephoto end of the zoom lens, the first lens group G1 moves in a convex locus toward the image plane side of the zoom lens and is positioned slightly nearer to the image plane side at the telephoto end than at the wide-angle end, and the second lens group G2 moves together with the aperture stop S toward the object side.

Four aspheric surfaces are used; two at both surfaces of the negative meniscus lens in the first lens group G1, one at the surface located nearest to the object side of the triplet in the second lens group G2, and one at the surface nearest to the image plane side of the triplet in the second lens group G2.

EXAMPLE 12

Figure 12A:
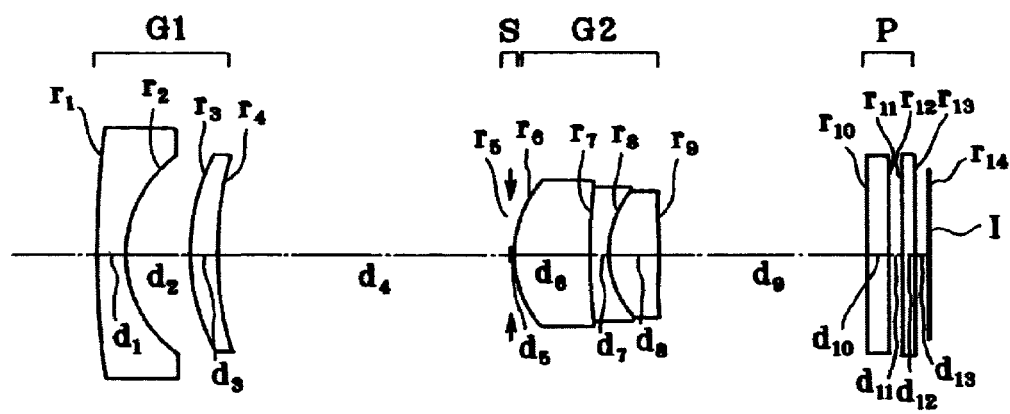
FIGS. 12(a), 12(b) and 12(c) are sectional views of Example 12 of the zoom lens, similar to FIGS. 1(a) to 1(c).
Figure 12B:
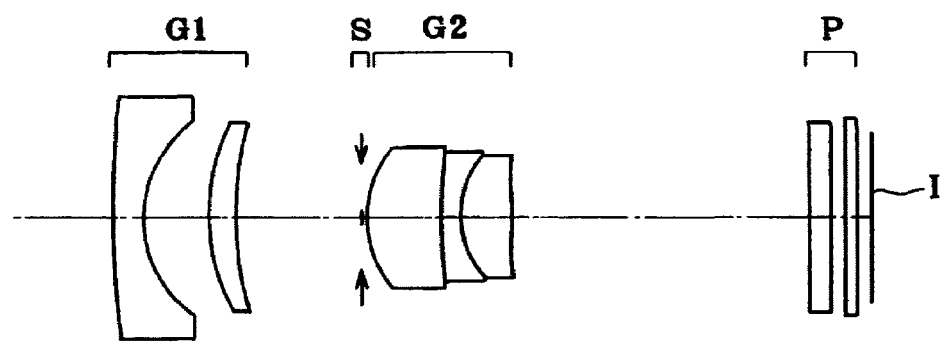
Figure 12C:
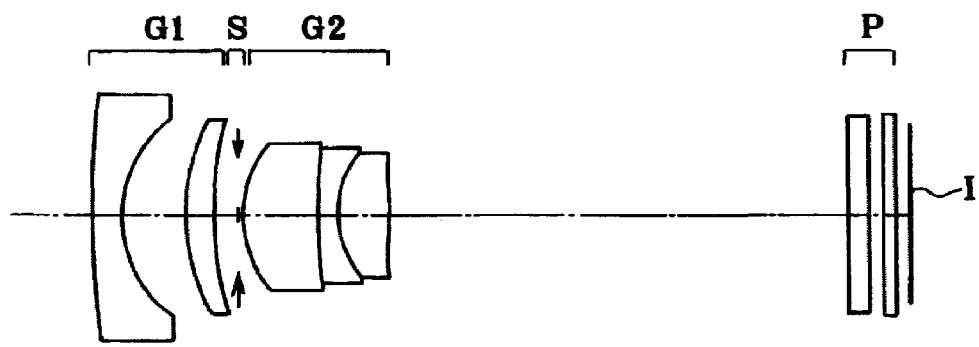

As shown in FIGS. 12(*a*), 12(*b*) and 12(*c*), Example 12 is directed to a zoom lens made up of a first lens group G1 having negative refracting power and composed of a negative meniscus lens convex on its object side and a positive meniscus lens convex on its object side, an aperture stop S, and a second lens group G2 having positive refracting power and composed of a triplet consisting of a positive meniscus lens convex on its object side, a negative meniscus lens convex on its object side and a double-convex positive lens. Upon zooming from the wide-angle end to the telephoto end of the zoom lens, the first lens group G1 moves in a convex locus toward the image plane side of the zoom lens and is positioned slightly nearer to the image plane side at the telephoto end than at the wide-angle end, and the second lens group G2 moves together with the aperture stop S toward the object side.

Four aspheric surfaces are used; two at both surfaces of the negative meniscus lens in the first lens group G1, one at the surface located nearest to the object side of the triplet in the second lens group G2, and one at the surface nearest to the image plane side of the triplet in the second lens group G2.

EXAMPLE 13

Figure 13A:
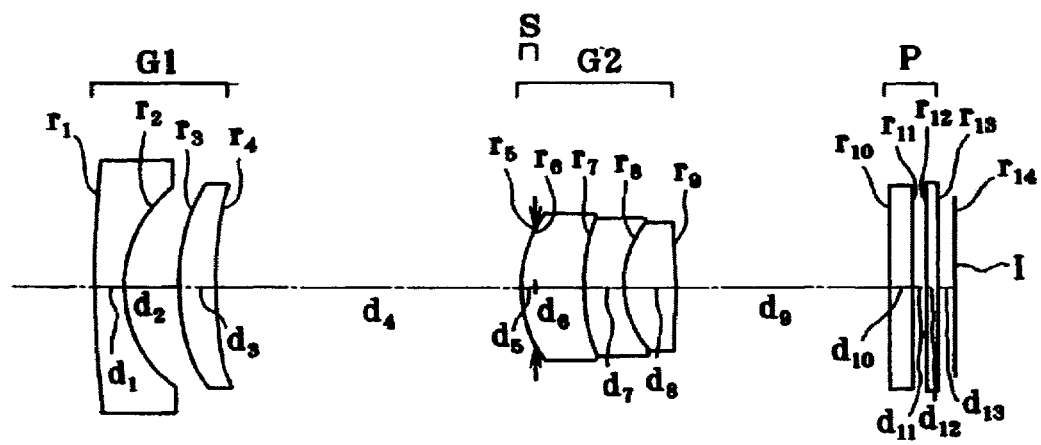
FIGS. 13(a), 13(b) and 13(c) are sectional views of Example 13 of the zoom lens, similar to FIGS. 1(a) to 1(c).
Figure 13B:
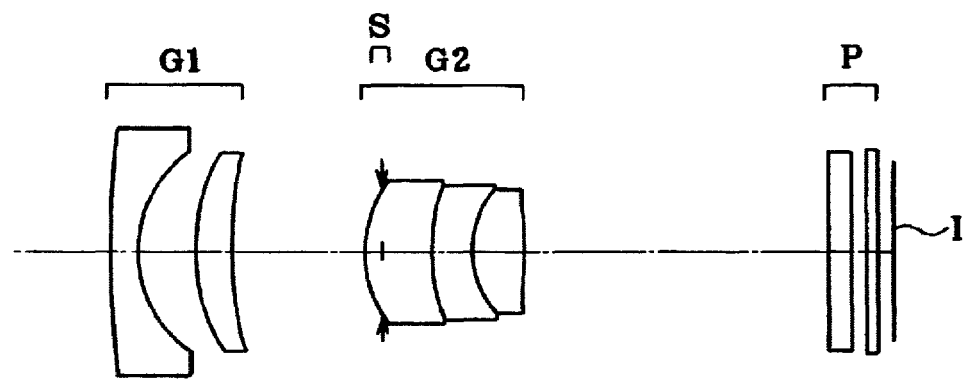
Figure 13C:
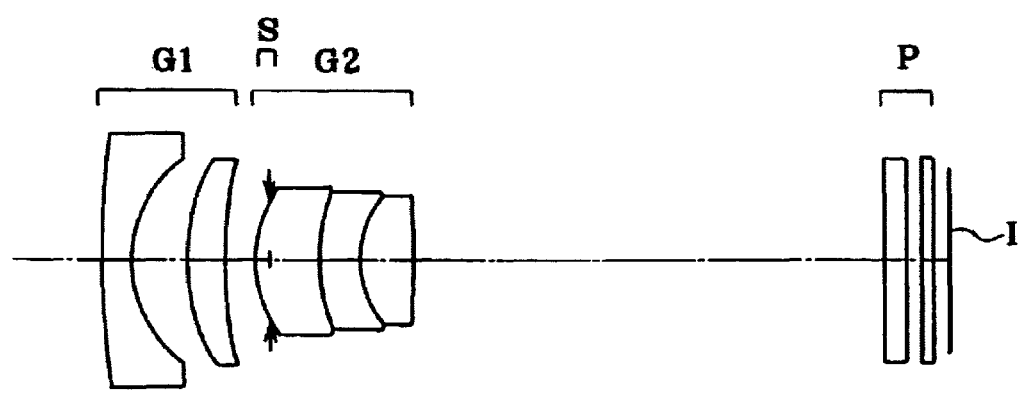

As shown in FIGS. 13(*a*), 13(*b*) and 13(*c*), Example 13 is directed to a zoom lens made up of a first lens group G1 having negative refracting power and composed of a negative meniscus lens convex on its object side and a positive meniscus lens convex on its object side, an aperture stop S, and a second lens group G2 having positive refracting power and composed of a triplet consisting of a positive meniscus lens convex on its object side, a negative meniscus lens convex on its object side and a double-convex positive lens. Upon zooming from the wide-angle end to the telephoto end of the zoom lens, the first lens group G1 moves in a convex locus toward the image plane side of the zoom lens and is positioned slightly nearer to the image plane side at the telephoto end than at the wide-angle end, and the second lens group G2 moves together with the aperture stop S toward the object side.

Four aspheric surfaces are used; two at both surfaces of the negative meniscus lens in the first lens group G1, one at the surface located nearest to the object side of the triplet in the second lens group G2, and one at the surface nearest to the image plane side of the triplet in the second lens group G2.

In this example, the surface-to-surface spacing between the stop S and the convex surface on the entrance side of the second lens group G2 has a minus value in the numerical data given later, because the convex surface on the entrance side of the second lens group G2 is placed in the aperture in the stop S.

EXAMPLE 14

Figure 14A:
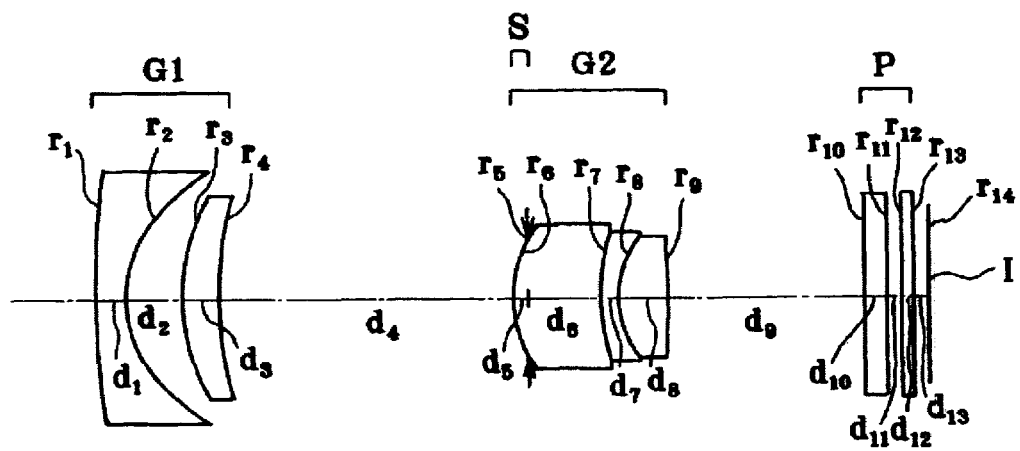
FIGS. 14(a), 14(b) and 14(c) are sectional views of Example 14 of the zoom lens, similar to FIGS. 1(a) to 1(c).
Figure 14B:
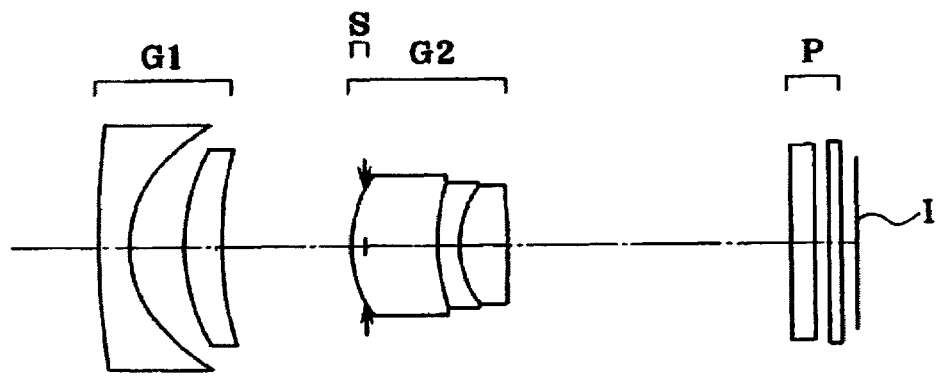
Figure 14C:
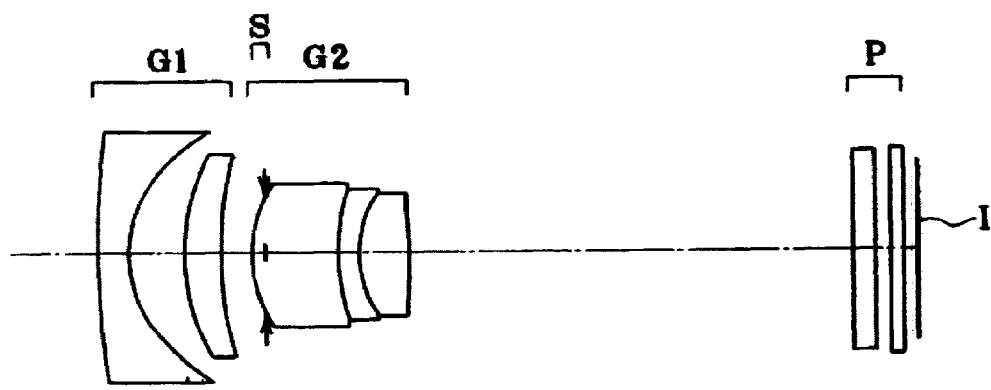

As shown in FIGS. 14(*a*), 14(*b*) and 14(*c*), Example 14 is directed to a zoom lens made up of a first lens group G1 having negative refracting power and composed of a negative meniscus lens convex on its object side and a positive meniscus lens convex on its object side, an aperture stop S, and a second lens group G2 having positive refracting power and composed of a triplet consisting of a positive meniscus lens convex on its object side, a negative meniscus lens convex on its object side and a double-convex positive lens. Upon zooming from the wide-angle end to the telephoto end of the zoom lens, the first lens group G1 moves in a convex locus toward the image plane side of the zoom lens and is positioned slightly nearer to the image plane side at the telephoto end than at the wide-angle end, and the second lens group G2 moves together with the aperture stop S toward the object side.

Four aspheric surfaces are used; two at both surfaces of the negative meniscus lens in the first lens group G1, one at the surface located nearest to the object side of the triplet in the second lens group G2, and one at the surface nearest to the image plane side of the triplet in the second lens group G2.

In this example, the surface-to-surface spacing between the stop S and the convex surface on the entrance side of the second lens group G2 has a minus value in the numerical data given later, because the convex surface on the entrance side of the second lens group G2 is placed in the aperture in the stop S.

EXAMPLE 15

Figure 15A:
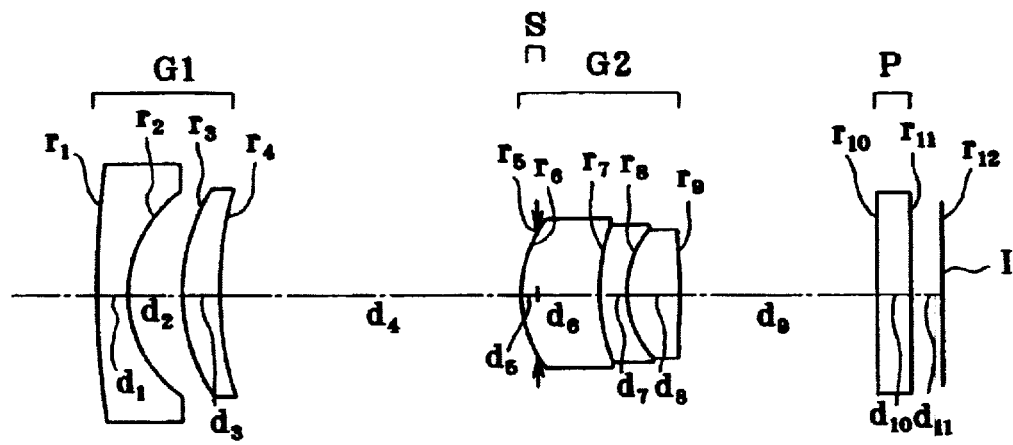
FIGS. 15(a), 15(b) and 15(c) are sectional views of Example 15 of the zoom lens, similar to FIGS. 1(a) to 1(c).
Figure 15B:
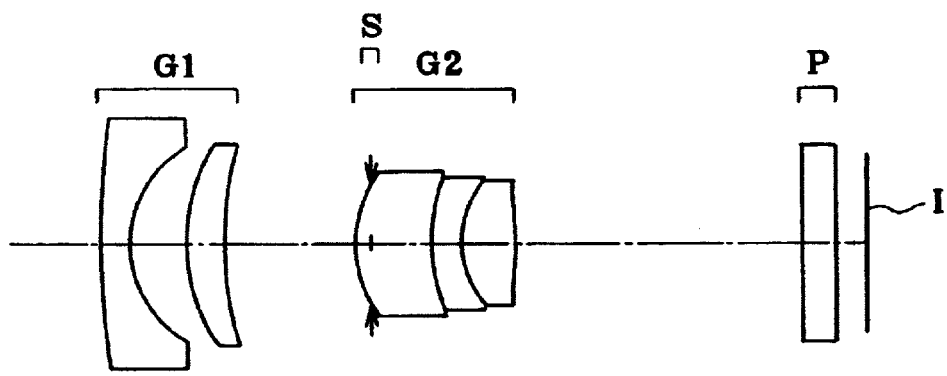
Figure 15C:
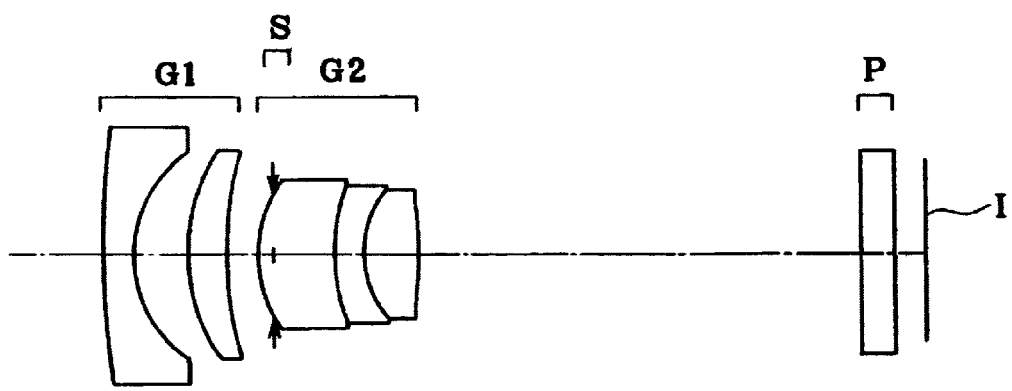

As shown in FIGS. 15(*a*), 15(*b*) and 15(*c*), Example 15 is directed to a zoom lens made up of a first lens group G1 having negative refracting power and composed of a negative meniscus lens convex on its object side and a positive meniscus lens convex on its object side, an aperture stop S, and a second lens group G2 having positive refracting power and composed of a triplet consisting of a positive meniscus lens convex on its object side, a negative meniscus lens convex on its object side and a double-convex positive lens. Upon zooming from the wide-angle end to the telephoto end of the zoom lens, the first lens group G1 moves in a convex locus toward the image plane side of the zoom lens and is positioned slightly nearer to the image plane side at the telephoto end than at the wide-angle end, and the second lens group G2 moves together with the aperture stop S toward the object side.

Three aspheric surfaces are used; one at the image plane side-surface of the negative meniscus lens in the first lens group G1, one at the surface located nearest to the object side of the triplet in the second lens group G2, and one at the surface nearest to the image plane side of the triplet in the second lens group G2.

Further in this example, two cementing surfaces in the triplet in the second lens group G2 are each multi-coated with a multilayer film so as to prevent reflection at those surfaces.

In this example, the surface-to-surface spacing between the stop S and the convex surface on the entrance side of the second lens group G2 has a minus value in the numerical data given later, because the convex surface on the entrance side of the second lens group G2 is placed in the aperture in the stop S.

EXAMPLE 16

Figure 16A:
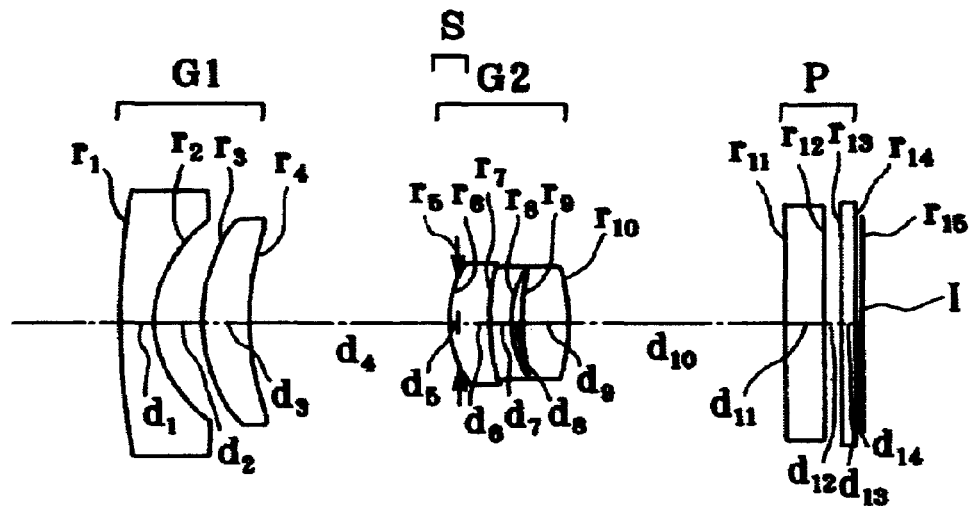
FIGS. 16(a), 16(b) and 16(c) are sectional views of Example 16 of the zoom lens, similar to FIGS. 1(a) to 1(c).
Figure 16B:
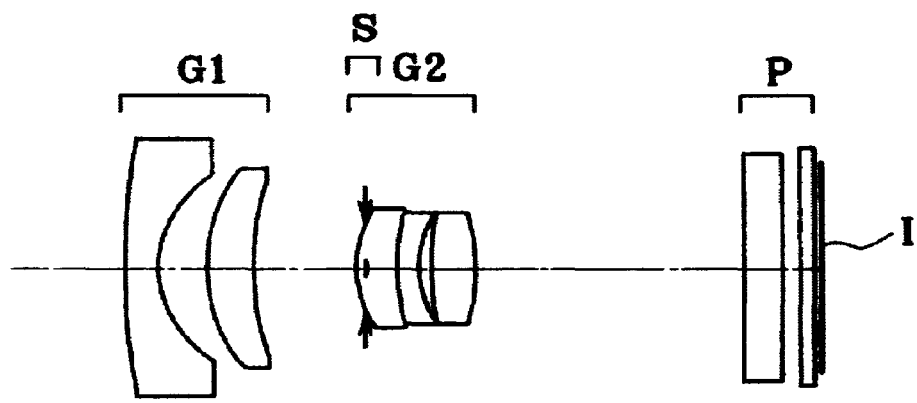
Figure 16C:
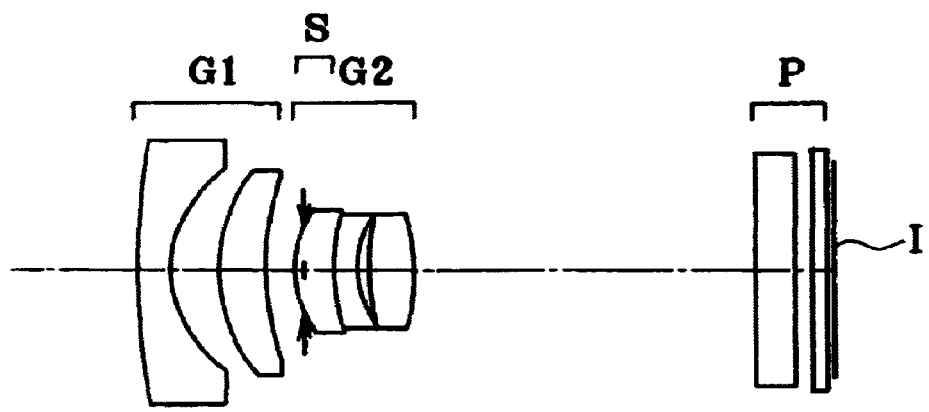

As shown in FIGS. 16(*a*), 16(*b*) and 16(*c*), Example 16 is directed to a zoom lens made up of a first lens group G1 having negative refracting power and composed of a negative meniscus lens convex on its object side and a positive meniscus lens convex on its object side, an aperture stop S, and a second lens group G2 having positive refracting power and composed of a doublet consisting of a positive meniscus lens convex on its object side and a negative meniscus lens convex on its object side and a double-convex positive lens. Upon zooming from the wide-angle end to the telephoto end of the zoom lens, the first lens group G1 moves toward the image plane side of the zoom lens as far as an intermediate state, and remains substantially fixed between the intermediate state and the telephoto end, and is positioned slightly nearer to the image plane side at the telephoto end than at the wide-angle end, and the second lens group G2 moves together with the aperture stop S toward the object side.

Two aspheric surfaces are used; one at the image plane side-surface of the negative meniscus lens in the first lens group G1, and another at the surface located nearest to the object side of the doublet in the second lens group G2.

Further in this example, the cementing surface in the doublet in the second lens group G2 is multi-coated with a multilayer film so as to prevent reflection at that surface.

In this example, the surface-to-surface spacing between the stop S and the convex surface on the entrance side of the second lens group G2 has a minus value in the numerical data given later, because the convex surface on the entrance side of the second lens group G2 is placed in the aperture in the stop S.

EXAMPLE 17

Figure 17A:
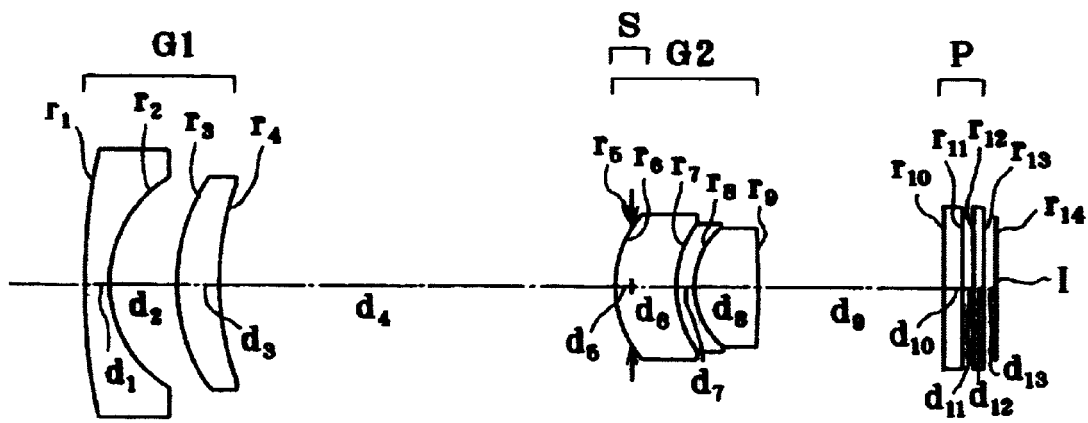
FIGS. 17(a), 17(b) and 17(c) are sectional views of Example 17 of the zoom lens, similar to FIGS. 1(a) to 1(c).
Figure 17B:
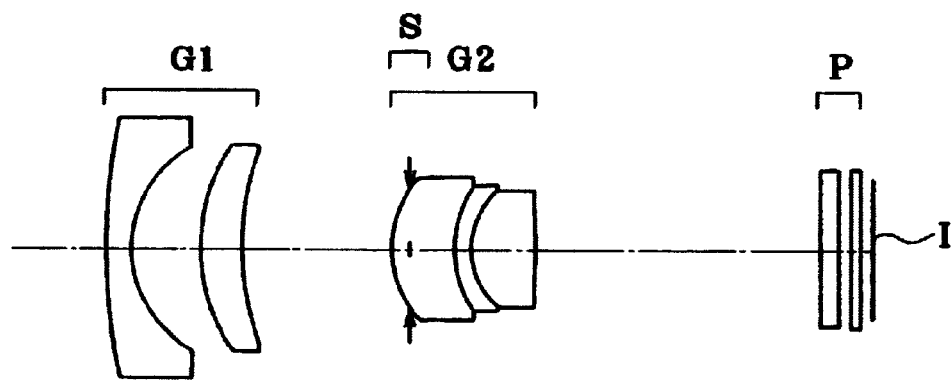
Figure 17C:
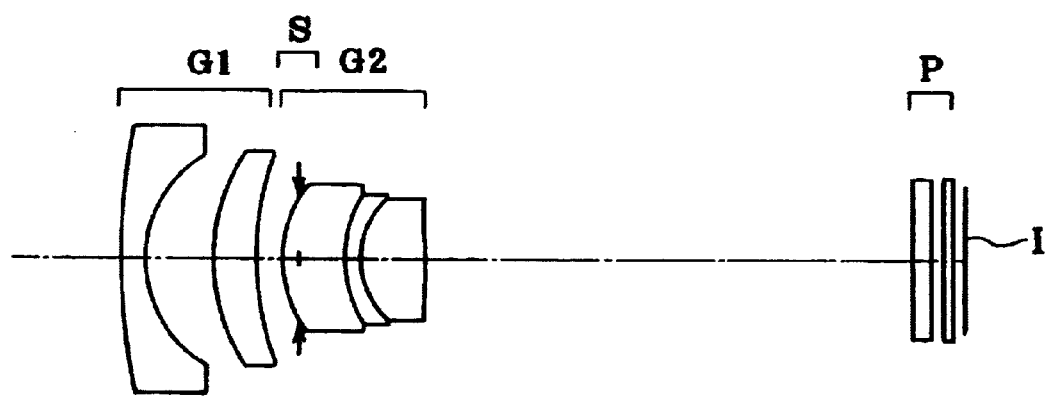
Figure 18A:
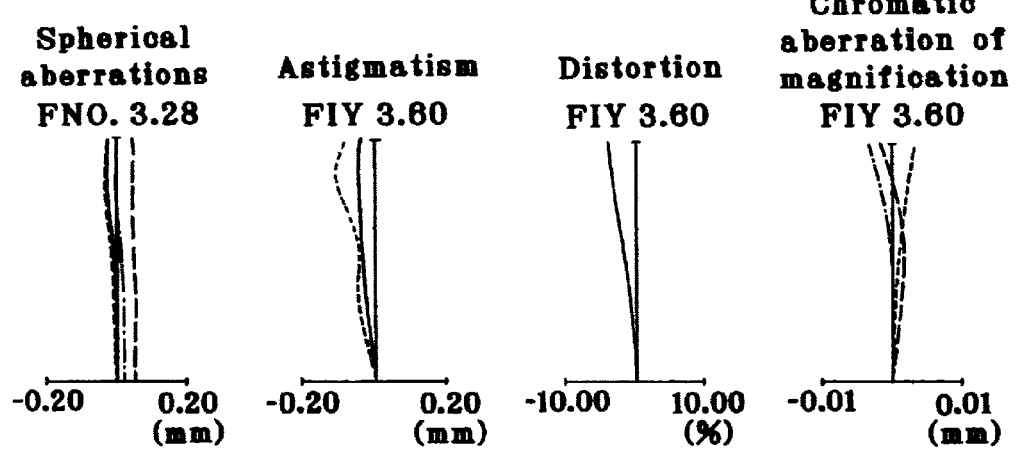
FIGS. 18(a), 18(b) and 18(c) are aberration diagrams for Example 1 upon focused on an object point at infinity.
Figure 18B:
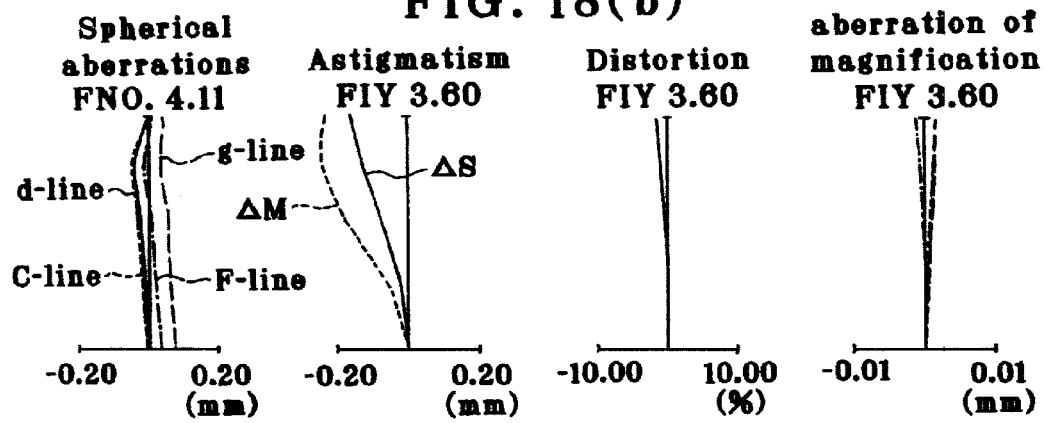
Figure 18C:
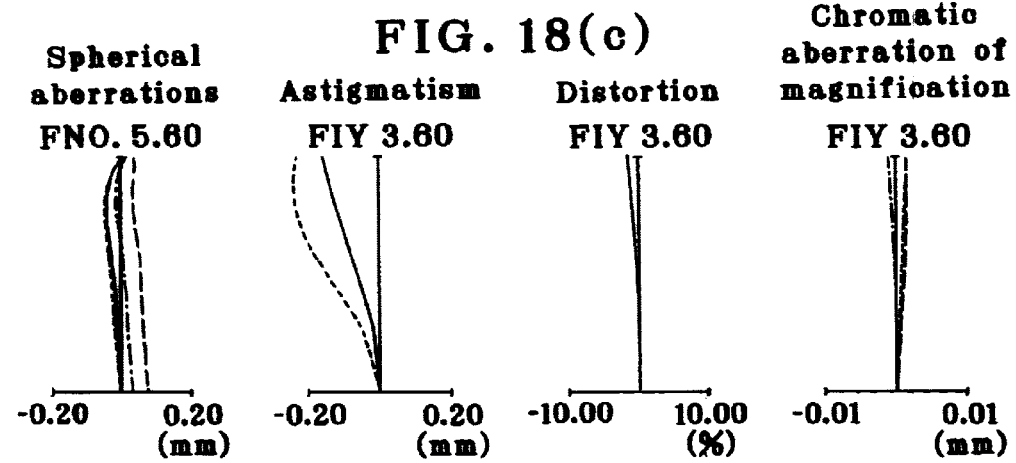
Figure 19A:
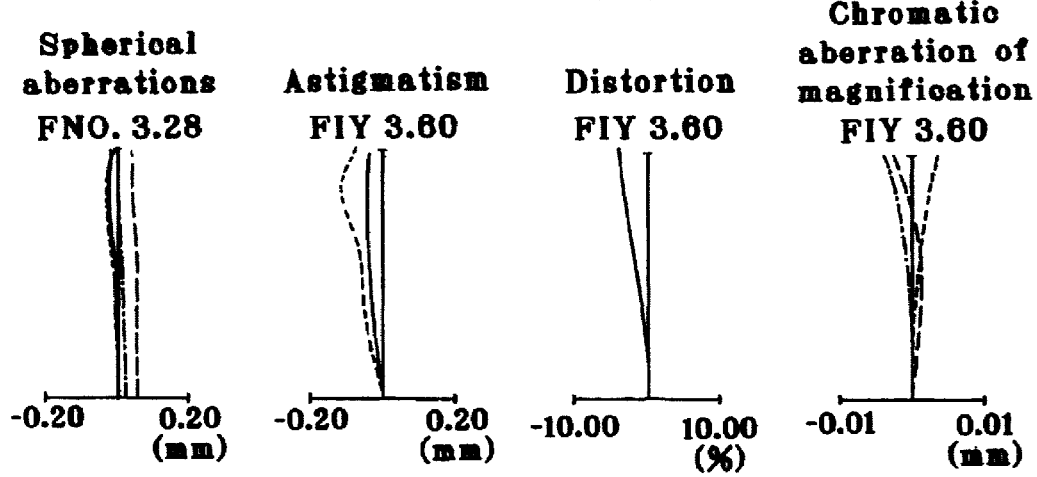
FIGS. 19(a), 19(b) and 19(c) are aberration diagrams for Example 2 upon focused on an object point at infinity.
Figure 19B:
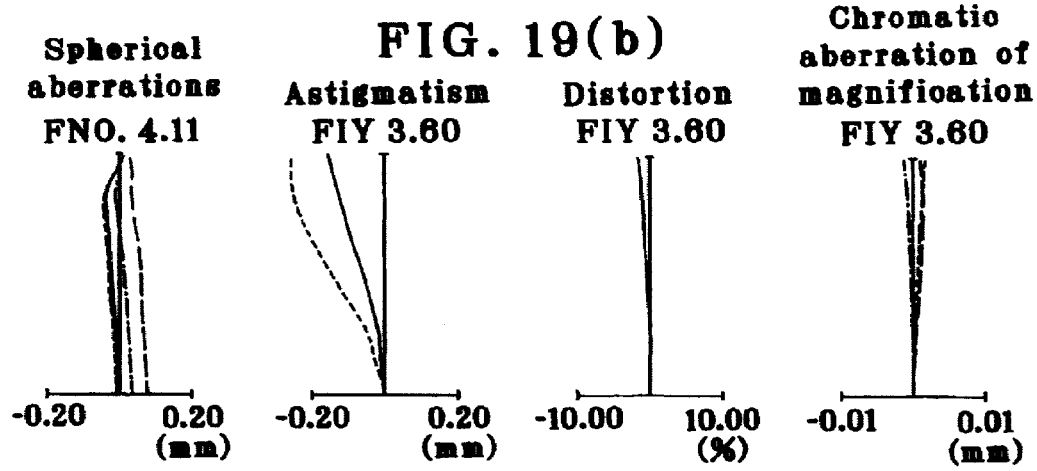
Figure 19C:
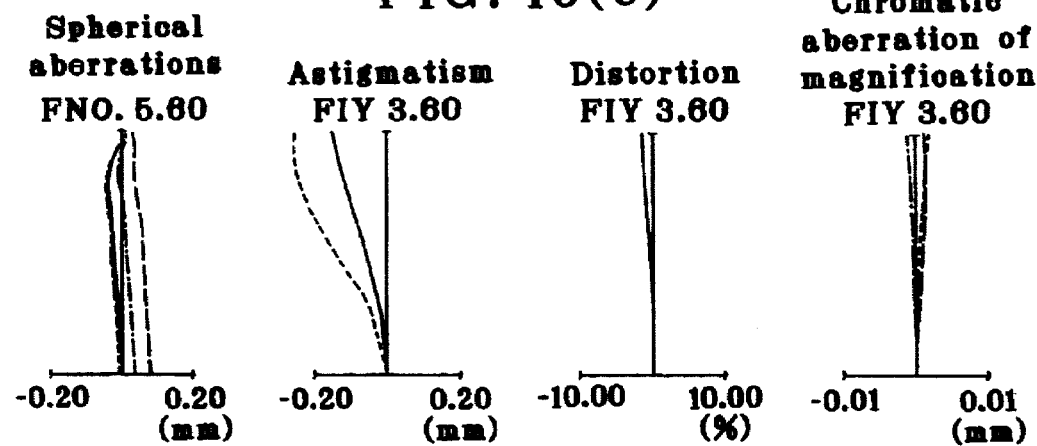
Figure 21A:
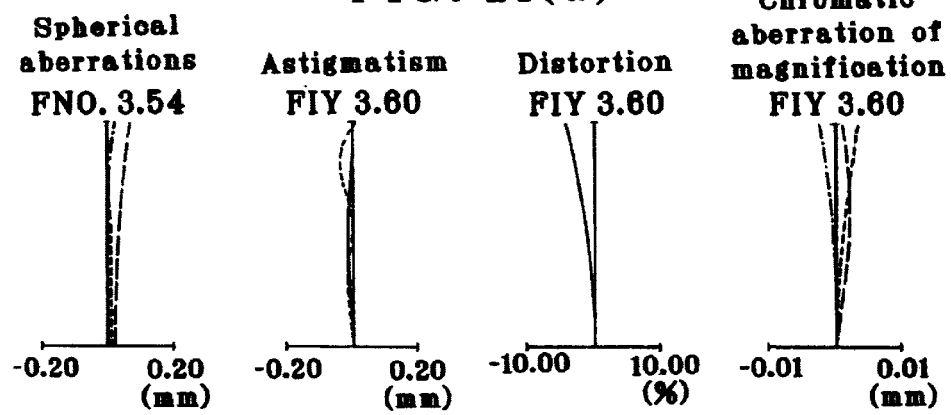
FIGS. 21(a), 21(b) and 21(c) are aberration diagrams for Example 4 upon focused on an object point at infinity.
Figure 21B:
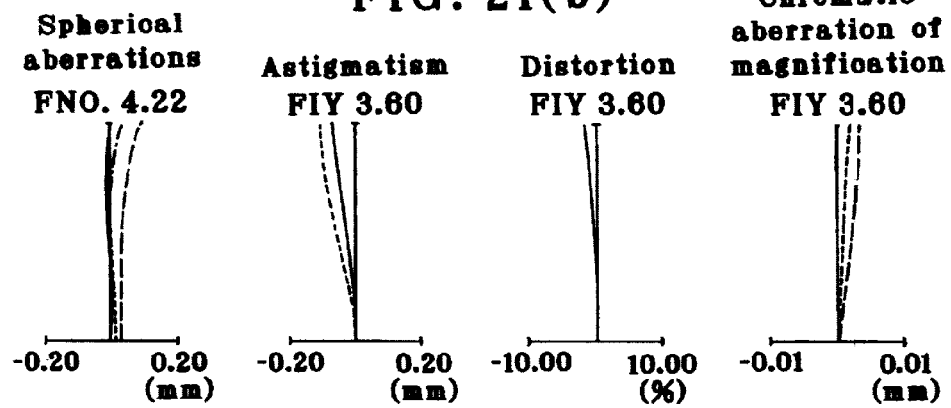
Figure 21C:
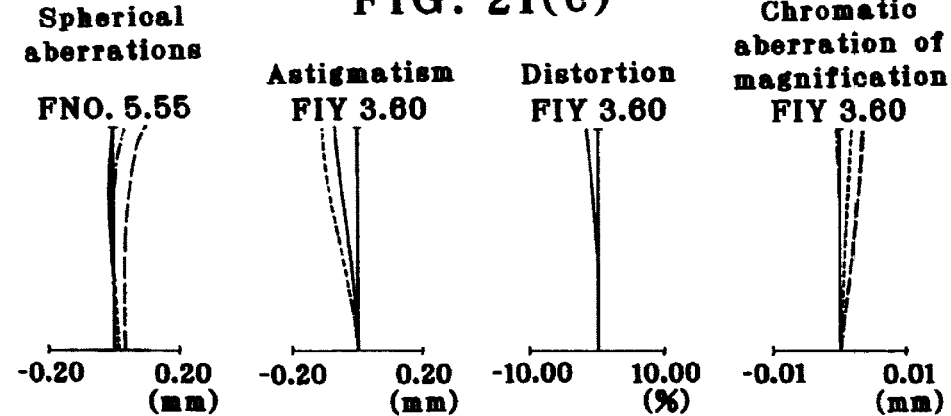
Figure 22A:
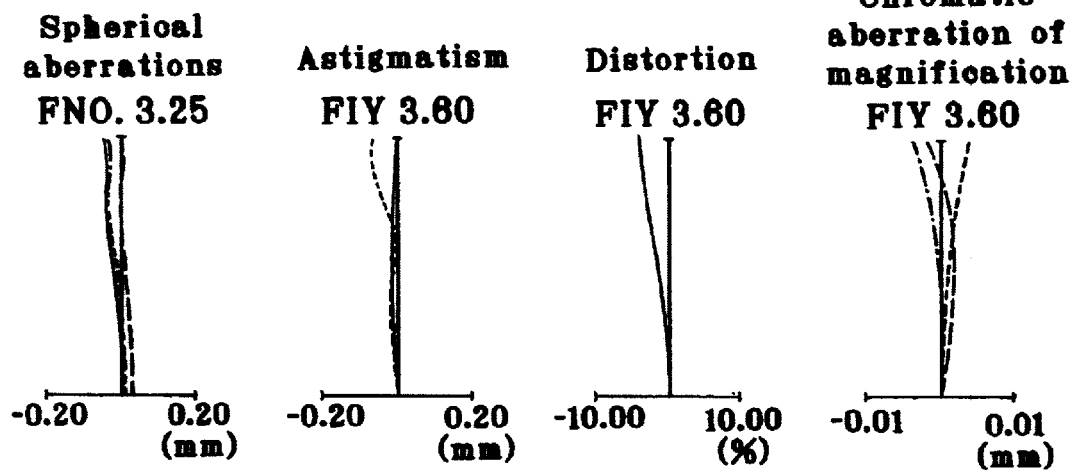
FIGS. 22(a), 22(b) and 22(c) are aberration diagrams for Example 5 upon focused on an object point at infinity.
Figure 22B:
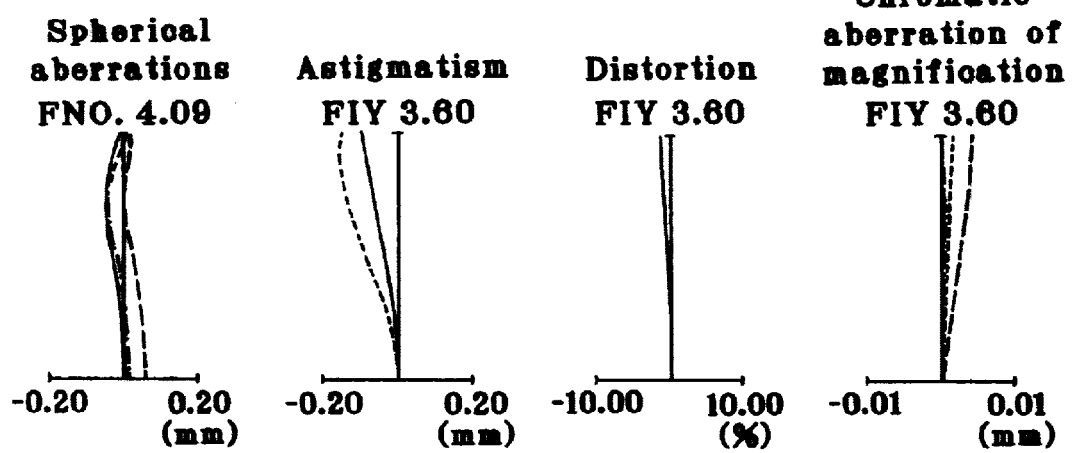
Figure 22C:
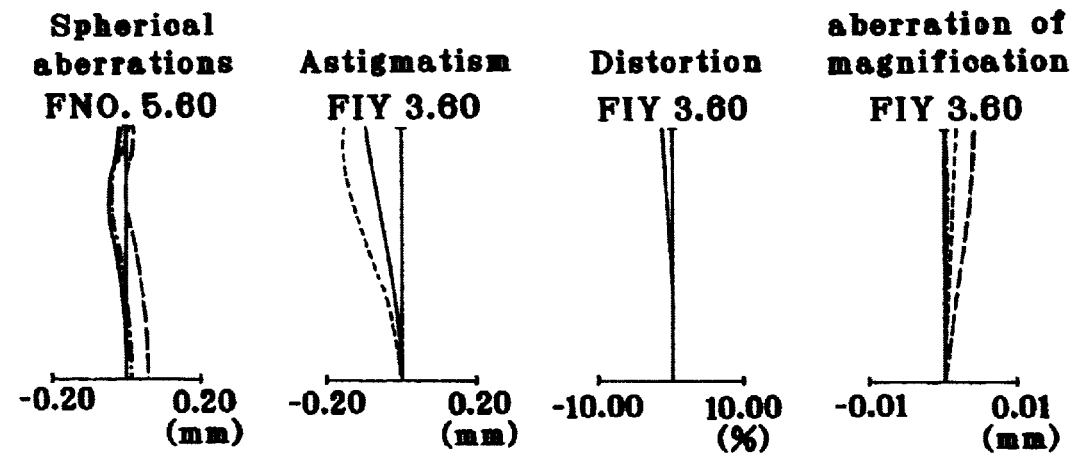

As shown in FIGS. 17(a), 17(b) and 17(c), Example 17 is directed to a zoom lens made up of a first lens group G1 having negative refracting power and composed of a negative meniscus lens convex on its object side and a positive meniscus lens convex on its object side, an aperture stop S, and a second lens group G2 having positive refracting power and composed of a triplet consisting of a positive meniscus lens convex on its object side, a negative meniscus lens convex on its object side and a double-convex positive lens. Upon zooming from the wide-angle end to the telephoto end of the zoom lens, the first lens group G1 moves in a convex locus toward the image plane side of the zoom lens and is positioned slightly nearer to the image plane side at the telephoto end than at the wide-angle end, and the second lens group G2 moves together with the aperture stop S toward the object side.

Three aspheric surfaces are used; one at the image plane side-surface of the negative meniscus lens in the first lens group G1, one at the surface located nearest to the object side of the triplet in the second lens group G2, and one at the surface nearest to the image plane side of the triplet in the second lens group G2.

Further in this example, two cementing surfaces in the triplet in the second lens group G2 are each multi-coated with a multilayer film so as to prevent reflection at those surfaces.

In this example, the surface-to-surface spacing between the stop S and the convex surface on the entrance side of the second lens group G2 has a minus value in the numerical data given later, because the convex surface on the entrance side of the second lens group G2 is placed in the aperture in the stop S.

Numerical data on each example are enumerated below. Symbols used hereinafter but not hereinbefore have the following meanings:
f: focal length of the zoom lens
ω: half angle of view
$F_{NO}$: F-number
WE: wide-angle end
ST: intermediate state
TE: telephoto end
$r_1, r_2, \ldots$: radius of curvature of each lens surface
$d_1, d_2, \ldots$: spacing between adjacent lens surfaces
$n_{d1}, n_{d2}, \ldots$: d-line refractive index of each lens
$\nu_{d1}, \nu_{d2}, \ldots$ Abbe number of each lens Here let x be an optical axis on condition that the direction of propagation of light is positive and y be a direction perpendicular to the optical axis. Then, aspheric configuration is given by $$x=(y^2/r)/[1+\{1-(K+1)(y/r)^2\}^{1/2}]+A_4 y^4+A_6 y^6+A_8 y^8+A_{10} y^{10}$$

where r is a paraxial radius of curvature, K is a conical coefficient, and $A_4$, $A_6$, $A_8$ and $A_{10}$ are the fourth, sixth, eighth and tenth aspheric coefficients, respectively.

EXAMPLE 1

| | | | |
|---|---|---|---|
| $r_1 = 102.396$ (Aspheric) | $d_1 = 1.30$ | $n_{d1} = 1.72916$ | $\nu_{d1} = 54.68$ |
| $r_2 = 4.681$ (Aspheric) | $d_2 = 2.84$ | $n_{d2} = 1.84666$ | $\nu_{d2} = 23.78$ |
| $r_3 = 8.225$ | $d_3 = 1.25$ | $n_{d3} = 1.49700$ | $\nu_{d3} = 81.54$ |
| $r_4 = 12.727$ | $d_4 =$ (Variable) | $n_{d4} = 1.80100$ | $\nu_{d4} = 34.97$ |
| $r_5 = \infty$ (Stop) | $d_5 = 0.80$ | $n_{d5} = 1.49700$ | $\nu_{d5} = 81.54$ |
| $r_6 = 4.193$ (Aspheric) | $d_6 = 1.80$ | $n_{d6} = 1.51633$ | $\nu_{d6} = 64.14$ |
| $r_7 = 17.237$ | $d_7 = 1.00$ | | |
| $r_8 = 5.053$ | $d_8 = 0.17$ | | |
| $r_9 = 4.414$ (Aspheric) | $d_9 = 1.98$ | | |
| $r_{10} = 1178.988$ (Aspheric) | $d_{10} =$ (Variable) | | |
| $r_{11} = \infty$ | $d_{11} = 1.46$ | | |
| $r_{12} = \infty$ | $d_{12} = 1.18$ | | |
| $r_{13} = \infty$ (Image Plane) | | | |

Aspherical Coefficients
1st surface

K = 0.000
$A_4 = 5.49803 \times 10^{-4}$
$A_6 = -1.42775 \times 10^{-5}$
$A_8 = 6.70077 \times 10^{-8}$
$A_{10} = 2.57335 \times 10^{-9}$
2nd surface K = −0.581
$A_4 = 6.24467 \times 10^{-4}$
$A_6 = 4.38426 \times 10^{-5}$
$A_8 = -4.99104 \times 10^{-6}$
$A_{10} = 1.45794 \times 10^{-7}$
6th surface K = −1.049
$A_4 = 9.76738 \times 10^{-4}$
$A_6 = 5.68418 \times 10^{-5}$
$A_8 = -4.27107 \times 10^{-6}$
$A_{10} = 5.24249 \times 10^{-7}$
9th surface K = 0.000
$A_4 = 1.61434 \times 10^{-3}$
$A_6 = 2.68385 \times 10^{-4}$
$A_8 = -5.07308 \times 10^{-6}$
$A_{10} = 1.20311 \times 10^{-6}$
10th surface K = 0.000
$A_4 = 4.35488 \times 10^{-3}$
$A_6 = 7.19630 \times 10^{-4}$
$A_8 = -5.13921 \times 10^{-5}$
$A_{10} = 1.31236 \times 10^{-5}$ -continued

|  | Zooming Data (∞) | | |
|---|---|---|---|
|  | WE | ST | TE |
| f (mm) | 5.900 | 10.000 | 17.300 |
| $F_{NO}$ | 3.28 | 4.11 | 5.60 |
| ω(°) | 32.4 | 20.0 | 11.8 |
| $d_4$ | 13.25 | 5.83 | 1.33 |
| $d_{10}$ | 10.43 | 14.49 | 21.73 |

EXAMPLE 2

$r_1$ = 4871.893 (Aspheric)  $d_1$ = 1.30  $n_{d1}$ = 1.69350  $v_{d1}$ = 53.21
$r_2$ = 4.650 (Aspheric)  $d_2$ = 2.78  $n_{d2}$ = 1.84666  $v_{d2}$ = 23.78
$r_3$ = 8.078  $d_3$ = 1.37  $n_{d3}$ = 1.49700  $v_{d3}$ = 81.54
$r_4$ = 12.526  $d_4$ = (Variable)  $n_{d4}$ = 1.80100  $v_{d4}$ = 34.97
$r_5$ = ∞(Stop)  $d_5$ = 0.80  $n_{d5}$ = 1.49700  $v_{d5}$ = 81.54
$r_6$ = 4.250 (Aspheric)  $d_6$ = 1.80  $n_{d6}$ = 1.51633  $v_{d6}$ = 64.14
$r_7$ = 18.166  $d_7$ = 1.00
$r_8$ = 5.169  $d_8$ = 0.17
$r_9$ = 4.316 (Aspheric)  $d_9$ = 1.93
$r_{10}$ = 130.143 (Aspheric)  $d_{10}$ = (Variable)
$r_{11}$ = ∞  $d_{11}$ = 1.46
$r_{12}$ = ∞  $d_{12}$ = 1.18
$r_{13}$ = ∞(Image Plane)
Aspherical Coefficients
1st surface K = 0.000
$A_4$ = 7.38460 × 10$^{-4}$
$A_6$ = −2.18178 × 10$^{-5}$
$A_8$ = 2.47334 × 10$^{-7}$
$A_{10}$ = 3.35756 × 10$^{-10}$
2nd surface K = −0.581
$A_4$ = 8.50511 × 10$^{-4}$
$A_6$ = 3.74193 × 10$^{-5}$
$A_8$ = −4.64118 × 10$^{-8}$
$A_{10}$ = 1.28373 × 10$^{-7}$
6th surface K = −1.049
$A_4$ = 9.29190 × 10$^{-4}$
$A_6$ = 5.84322 × 10$^{-5}$
$A_8$ = −4.01050 × 10$^{-6}$
$A_{10}$ = 5.22863 × 10$^{-7}$
9th surface K = 0.000
$A_4$ = 1.82975 × 10$^{-3}$
$A_6$ = 2.94156 × 10$^{-4}$
$A_8$ = −1.03666 × 10$^{-5}$
$A_{10}$ = 2.04711 × 10$^{-6}$
10th surface K = 0.000
$A_4$ = 4.78121 × 10$^{-3}$
$A_6$ = 8.07555 × 10$^{-4}$
$A_8$ = −6.75572 × 10$^{-5}$
$A_{10}$ = 1.66666 × 10$^{-5}$

|  | Zooming Data (∞) | | |
|---|---|---|---|
|  | WE | ST | TE |
| f (mm) | 5.900 | 10.000 | 17.300 |
| $F_{NO}$ | 3.28 | 4.11 | 5.60 |
| ω(°) | 32.4 | 20.1 | 11.8 |
| $d_4$ | 13.25 | 5.84 | 1.35 |
| $d_{10}$ | 10.45 | 14.51 | 21.74 |

EXAMPLE 3

$r_1$ = 17.885  $d_1$ = 1.26  $n_{d1}$ = 1.78800  $v_{d1}$ = 47.37
$r_2$ = 4.026 (Aspheric)  $d_2$ = 2.38  $n_{d2}$ = 1.84666  $v_{d2}$ = 23.78
$r_3$ = 7.380  $d_3$ = 1.53  $n_{d3}$ = 1.49700  $v_{d3}$ = 81.54
$r_4$ = 12.024  $d_4$ = (Variable)  $n_{d4}$ = 1.84666  $v_{d4}$ = 23.78
$r_5$ = ∞(Stop)  $d_5$ = 0.80  $n_{d5}$ = 1.61800  $v_{d5}$ = 63.33
$r_6$ = 3.974 (Aspheric)  $d_6$ = 1.80  $n_{d6}$ = 1.51633  $v_{d6}$ = 64.14
$r_7$ = 10.240  $d_7$ = 1.00
$r_8$ = 5.389  $d_8$ = 0.50
$r_9$ = 17.976 (Aspheric)  $d_9$ = 1.26
$r_{10}$ = −12.313 (Aspheric)  $d_{10}$ = (Variable)
$r_{11}$ = ∞  $d_{11}$ = 1.46
$r_{12}$ = ∞  $d_{12}$ = 1.18
$r_{13}$ = ∞(Image Plane)
Aspherical Coefficients
1st surface K = 0.000
$A_4$ = −3.41182 × 10$^{-4}$
$A_6$ = −5.85691 × 10$^{-7}$
$A_8$ = 2.93155 × 10$^{-7}$
$A_{10}$ = −5.27348 × 10$^{-9}$
2nd surface K = −0.581
$A_4$ = −2.74832 × 10$^{-4}$
$A_6$ = −4.42485 × 10$^{-5}$
$A_8$ = 3.03733 × 10$^{-6}$
$A_{10}$ = −7.93219 × 10$^{-8}$
6th surface K = −1.049
$A_4$ = 8.84772 × 10$^{-4}$
$A_6$ = 7.28164 × 10$^{-5}$
$A_8$ = −1.96586 × 10$^{-5}$
$A_{10}$ = 1.32905 × 10$^{-6}$
9th surface K = 0.000
$A_4$ = 8.46022 × 10$^{-4}$
$A_6$ = 1.63923 × 10$^{-4}$
$A_8$ = 8.87723 × 10$^{-5}$
$A_{10}$ = −5.62313 × 10$^{-6}$
10th surface K = 0.000
$A_4$ = 1.38486 × 10$^{-3}$
$A_6$ = 3.26653 × 10$^{-4}$
$A_8$ = 2.55615 × 10$^{-5}$
$A_{10}$ = 3.37186 × 10$^{-6}$

|  | Zooming Data (∞) | | |
|---|---|---|---|
|  | WE | ST | TE |
| f (mm) | 5.900 | 10.096 | 17.300 |
| $F_{NO}$ | 3.43 | 4.22 | 5.60 |
| ω(°) | 32.3 | 19.8 | 11.8 |
| $d_4$ | 15.12 | 6.57 | 1.57 |
| $d_{10}$ | 10.70 | 14.55 | 21.17 |

EXAMPLE 4

| | | | |
|---|---|---|---|
| $r_1 = 68.405$ (Aspheric) | $d_1 = 1.63$ | $n_{d1} = 1.78800$ | $\nu_{d1} = 47.37$ |
| $r_2 = 4.768$ (Aspheric) | $d_2 = 2.12$ | $n_{d2} = 1.84666$ | $\nu_{d2} = 23.78$ |
| $r_3 = 7.409$ | $d_3 = 1.41$ | $n_{d3} = 1.49700$ | $\nu_{d3} = 81.54$ |
| $r_4 = 12.437$ | $d_4 = $ (Variable) | $n_{d4} = 1.84666$ | $\nu_{d4} = 23.78$ |
| $r_5 = \infty$ (Stop) | $d_5 = 0.80$ | $n_{d5} = 1.61800$ | $\nu_{d5} = 63.33$ |
| $r_6 = 4.995$ (Aspheric) | $d_6 = 2.45$ | $n_{d6} = 1.54771$ | $\nu_{d6} = 62.84$ |
| $r_7 = 12.402$ | $d_7 = 1.81$ | | |
| $r_8 = 5.642$ | $d_8 = 0.50$ | | |
| $r_9 = 12.992$ | $d_9 = 1.56$ | | |
| $r_{10} = -9.285$ | $d_{10} = $ (Variable) | | |
| $r_{11} = \infty$ | $d_{11} = 1.46$ | | |
| $r_{12} = \infty$ | $d_{12} = 1.20$ | | |
| $r_{13} = \infty$ (Image Plane) | | | |

Aspherical Coefficients
1st surface $K = 0.000$
$A_4 = 5.41441 \times 10^{-4}$
$A_6 = -1.53521 \times 10^{-5}$
$A_8 = 1.35784 \times 10^{-8}$
$A_{10} = 4.20589 \times 10^{-9}$
2nd surface $K = -0.581$
$A_4 = 7.90206 \times 10^{-4}$
$A_6 = 2.87657 \times 10^{-5}$
$A_8 = -4.65577 \times 10^{-6}$
$A_{10} = 1.42405 \times 10^{-7}$
6th surface $K = -1.049$
$A_4 = 1.82669 \times 10^{-4}$
$A_6 = 7.83309 \times 10^{-6}$
$A_8 = 0$
$A_{10} = 0$

Zooming Data ($\infty$)

| | WE | ST | TE |
|---|---|---|---|
| f (mm) | 6.312 | 10.010 | 17.141 |
| $F_{NO}$ | 3.54 | 4.22 | 5.55 |
| $\omega(°)$ | 30.8 | 20.1 | 11.9 |
| $d_4$ | 12.98 | 6.13 | 1.26 |
| $d_{10}$ | 11.13 | 14.76 | 21.76 |

EXAMPLE 5

| | | | |
|---|---|---|---|
| $r_1 = 103.556$ (Aspheric) | $d_1 = 1.30$ | $n_{d1} = 1.78800$ | $\nu_{d1} = 47.37$ |
| $r_2 = 4.747$ (Aspheric) | $d_2 = 2.26$ | $n_{d2} = 1.84666$ | $\nu_{d2} = 23.78$ |
| $r_3 = 7.638$ | $d_3 = 1.32$ | $n_{d3} = 1.49700$ | $\nu_{d3} = 81.54$ |
| $r_4 = 12.979$ | $d_4 = $ (Variable) | $n_{d4} = 1.84666$ | $\nu_{d4} = 23.78$ |
| $r_5 = \infty$ (Stop) | $d_5 = 0.80$ | $n_{d5} = 1.58913$ | $\nu_{d5} = 61.14$ |
| $r_6 = 4.009$ (Aspheric) | $d_6 = 1.80$ | $n_{d6} = 1.51633$ | $\nu_{d6} = 64.14$ |
| $r_7 = 9.598$ (Aspheric) | $d_7 = 0.20$ | | |
| $r_8 = 10.185$ | $d_8 = 1.00$ | | |
| $r_9 = 5.183$ | $d_9 = 1.47$ | | |
| $r_{10} = 46.678$ (Aspheric) | $d_{10} = $ (Variable) | | |
| $r_{11} = \infty$ | $d_{11} = 1.46$ | | |
| $r_{12} = \infty$ | $d_{12} = 1.18$ | | |
| $r_{13} = \infty$ (Image Plane) | | | |

Aspherical Coefficients
1st surface $K = 0.000$
$A_4 = 8.44557 \times 10^{-4}$
$A_6 = -2.97255 \times 10^{-5}$
$A_8 = 4.95764 \times 10^{-7}$
$A_{10} = -2.23418 \times 10^{-9}$
2nd surface $K = -0.581$
$A_4 = 1.12783 \times 10^{-3}$
$A_6 = 3.01431 \times 10^{-5}$
$A_8 = -4.95774 \times 10^{-6}$
$A_{10} = 1.61519 \times 10^{-7}$
6th surface $K = -1.049$
$A_4 = 1.11939 \times 10^{-3}$
$A_6 = -8.04168 \times 10^{-6}$
$A_8 = -5.55027 \times 10^{-6}$
$A_{10} = 3.32874 \times 10^{-8}$
7th surface $K = 0.000$
$A_4 = -1.61147 \times 10^{-3}$
$A_6 = -1.78604 \times 10^{-4}$
$A_8 = -1.00966 \times 10^{-5}$
$A_{10} = 1.14367 \times 10^{-6}$
10th surface $K = 0.000$
$A_4 = 4.18272 \times 10^{-3}$
$A_6 = 3.34078 \times 10^{-4}$
$A_8 = 2.78059 \times 10^{-5}$
$A_{10} = -5.62666 \times 10^{-7}$

Zooming Data ($\infty$)

| | WE | ST | TE |
|---|---|---|---|
| f (mm) | 5.900 | 10.000 | 17.300 |
| $F_{NO}$ | 3.25 | 4.09 | 5.60 |
| $\omega(°)$ | 32.4 | 20.0 | 11.8 |
| $d_4$ | 12.50 | 5.53 | 1.30 |
| $d_{10}$ | 9.62 | 13.43 | 20.21 |

EXAMPLE 6

| | | | |
|---|---|---|---|
| $r_1 = 78.175$ (Aspheric) | $d_1 = 1.30$ | $n_{d1} = 1.78800$ | $\nu_{d1} = 47.37$ |
| $r_2 = 4.679$ (Aspheric) | $d_2 = 2.32$ | $n_{d2} = 1.84666$ | $\nu_{d2} = 23.78$ |
| $r_3 = 7.769$ | $d_3 = 1.64$ | $n_{d3} = 1.49700$ | $\nu_{d3} = 81.54$ |
| $r_4 = 13.254$ | $d_4 = $ (Variable) | $n_{d4} = 1.84666$ | $\nu_{d4} = 23.78$ |
| $r_5 = \infty$ (Stop) | $d_5 = 0.80$ | $n_{d5} = 1.58913$ | $\nu_{d5} = 61.14$ |
| $r_6 = 4.346$ (Aspheric) | $d_6 = 1.80$ | $n_{d6} = 1.51633$ | $\nu_{d6} = 64.14$ |
| $r_7 = 9.598$ | $d_7 = 0.30$ | | |
| $r_8 = 10.960$ | $d_8 = 1.00$ | | |
| $r_9 = 5.520$ | $d_9 = 0.30$ | | |
| $r_{10} = 5.439$ (Aspheric) | $d_{10} = 1.68$ | | |
| $r_{11} = 329.946$ (Aspheric) | $d_{11} = $ (Variable) | | |
| $r_{12} = \infty$ | $d_{12} = 0.50$ | | |
| $r_{13} = \infty$ | $d_{13} = 1.81$ | | |
| $r_{14} = \infty$ (Image Plane) | | | |

Aspherical Coefficients
1st surface $K = 0.000$
$A_4 = 7.75161 \times 10^{-4}$
$A_6 = -3.02406 \times 10^{-5}$
$A_8 = 5.85121 \times 10^{-7}$
$A_{10} = -4.11245 \times 10^{-9}$
2nd surface $K = -0.581$
$A_4 = 1.05711 \times 10^{-3}$ $A_6 = 9.91792 \times 10^{-6}$
$A_8 = -3.46638 \times 10^{-6}$
$A_{10} = 1.14912 \times 10^{-7}$
6th surface $K = -1.049$
$A_4 = 9.69050 \times 10^{-4}$
$A_6 = 8.65699 \times 10^{-7}$
$A_8 = 1.57673 \times 10^{-7}$
$A_{10} = 2.52205 \times 10^{-7}$
10th surface $K = 0.000$
$A_4 = 1.64276 \times 10^{-3}$
$A_6 = 2.45409 \times 10^{-4}$
$A_8 = 8.35676 \times 10^{-6}$
$A_{10} = 9.48479 \times 10^{-8}$
11th surface $K = 0.000$
$A_4 = 3.60298 \times 10^{-3}$
$A_6 = 3.98906 \times 10^{-4}$
$A_8 = 8.56662 \times 10^{-6}$
$A_{10} = 4.82876 \times 10^{-6}$

| Zooming Data ($\infty$) | | | |
|---|---|---|---|
| | WE | ST | TE |
| f (mm) | 5.900 | 10.000 | 17.300 |
| $F_{NO}$ | 3.32 | 4.13 | 5.60 |
| $\omega(°)$ | 32.4 | 20.0 | 11.8 |
| $d_4$ | 13.10 | 5.77 | 1.31 |
| $d_{11}$ | 10.33 | 14.35 | 21.51 |

EXAMPLE 7

$r_1 = 24.521$        $d_1 = 1.58$           $n_{d1} = 1.84666$   $\nu_{d1} = 23.78$
$r_2 = 82.026$        $d_2 = 0.15$           $n_{d2} = 1.80610$   $\nu_{d2} = 40.92$
$r_3 = 42.257$        $d_3 = 0.70$           $n_{d3} = 1.80610$   $\nu_{d3} = 40.92$
$r_4 = 6.522$         $d_4 = 2.38$           $n_{d4} = 1.84666$   $\nu_{d4} = 23.78$
$r_5 = -52.421$       $d_5 = 0.70$           $n_{d5} = 1.80610$   $\nu_{d5} = 40.92$
$r_6 = 23.780$        $d_6 = 0.15$           $n_{d6} = 1.84666$   $\nu_{d6} = 23.78$
$r_7 = 9.495$         $d_7 = 1.65$           $n_{d7} = 1.80610$   $\nu_{d7} = 40.92$
$r_8 = 20.054$        $d_8 = $ (Variable)    $n_{d8} = 1.69680$   $\nu_{d8} = 55.53$
$r_9 = \infty$ (Stop) $d_9 = 0.80$           $n_{d9} = 1.51633$   $\nu_{d9} = 64.14$
$r_{10} = 4.345$ (Aspheric) $d_{10} = 2.80$
$r_{11} = 71.739$     $d_{11} = 0.70$
$r_{12} = 3.432$      $d_{12} = 0.67$
$r_{13} = 7.408$ (Aspheric) $d_{13} = 1.46$
$r_{14} = -201.869$   $d_{14} = $ (Variable)
$r_{15} = -614015.897$ $d_{15} = 1.60$
$r_{16} = -12.741$    $d_{16} = $ (Variable)
$r_{17} = \infty$     $d_{17} = 2.24$
$r_{18} = \infty$     $d_{18} = 1.80$
$r_{19} = \infty$ (Image Plane)
Aspherical Coefficients
10th surface $K = 0.000$
$A_4 = -4.89254 \times 10^{-4}$
$A_5 = -1.53034 \times 10^{-5}$
$A_6 = -2.44512 \times 10^{-6}$
$A_{10} = 0$
13th surface $K = 0.000$
$A_4 = -4.13872 \times 10^{-4}$
$A_6 = -2.15303 \times 10^{-9}$
$A_8 = 7.09406 \times 10^{-8}$
$A_{10} = 0$

| Zooming Data ($\infty$) | | | |
|---|---|---|---|
| | WE | ST | TE |
| f (mm) | 5.102 | 9.787 | 14.714 |
| $F_{NO}$ | 2.59 | 3.60 | 4.50 |
| $\omega(°)$ | 30.4 | 16.4 | 11.0 |
| $d_8$ | 12.85 | 4.92 | 1.40 |
| $d_{14}$ | 1.79 | 8.10 | 13.13 |
| $d_{16}$ | 2.67 | 2.00 | 2.50 |

EXAMPLE 8

$r_1 = 28.864$         $d_1 = 1.00$           $n_{d1} = 1.74330$   $\nu_{d1} = 49.33$
$r_2 = 4.935$ (Aspheric) $d_2 = 2.27$         $n_{d2} = 1.84666$   $\nu_{d2} = 23.78$
$r_3 = 8.079$          $d_3 = 2.16$           $n_{d3} = 1.69350$   $\nu_{d3} = 53.20$
$r_4 = 13.414$         $d_4 = $ (Variable)    $n_{d4} = 1.84666$   $\nu_{d4} = 23.78$
$r_5 = \infty$ (Stop)  $d_5 = 0.60$           $n_{d5} = 1.72916$   $\nu_{d5} = 54.68$
$r_6 = 7.062$ (Aspheric) $d_6 = 2.99$         $n_{d6} = 1.51633$   $\nu_{d6} = 64.14$
$r_7 = 63.352$         $d_7 = 1.31$           $n_{d7} = 1.51633$   $\nu_{d7} = 64.14$
$r_8 = 7.893$          $d_8 = 0.67$
$r_9 = 78.373$         $d_9 = 1.77$
$r_{10} = -10.390$     $d_{10} = $ (Variable)
$r_{11} = 15.096$      $d_{11} = 2.00$
$r_{12} = 38247.809$   $d_{12} = $ (Variable)
$r_{13} = \infty$      $d_{13} = 1.80$
$r_{14} = \infty$      $d_{14} = 1.78$
$r_{15} = \infty$ (Image Plane)
Aspherical Coefficients
2nd surface $K = -1.021$
$A_4 = 5.33618 \times 10^{-4}$
$A_6 = 5.82749 \times 10^{-8}$
$A_8 = 3.07535 \times 10^{-8}$
$A_{10} = 0$
6th surface $K = 0.025$
$A_4 = -3.32553 \times 10^{-4}$
$A_6 = -4.24384 \times 10^{-6}$
$A_8 = -1.87887 \times 10^{-8}$
$A_{10} = 0$

| Zooming Data ($\infty$) | | | |
|---|---|---|---|
| | WE | ST | TE |
| f (mm) | 5.992 | 9.989 | 17.067 |
| $F_{NO}$ | 2.81 | 3.59 | 4.81 |
| $\omega(°)$ | 32.2 | 20.2 | 12.0 |
| $d_4$ | 15.43 | 7.53 | 1.94 |
| $d_{10}$ | 4.77 | 11.93 | 21.13 |
| $d_{12}$ | 4.40 | 2.87 | 1.99 |

EXAMPLE 9

$r_1 = 300.000$        $d_1 = 0.95$           $n_{d1} = 1.69350$   $\nu_{d1} = 53.21$
$r_2 = 4.119$ (Aspheric) $d_2 = 1.27$         $n_{d2} = 1.67270$   $\nu_{d2} = 32.10$
$r_3 = 5.909$          $d_3 = 1.95$           $n_{d3} = 1.58913$   $\nu_{d3} = 61.14$
$r_4 = 13.839$         $d_4 = $ (Variable)    $n_{d4} = 1.69680$   $\nu_{d4} = 55.53$
$r_5 = \infty$ (Stop)  $d_5 = 1.00$           $n_{d5} = 1.80518$   $\nu_{d5} = 25.42$
$r_6 = 5.659$ (Aspheric) $d_6 = 1.82$         $n_{d6} = 1.58913$   $\nu_{d6} = 61.14$
$r_7 = -14.859$        $d_7 = 0.30$           $n_{d7} = 1.51633$   $\nu_{d7} = 64.14$
$r_8 = 4.993$          $d_8 = 1.33$
$r_9 = 9.217$          $d_9 = 0.50$
$r_{10} = 3.063$       $d_{10} = $ (Variable)

-continued $r_{11} = 300.000$  $d_{11} = 1.68$
$r_{12} = -7.562$  $d_{12} = 0.50$
(Aspheric)
$r_{13} = \infty$  $d_{13} = 3.10$
$r_{14} = \infty$  $d_{14} = 1.50$
$r_{15} = \infty$(Image Plane)
Aspherical Coefficients
2nd surface $K = 0.000$
$A_4 = -9.41764 \times 10^{-4}$
$A_6 = -2.63241 \times 10^{-5}$
$A_8 = 7.53602 \times 10^{-8}$
$A_{10} = -3.30236 \times 10^{-7}$
6th surface $K = 0.000$
$A_4 = -1.07195 \times 10^{-3}$
$A_6 = 3.57657 \times 10^{-8}$
$A_8 = -1.11575 \times 10^{-6}$
$A_{10} = -2.16311 \times 10^{-7}$
12th surface $K = 0.000$
$A_4 = 1.14395 \times 10^{-3}$
$A_6 = -6.88191 \times 10^{-5}$
$A_8 = 3.48041 \times 10^{-6}$
$A_{10} = -1.51406 \times 10^{-8}$ Zooming Data ($\infty$)

|  | WE | ST | TE |
|---|---|---|---|
| f (mm) | 4.514 | 8.694 | 12.896 |
| $F_{NO}$ | 2.80 | 3.86 | 4.96 |
| $\omega(°)$ | 30.1 | 15.8 | 10.8 |
| $d_4$ | 11.12 | 3.92 | 1.50 |
| $d_{10}$ | 3.00 | 7.62 | 12.51 |

EXAMPLE 10

$r_1 = 45.833$  $d_1 = 1.00$  $n_{d1} = 1.77250$  $\nu_{d1} = 49.60$
$r_2 = 11.059$  $d_2 = 0.46$  $n_{d2} = 1.80610$  $\nu_{d2} = 40.74$
$r_3 = 17.183$  $d_3 = 1.30$  $n_{d3} = 1.84666$  $\nu_{d3} = 23.78$
(Aspheric)
$r_4 = 7.299$  $d_4 = 2.01$  $n_{d4} = 1.80610$  $\nu_{d4} = 40.74$
$r_5 = 10.135$  $d_5 = 2.04$  $n_{d5} = 1.84666$  $\nu_{d5} = 23.78$
$r_6 = 21.713$  $d_6 = $ (Variable)  $n_{d6} = 1.72916$  $\nu_{d6} = 54.68$
$r_7 = \infty$(Stop)  $d_7 = 0.80$  $n_{d7} = 1.48749$  $\nu_{d7} = 70.23$
$r_8 = 5.144$ (Aspheric)  $d_8 = 2.30$  $n_{d8} = 1.51633$  $\nu_{d8} = 64.14$
$r_9 = 23.222$  $d_9 = 0.80$
$r_{10} = 4.578$  $d_{10} = 0.80$
$r_{11} = 21.904$  $d_{11} = 1.55$
$r_{12} = -15.861$  $d_{12} = $ (Variable)
$r_{13} = 23.085$  $d_{13} = 1.88$
$r_{14} = -30.321$  $d_{14} = $ (Variable)
$r_{15} = \infty$  $d_{15} = 2.24$
$r_{16} = \infty$  $d_{16} = 1.82$
$r_{17} = \infty$(Image Plane)
Aspherical Coefficients
3rd surface $K = 0.000$
$A_4 = 1.25750 \times 10^{-4}$
$A_6 = 2.40930 \times 10^{-6}$
$A_8 = -4.58770 \times 10^{-8}$
$A_{10} = 8.25740 \times 10^{-10}$
8th surface $K = 0.000$
$A_4 = -3.72500 \times 10^{-4}$
$A_6 = -4.75890 \times 10^{-6}$
$A_8 = -6.51070 \times 10^{-8}$ -continued Zooming Data ($\infty$)

|  | WE | ST | TE |
|---|---|---|---|
| f (mm) | 5.840 | 10.120 | 17.520 |
| $F_{NO}$ | 2.55 | 3.42 | 4.50 |
| $\omega(°)$ | 30.8 | 18.5 | 10.8 |
| $d_6$ | 17.27 | 8.69 | 1.61 |
| $d_{12}$ | 3.18 | 11.39 | 18.59 |
| $d_{14}$ | 4.11 | 1.51 | 1.79 |

EXAMPLE 11

$r_1 = 87.429$ (Aspheric)  $d_1 = 1.20$  $n_{d1} = 1.74320$  $\nu_{d1} = 49.34$
$r_2 = 4.444$ (Aspheric)  $d_2 = 2.82$  $n_{d2} = 1.84666$  $\nu_{d2} = 23.78$
$r_3 = 8.962$  $d_3 = 1.32$  $n_{d3} = 1.58913$  $\nu_{d3} = 61.14$
$r_4 = 16.479$  $d_4 = $ (Variable)  $n_{d4} = 1.88300$  $\nu_{d4} = 40.76$
$r_5 = \infty$(Stop)  $d_5 = 0.41$  $n_{d5} = 1.49700$  $\nu_{d5} = 81.54$
$r_6 = 4.807$ (Aspheric)  $d_6 = 3.05$  $n_{d6} = 1.54771$  $\nu_{d6} = 62.84$
$r_7 = 45.762$  $d_7 = 0.80$  $n_{d7} = 1.51633$  $\nu_{d7} = 64.14$
$r_8 = 4.013$  $d_8 = 2.16$
$r_9 = -9.312$ (Aspheric)  $d_9 = $ (Variable)
$r_{10} = \infty$  $d_{10} = 0.96$
$r_{11} = \infty$  $d_{11} = 0.60$
$r_{12} = \infty$  $d_{12} = 0.50$
$r_{13} = \infty$  $d_{13} = 0.59$
$r_{14} = \infty$(Image Plane)
Aspherical Coefficients
1st surface $K = 0.000$
$A_4 = 4.41897 \times 10^{-5}$
$A_6 = 1.83951 \times 10^{-5}$
$A_8 = -1.00412 \times 10^{-6}$
$A_{10} = 1.60038 \times 10^{-8}$
2nd surface $K = -0.581$
$A_4 = -1.39906 \times 10^{-4}$
$A_6 = 6.00918 \times 10^{-5}$
$A_8 = -4.04214 \times 10^{-6}$
$A_{10} = 7.13230 \times 10^{-8}$
6th surface $K = -1.049$
$A_4 = 5.75023 \times 10^{-4}$
$A_6 = 4.25208 \times 10^{-5}$
$A_8 = -3.90797 \times 10^{-6}$
$A_{10} = 2.33024 \times 10^{-7}$
9th surface $K = 0.000$
$A_4 = 5.64046 \times 10^{-4}$
$A_6 = 1.68946 \times 10^{-4}$
$A_8 = -3.05871 \times 10^{-5}$
$A_{10} = 2.65663 \times 10^{-8}$ Zooming Data ($\infty$)

|  | WE | ST | TE |
|---|---|---|---|
| f (mm) | 5.900 | 10.000 | 17.298 |
| $F_{NO}$ | 3.28 | 4.10 | 5.60 |
| $\omega(°)$ | 32.4 | 20.1 | 11.8 |
| $d_4$ | 14.26 | 6.48 | 1.75 |
| $d_9$ | 10.78 | 15.06 | 22.68 |

EXAMPLE 12

$r_1 = 55.642$ (Aspheric)  $d_1 = 1.20$  $n_{d1} = 1.74320$  $v_{d1} = 49.34$
$r_2 = 4.430$ (Aspheric)  $d_2 = 2.76$  $n_{d2} = 1.84666$  $v_{d2} = 23.78$
$r_3 = 8.488$  $d_3 = 1.26$  $n_{d3} = 1.58913$  $v_{d3} = 61.14$
$r_4 = 14.269$  $d_4 = $ (Variable)
$r_5 = \infty$(Stop)  $d_5 = 0.20$  $n_{d5} = 1.53172$  $v_{d5} = 48.84$
$r_6 = 4.689$ (Aspheric)  $d_6 = 3.13$  $n_{d6} = 1.54771$  $v_{d6} = 62.84$
$r_7 = 18.694$  $d_7 = 0.80$  $n_{d7} = 1.51633$  $v_{d7} = 64.14$
$r_8 = 3.876$  $d_8 = 2.20$
$r_9 = -27.890$  $d_9 = $ (Variable)
(Aspheric)
$r_{10} = \infty$  $d_{10} = 0.96$
$r_{11} = \infty$  $d_{11} = 0.60$
$r_{12} = \infty$  $d_{12} = 0.50$
$r_{13} = \infty$  $d_{13} = 0.59$
$r_{14} = \infty$(Image Plane)

Aspherical Coefficients
1st surface $K = 0.000$
$A_4 = -8.94669 \times 10^{-5}$
$A_6 = 2.51229 \times 10^{-5}$
$A_8 = -1.11501 \times 10^{-6}$
$A_{10} = 1.65616 \times 10^{-8}$ 2nd surface $K = -0.581$
$A_4 = -1.77794 \times 10^{-4}$
$A_6 = 5.90851 \times 10^{-5}$
$A_8 = -2.93232 \times 10^{-6}$
$A_{10} = 4.10852 \times 10^{-8}$ 6th surface $K = -1.049$
$A_4 = 7.90160 \times 10^{-4}$
$A_6 = 3.43663 \times 10^{-5}$
$A_8 = -1.54908 \times 10^{-6}$
$A_{10} = 9.80210 \times 10^{-8}$ 9th surface $K = 0.000$
$A_4 = 1.74960 \times 10^{-3}$
$A_6 = 2.32186 \times 10^{-4}$
$A_8 = -3.07336 \times 10^{-5}$
$A_{10} = 4.08118 \times 10^{-6}$ Zooming Data (∞)

|  | WE | ST | TE |
|---|---|---|---|
| f (mm) | 5.900 | 10.000 | 17.300 |
| $F_{NO}$ | 3.22 | 4.07 | 5.60 |
| ω(°) | 32.4 | 20.0 | 11.8 |
| $d_4$ | 12.26 | 5.25 | 1.00 |
| $d_9$ | 8.80 | 12.62 | 19.44 |

EXAMPLE 13

$r_1 = 44.717$  $d_1 = 1.20$  $n_{d1} = 1.80610$  $v_{d1} = 40.92$
(Aspheric)
$r_2 = 4.314$ (Aspheric)  $d_2 = 2.31$  $n_{d2} = 1.84666$  $v_{d2} = 23.78$
$r_3 = 8.363$  $d_3 = 1.60$  $n_{d3} = 1.51633$  $v_{d3} = 64.14$
$r_4 = 17.227$  $d_4 = $ (Variable)  $n_{d4} = 1.84666$  $v_{d4} = 23.78$
$r_5 = \infty$(Stop)  $d_5 = -0.67$
$r_6 = 4.729$ (Aspheric)  $d_6 = 2.65$  $n_{d6} = 1.54771$  $v_{d6} = 62.84$
$r_7 = 7.916$  $d_7 = 1.71$  $n_{d7} = 1.51633$  $v_{d7} = 64.14$
$r_8 = 4.000$  $d_8 = 2.18$
$r_9 = -17.771$  $d_9 = $ (Variable)
(Aspheric)
$r_{10} = \infty$  $d_{10} = 0.96$
$r_{11} = \infty$  $d_{11} = 0.60$
$r_{12} = \infty$  $d_{12} = 0.50$
$r_{13} = \infty$  $d_{13} = 0.59$
$r_{14} = \infty$(Image Plane)

Aspherical Coefficients
1st surface $K = 0.000$
$A_4 = -5.90893 \times 10^{-5}$
$A_6 = 1.79215 \times 10^{-5}$
$A_8 = -9.21573 \times 10^{-7}$
$A_{10} = 1.44015 \times 10^{-8}$ 2nd surface $K = -0.581$
$A_4 = -1.67552 \times 10^{-4}$
$A_6 = 4.15060 \times 10^{-5}$
$A_8 = -2.49040 \times 10^{-8}$
$A_{10} = 1.56504 \times 10^{-8}$ 6th surface $K = -1.049$
$A_4 = 5.68560 \times 10^{-4}$
$A_6 = 5.71714 \times 10^{-5}$
$A_8 = -6.72813 \times 10^{-6}$
$A_{10} = 4.03870 \times 10^{-7}$ 9th surface $K = 0.000$
$A_4 = 1.20230 \times 10^{-3}$
$A_6 = 2.23098 \times 10^{-4}$
$A_8 = -3.33950 \times 10^{-5}$
$A_{10} = 3.72893 \times 10^{-6}$ Zooming Data (∞)

|  | WE | ST | TE |
|---|---|---|---|
| f (mm) | 5.900 | 10.000 | 17.300 |
| $F_{NO}$ | 3.18 | 4.04 | 5.60 |
| ω(°) | 32.4 | 20.0 | 11.8 |
| $d_4$ | 13.12 | 6.12 | 1.87 |
| $d_9$ | 8.72 | 12.55 | 19.37 |

EXAMPLE 14

$r_1 = 29.039$  $d_1 = 1.20$  $n_{d1} = 1.80610$  $v_{d1} = 40.92$
(Aspheric)
$r_2 = 4.131$ (Aspheric)  $d_2 = 2.42$  $n_{d2} = 1.84666$  $v_{d2} = 23.78$
$r_3 = 8.463$  $d_3 = 1.59$  $n_{d3} = 1.69350$  $v_{d3} = 53.21$
$r_4 = 16.861$  $d_4 = $ (Variable)  $n_{d4} = 1.84666$  $v_{d4} = 23.78$
$r_5 = \infty$(Stop)  $d_5 = -0.63$  $n_{d5} = 1.51633$  $v_{d5} = 64.14$
$r_6 = 5.210$ (Aspheric)  $d_6 = 3.61$  $n_{d6} = 1.54771$  $v_{d6} = 62.84$
$r_7 = 8.645$  $d_7 = 0.80$  $n_{d7} = 1.51633$  $v_{d7} = 64.14$
$r_8 = 4.000$  $d_8 = 2.13$
$r_9 = -19.760$  $d_9 = $ (Variable)
(Aspheric)
$r_{10} = \infty$  $d_{10} = 0.96$
$r_{11} = \infty$  $d_{11} = 0.60$
$r_{12} = \infty$  $d_{12} = 0.50$
$r_{13} = \infty$  $d_{13} = 0.59$
$r_{14} = \infty$(Image Plane)

Aspherical Coefficients
1st surface $K = 0.000$
$A_4 = -4.81576 \times 10^{-4}$
$A_6 = 3.37241 \times 10^{-5}$
$A_8 = -1.19307 \times 10^{-6}$
$A_{10} = 1.60299 \times 10^{-8}$ 2nd surface $K = -0.581$
$A_4 = -7.65399 \times 10^{-4}$ -continued $A_6 = 5.88994 \times 10^{-5}$
$A_8 = -3.05758 \times 10^{-8}$
$A_{10} = 3.85209 \times 10^{-8}$
6th surface $K = -1.049$
$A_4 = 5.31742 \times 10^{-4}$
$A_6 = 3.33267 \times 10^{-5}$
$A_8 = -3.44935 \times 10^{-6}$
$A_{10} = 2.04670 \times 10^{-7}$
9th surface $K = 0.000$
$A_4 = 1.42238 \times 10^{-3}$
$A_6 = 2.58981 \times 10^{-4}$
$A_8 = -4.02583 \times 10^{-5}$
$A_{10} = 4.70177 \times 10^{-6}$ Zooming Data ($\infty$)

|  | WE | ST | TE |
|---|---|---|---|
| f (mm) | 5.900 | 10.000 | 17.300 |
| $F_{NO}$ | 3.15 | 4.02 | 5.60 |
| $\omega(°)$ | 32.4 | 20.0 | 11.8 |
| $d_4$ | 12.83 | 5.98 | 1.83 |
| $d_9$ | 8.20 | 11.94 | 18.59 |

EXAMPLE 15

$r_1 = 37.425$       $d_1 = 1.20$          $n_{d1} = 1.80610$   $\nu_{d1} = 40.92$
$r_2 = 4.340$ (Aspheric)   $d_2 = 2.33$
$r_3 = 8.271$        $d_3 = 1.62$          $n_{d2} = 1.84666$   $\nu_{d2} = 23.78$
$r_4 = 16.244$       $d_4 = $ (Variable)
$r_5 = \infty$ (Stop)    $d_5 = -0.69$
$r_6 = 4.921$ (Aspheric)   $d_6 = 3.18$   $n_{d3} = 1.58313$   $\nu_{d3} = 59.38$
$r_7 = 7.888$        $d_7 = 1.19$          $n_{d4} = 1.84666$   $\nu_{d4} = 23.78$
$r_8 = 4.000$        $d_8 = 2.21$          $n_{d5} = 1.51633$   $\nu_{d5} = 64.14$
$r_9 = -18.220$ (Aspheric)   $d_9 = $ (Variable)
$r_{10} = \infty$    $d_{10} = 1.40$       $n_{d6} = 1.51633$   $\nu_{d6} = 64.14$
$r_{11} = \infty$    $d_{11} = 1.20$
$r_{12} = \infty$ (Image Plane)

Aspherical Coefficients

2nd surface $K = -0.616$
$A_4 = 4.19816 \times 10^{-5}$
$A_6 = 3.00998 \times 10^{-6}$
$A_8 = -5.10775 \times 10^{-7}$
$A_{10} = 1.25720 \times 10^{-8}$
6th surface $K = -1.054$
$A_4 = 5.11035 \times 10^{-4}$
$A_6 = 5.98520 \times 10^{-5}$
$A_8 = -7.46930 \times 10^{-8}$
$A_{10} = 4.30043 \times 10^{-7}$
9th surface $K = -3.568$
$A_4 = 1.01719 \times 10^{-3}$
$A_6 = 2.98170 \times 10^{-4}$
$A_8 = 5.10422 \times 10^{-5}$
$A_{10} = 5.07257 \times 10^{-6}$ Zooming Data ($\infty$)

|  | WE | ST | TE |
|---|---|---|---|
| f (mm) | 5.950 | 10.090 | 17.100 |
| $F_{NO}$ | 3.05 | 3.88 | 5.30 |
| $\omega(°)$ | 32.2 | 19.8 | 11.9 |
| $d_4$ | 13.06 | 6.02 | 1.87 |
| $d_9$ | 8.41 | 12.17 | 18.56 |

EXAMPLE 16

$r_1 = 24.168$       $d_1 = 1.20$          $n_{d1} = 1.77250$   $\nu_{d1} = 49.60$
$r_2 = 3.625$ (Aspheric)   $d_2 = 1.71$
$r_3 = 5.714$        $d_3 = 1.68$          $n_{d2} = 1.75520$   $\nu_{d2} = 27.51$
$r_4 = 10.180$       $d_4 = $ (Variable)
$r_5 = \infty$ (Stop)    $d_5 = -0.35$
$r_6 = 3.233$ (Aspheric)   $d_6 = 1.43$   $n_{d3} = 1.58313$   $\nu_{d3} = 59.38$
$r_7 = 6.623$        $d_7 = 0.80$          $n_{d4} = 1.80809$   $\nu_{d4} = 22.76$
$r_8 = 3.386$        $d_8 = 0.44$
$r_9 = 11.388$       $d_9 = 1.55$          $n_{d5} = 1.61800$   $\nu_{d5} = 63.33$
$r_{10} = -6.894$    $d_{10} = $ (Variable)
$r_{11} = \infty$    $d_{11} = 1.40$       $n_{d6} = 1.51633$   $\nu_{d6} = 64.14$
$r_{12} = \infty$    $d_{12} = 0.60$
$r_{13} = \infty$    $d_{13} = 0.50$       $n_{d7} = 1.51633$   $\nu_{d7} = 64.14$
$r_{14} = \infty$    $d_{14} = 0.20$
$r_{15} = \infty$ (Image Plane)

Aspherical Coefficients

2nd surface $K = -0.465$
$A_4 = -3.25794 \times 10^{-11}$
$A_6 = 3.11677 \times 10^{-13}$
$A_8 = 8.29472 \times 10^{-7}$
$A_{10} = 0$
6th surface $K = -0.640$
$A_4 = -2.72851 \times 10^{-7}$
$A_6 = 6.13668 \times 10^{-6}$
$A_8 = 5.73050 \times 10^{-6}$
$A_{10} = 0$ Zooming Data ($\infty$)

|  | WE | ST | TE |
|---|---|---|---|
| f (mm) | 5.943 | 8.190 | 11.468 |
| $F_{NO}$ | 3.70 | 4.23 | 5.00 |
| $\omega(°)$ | 32.5 | 24.3 | 17.6 |
| $d_4$ | 7.41 | 3.96 | 1.35 |
| $d_{10}$ | 7.75 | 9.51 | 12.06 |

EXAMPLE 17

$r_1 = 35.760$       $d_1 = 1.20$          $n_{d1} = 1.78800$   $\nu_{d1} = 47.37$
$r_2 = 5.628$ (Aspheric)   $d_2 = 3.64$
$r_3 = 10.133$       $d_3 = 2.20$          $n_{d2} = 1.84666$   $\nu_{d2} = 23.78$
$r_4 = 15.141$       $d_4 = $ (Variable)
$r_5 = \infty$ (Stop)    $d_5 = -0.95$
$r_6 = 5.632$ (Aspheric)   $d_6 = 3.30$   $n_{d3} = 1.58313$   $\nu_{d3} = 59.38$
$r_7 = 6.219$        $d_7 = 0.80$          $n_{d4} = 1.84666$   $\nu_{d4} = 23.78$
$r_8 = 4.000$        $d_8 = 3.45$          $n_{d5} = 1.51633$   $\nu_{d5} = 64.14$
$r_9 = -45.099$ (Aspheric)   $d_9 = $ (Variable)
$r_{10} = \infty$    $d_{10} = 0.96$       $n_{d6} = 1.54771$   $\nu_{d6} = 62.84$
$r_{11} = \infty$    $d_{11} = 0.60$
$r_{12} = \infty$    $d_{12} = 0.50$       $n_{d7} = 1.51633$   $\nu_{d7} = 64.14$
$r_{13} = \infty$    $d_{13} = 0.60$
$r_{14} = \infty$ (Image Plane)

Aspherical Coefficients

2nd surface $K = -0.361$
$A_4 = -9.89818 \times 10^{-5}$
$A_6 = -3.06132 \times 10^{-11}$
$A_8 = -1.51826 \times 10^{-7}$
$A_{10} = 2.27800 \times 10^{-12}$
6th surface $K = -1.662$
$A_4 = 9.33564 \times 10^{-4}$
$A_6 = 5.03483 \times 10^{-7}$ -continued $A_8 = 1.84834 \times 10^{-7}$
$A_{10} = 4.02667 \times 10^{-10}$
9th surface $K = 0.000$
$A_4 = 7.83696 \times 10^{-4}$
$A_6 = 2.51279 \times 10^{-5}$
$A_8 = -3.63478 \times 10^{-8}$
$A_{10} = 1.19580 \times 10^{-7}$ Zooming Data (∞)

|  | WE | ST | TE |
|---|---|---|---|
| f (mm) | 5.936 | 11.588 | 22.985 |
| $F_{NO}$ | 2.78 | 3.71 | 5.61 |
| ω (°) | 32.7 | 17.4 | 8.9 |
| $d_4$ | 21.73 | 8.89 | 2.20 |
| $d_9$ | 9.91 | 15.14 | 25.73 |

FIGS. 18 to 31 are aberration diagrams for Examples 1 to 14 upon focused on an infinite object point. In these figures, (a), (b) and (c) show spherical aberrations, astigmatism, distortion and chromatic aberration of magnification at the wide-angle end, in an intermediate state and at the telephoto end, respectively. "FIY" stands for an image height.

Tabulated below are the values of conditions (1) through (17) in Examples 1 to 10.

| Example | 1 | 2 | 3 | 4 | 5 |
|---|---|---|---|---|---|
| (1) | 1.205 | 1.216 | 1.356 | 1.130 | — |
| (2) | 0.342 | 0.325 | 0.576 | 0.509 | 1.138 |
| (3) | 0.030 | 0.029 | 0.085 | 0.079 | 0.034 |
| (4) | 1.510 | 1.515 | 2.037 | 1.426 | 1.656 |
| (5) | 0.304 | 0.304 | 0.350 | 0.350 | — |
| (6) | 46.50 | 46.50 | 57.70 | 57.70 | — |
| (7) | 81.54 | 81.54 | 81.54 | 81.50 | 81.50 |
| (8) | 0.028 | 0.028 | 0.028 | 0.028 | 0.028 |
| (9) | 0.573 | 0.574 | 0.551 | 0.571 | 0.579 |
| (10) | 1.73 | 1.69 | 1.79 | 1.79 | 1.79 |
| (11) | 30.90 | 29.43 | 23.59 | 23.59 | 23.59 |
| (12) | -4.654 | -4.632 | -4.178 | -3.947 | -3.860 |
| (13) | 1.0 | 1.0 | 1.0 | 1.0 | 1.0 |
| (14) | 0.04 | 0.04 | 0.04 | 0.04 | 0.04 |
| (15) | 0.0 | 0.0 | 0.0 | 0.0 | 0.0 |
| (16) | 1.06 | 1.06 | 1.06 | 1.06 | 1.06 |
| (17) | 0.333 | 0.333 | 0.333 | 0.333 | 0.333 |
|  | (a = 3.0) | (a = 3.0) | (a = 3.0) | (a = 3.0) | (a = 3.0) |

| Example | 6 | 7 | 8 | 9 | 10 |
|---|---|---|---|---|---|
| (1) | 1.270 | 0.790 | 0.895 | — | 1.124 |
| (2) | 0.615 | 0.071 | 0.095 | 0.490 | 0.251 |
| (3) | 0.051 | 0.131 | 0.112 | 0.066 | 0.137 |
| (4) | 1.588 | 1.743 | 2.118 | 1.594 | 2.198 |
| (5) | 0.350 | 0.041 | 0.153 | — | 0.041 |
| (6) | 57.76 | 17.14 | 29.42 | — | 16.96 |
| (7) | 81.54 | 40.92 | 53.20 | 61.14 | 40.74 |
| (8) | 0.028 | -0.007 | -0.008 | -0.004 | -0.007 |
| (9) | 0.568 | — | — | — | — |
| (10) | 1.79 | — | 1.74 | 1.69 | — |
| (11) | 23.59 | — | 25.50 | 21.11 | — |
| (12) | -3.832 | — | -4.029 | -2.490 | — |
| (13) | 1.0 | 1.0 | 1.0 | 1.0 | 1.0 |
| (14) | 0.04 | 0.04 | 0.04 | 0.04 | 0.04 |
| (15) | 0.0 | 0.0 | 0.0 | 0.0 | 0.0 |
| (16) | 1.06 | 1.06 | 1.06 | 1.06 | 1.06 |
| (17) | 0.333 | 0.333 | 0.333 | 0.333 | 0.333 |
|  | (a = 3.0) | (a = 3.0) | (a = 3.0) | (a = 3.0) | (a = 3.0) |

The values of conditions (1) to (22) in Examples 11 to 17 are set out below.

| Example | 11 | 12 | 13 | 14 |
|---|---|---|---|---|
| (1) | 0.835 | 0.827 | 0.846 | 0.768 |
| (2) | 0.129 | 0.316 | 0.745 | 0.682 |
| (3) | 0.000 | 0.000 | 0.000 | 0.000 |
| (4) | 1.011 | 1.112 | 1.110 | 1.126 |
| (5) | 0.294 | 0.166 | 0.330 | 0.153 |
| (6) | 20.38 | 33.63 | 40.36 | 29.43 |
| (7) | 61.14 | 61.14 | 64.14 | 53.21 |
| (8) | -0.0018 | -0.0018 | -0.0024 | 0.0081 |
| (9) | 0.573 | 0.583 | 0.593 | 0.598 |
| (10) | 1.74 | 1.74 | 1.81 | 1.81 |
| (11) | 25.56 | 25.56 | 17.14 | 17.14 |
| (12) | -3.384 | -3.937 | -2.887 | -3.016 |
| (13) | 1.0 | 1.0 | 1.0 | 1.0 |
| (14) | 0.04 | 0.04 | 0.04 | 0.04 |
| (15) | 0.0 | 0.0 | 0.0 | 0.0 |
| (16) | 1.06 | 1.06 | 1.06 | 1.06 |
| (17) | 0.333 | 0.333 | 0.333 | 0.333 |
|  | (a = 3.0) | (a = 3.0) | (a = 3.0) | (a = 3.0) |
| (18) | -0.31907 | -0.71215 | -0.57964 | -0.58270 |
| (19) | 1.01864 | 1.03898 | 1.10847 | 1.10847 |
| (20) | 0.02584 | 0.02091 | 0.00765 | 0.00902 |
| (21) | $2.1743 \times 10^{-4}$ | $6.5178 \times 10^{-4}$ | $1.3206 \times 10^{-3}$ | $1.2013 \times 10^{-3}$ |
| (22) | 0.23536 | 0.07752 | 0.21824 | 0.13258 |

| Example | 15 | 16 | 17 |
|---|---|---|---|
| (1) | — | 1.047 | — |
| (2) | 1.488 | 0.897 | 1.484 |
| (3) | 0 | 0.074 | 0 |
| (4) | — | 1.114 | — |
| (5) | — | — | — |
| (6) | 40.36 | 0.225 | 40.36 |
| (7) | 59.38 | 59.38 | 59.38 |
| (8) | -0.002 | -0.002 | -0.002 |
| (9) | 0.596 | 0.696 | 0.512 |
| (10) | 1.8061 | 1.7725 | 1.788 |
| (11) | 17.14 | 22.09 | 23.59 |
| (12) | -3.075 | -3.559 | -5.050 |
| (13) | 1 | 1 | 1 |
| (14) | 0.04 | 0.04 | 0.04 |
| (15) | 0 | 0 | 0 |
| (16) | 0.06 | 0.06 | 0.06 |
| (17) | 0.333 | 0.333 | 0.333 |
|  | (a = 3.0) | (a = 3.0) | (a = 3.0) |
| (18) | -0.57472 | -0.36153 | -0.77796 |
| (19) | 1.106826 | — | 1.27128 |
| (20) | 0.007593 | — | 0.00398 |
| (21) | 0.001336 | — | 0.00134 |
| (22) | 0.178566 | — | 0.17857 |

It is noted that in Examples 1 to 17, the low-pass filter LF has a total thickness of 1.000 mm and a triple-layer structure. It is also appreciated that many modifications may be made to the aforesaid examples without departing from the scope of the invention. For instance, the low-pass filter LF may be formed of one single low-pass filter element.

Figure 32:
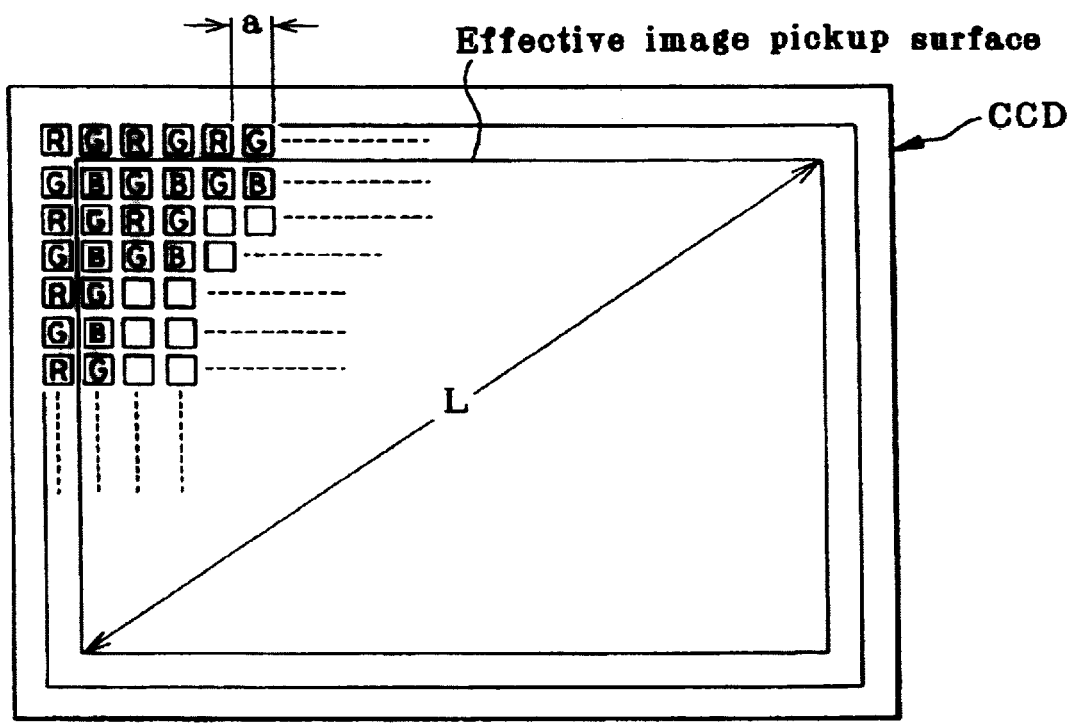
FIG. 32 is illustrative of the diagonal length and the pixel spacing of the effective image pickup plane of an electronic image pickup device upon phototaking.

Here the diagonal length L of the effective image pickup plane and the pixel spacing a are explained. FIG. 32 is illustrative of one exemplary pixel array of an image pickup device, wherein R (red), G (green) and B (blue) pixels or four cyan, magenta, yellow and green (G) pixels are mosaically arranged at the pixel spacing a. The "effective image pickup plane" used herein is understood to mean a certain area in the photoelectric conversion surface on an image pickup device used for the reproduction of a phototaken image (on a personal computer or by a printer). The effective image pickup plane shown in FIG. 8 is set at an area narrower than the total photoelectric conversion surface on the image pickup device, depending on the performance of the optical system used (an image circle that can be ensured by the performance of the optical system). Thus, the diagonal length L of an effective image pickup plane is defined by that of the effective image pickup plane. Although the image pickup range used for image reproduction may be variable, it is noted that when the zoom lens of the invention is used on an imaging system having such functions, the diagonal length L of its effective image pickup plane varies. In that case, the diagonal length L of the effective image pickup plane according to the invention is defined by the maximum value in the widest possible range for L.

The infrared cut means includes an infrared cut absorption filer and an infrared sharp cut coat. The infrared cut absorption filter is formed of a glass having an infrared absorber therein, and the infrared sharp cut coat cuts infrared rays by reflection rather than by absorption. Instead of this infrared cut absorption filter, it is thus acceptable to use a low-pass filter or dummy transparent plane plate with an infrared sharp cut coat applied directly thereon, as already mentioned.

Preferable in this case, the near-infrared sharp cut coat is designed to have a transmittance of at least 80% at 600-nm wavelength and a transmittance of up to 10% at 700-nm wavelength. More specifically, the near-infrared sharp cut coat has a multilayer structure made up of such 27 layers as mentioned below; however, the design wavelength is 780 nm.

| Substrate | Material | Physical Thickness (nm) | λ/4 |
| --- | --- | --- | --- |
| 1st layer | Al$_2$O$_3$ | 58.96 | 0.50 |
| 2nd layer | TiO$_2$ | 84.19 | 1.00 |
| 3rd layer | SiO$_2$ | 134.14 | 1.00 |
| 4th layer | TiO$_2$ | 84.19 | 1.00 |
| 5th layer | SiO$_2$ | 134.14 | 1.00 |
| 6th layer | TiO$_2$ | 84.19 | 1.00 |
| 7th layer | SiO$_2$ | 134.14 | 1.00 |
| 8th layer | TiO$_2$ | 84.19 | 1.00 |
| 9th layer | SiO$_2$ | 134.14 | 1.00 |
| 10th layer | TiO$_2$ | 84.19 | 1.00 |
| 11th layer | SiO$_2$ | 134.14 | 1.00 |
| 12th layer | TiO$_2$ | 84.19 | 1.00 |
| 13th layer | SiO$_2$ | 134.14 | 1.00 |
| 14th layer | TiO$_2$ | 84.19 | 1.00 |
| 15th layer | SiO$_2$ | 178.41 | 1.33 |
| 16th layer | TiO$_2$ | 101.03 | 1.21 |
| 17th layer | SiO$_2$ | 167.67 | 1.25 |
| 18th layer | TaO$_2$ | 96.82 | 1.15 |
| 19th layer | SiO$_2$ | 147.55 | 1.05 |
| 20th layer | TiO$_2$ | 84.19 | 1.00 |
| 21st layer | SiO$_2$ | 160.97 | 1.20 |
| 22nd layer | TiO$_2$ | 84.19 | 1.00 |
| 23rd layer | SiO$_2$ | 154.26 | 1.15 |
| 24th layer | TiO$_2$ | 95.13 | 1.13 |
| 25th layer | SiO$_2$ | 160.97 | 1.20 |
| 26th layer | TiO$_2$ | 99.34 | 1.18 |
| 27th layer | SiO$_2$ | 87.19 | 0.65 |

Air

Figure 33:
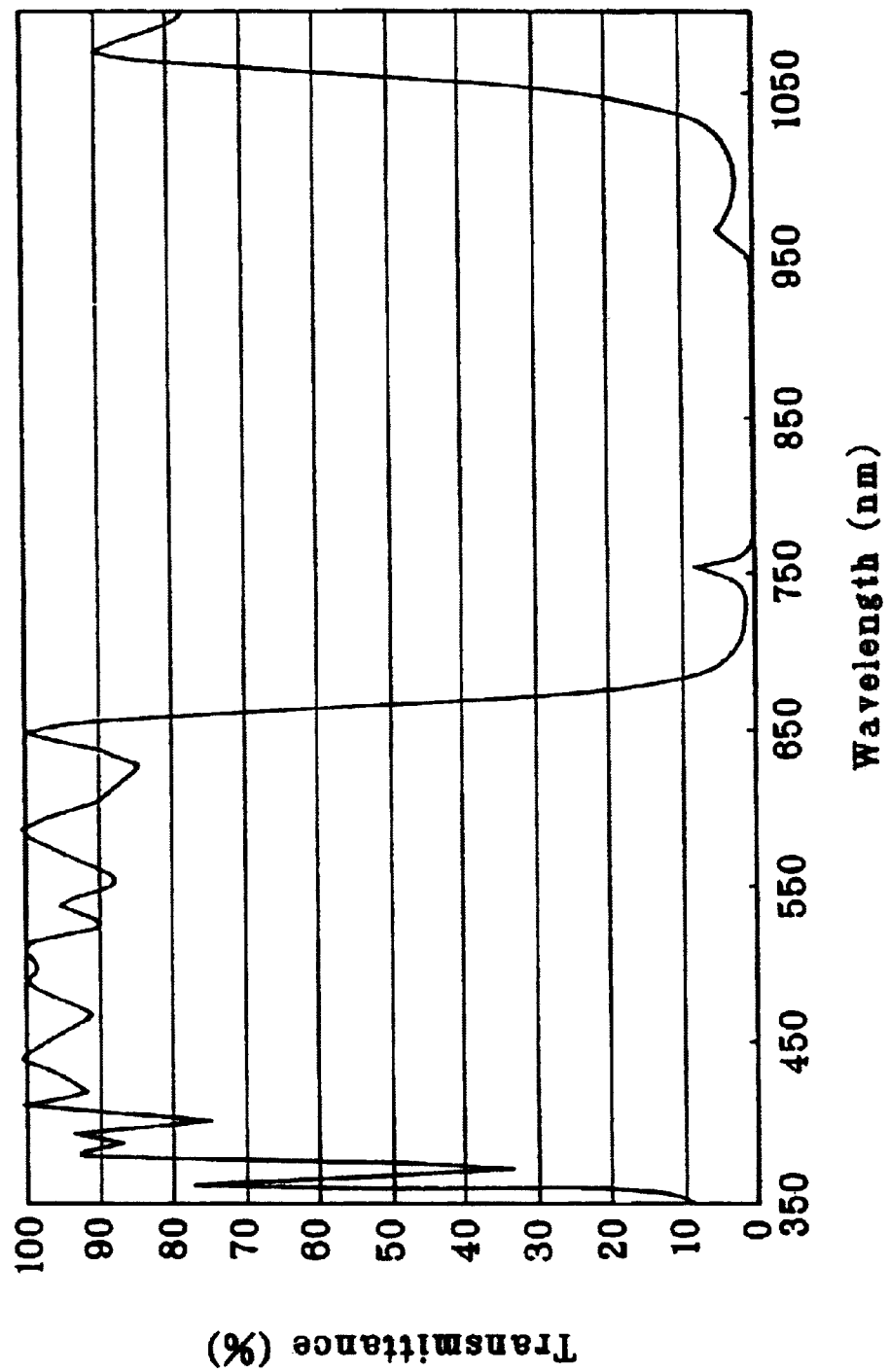
FIG. 33 is a diagram indicative of the transmittance characteristics of one example of the near-infrared sharp cut coat.

The aforesaid near-infrared sharp cut coat has such transmittance characteristics as shown in FIG. 33.

Figure 34:
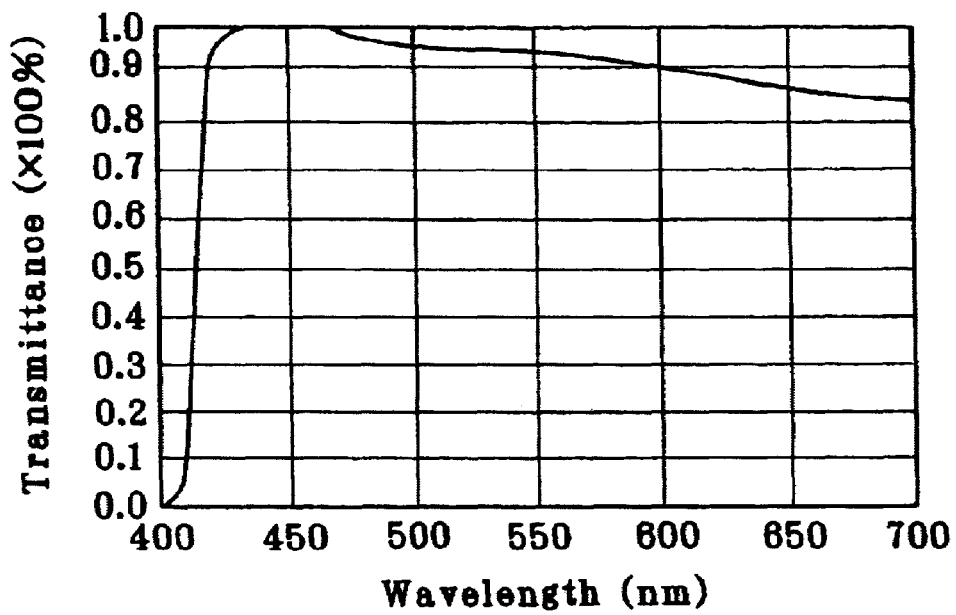
FIG. 34 is a diagram indicative of the transmittance characteristics of one example of the color filter located on the exit surface side of the low-pass filter.

The low-pass filter is provided on its exit surface side with a color filter or coat for reducing the transmission of colors at such a short wavelength region as shown in FIG. 34, thereby further enhancing the color reproducibility of an electronic image.

Preferably, that filter or coat should be designed such that the ratio of the transmittance of 420-nm wavelength with respect to the transmittance of a wavelength in the range of 400 nm to 700 nm at which the highest transmittance is found is at least 15% and that the ratio of 400-nm wavelength with respect to the highest wavelength transmittance is up to 6%.

It is thus possible to reduce a discernible difference between the colors perceived by the human eyes and the colors of the image to be picked up and reproduced. In other words, it is possible to prevent degradation in images due to the fact that a color of short wavelength less likely to be perceived through the human sense of sight can be readily seen by the human eyes.

When the ratio of the 400 nm wavelength transmittance is greater than 6%, the short wavelength region less likely to be perceived by the human eyes would be reproduced with perceivable wavelengths. Conversely, when the ratio of the 420 nm wavelength transmittance is less than 15%, a wavelength region perceivable by the human eyes is less likely to be reproduced, putting colors in an ill-balanced state.

Such means for limiting wavelengths can be more effective for imaging systems using a complementary colors mosaic filter.

In each of the aforesaid examples, coating is applied in such a way that, as shown in FIG. 34, the transmittance for 400-nm wavelength is 0%, the transmittance for 420 nm is 90%, and the transmittance for 440 nm peaks or reaches 100%.

With the synergistic action of the aforesaid near-infrared sharp cut coat and that coating, the transmittance for 400 nm is set at 0%, the transmittance for 420 nm at 80%, the transmittance for 600 nm at 82%, and the transmittance for 700 nm at 2% with the transmittance for 450 nm wavelength peaking at 99%, thereby ensuring more faithful color reproduction.

The low-pass filter is made up of three different filter elements stacked one upon another in the optical axis direction, each filter element having crystallographic axes in directions where, upon projected onto the image plane, the azimuth angle is horizontal (=0°) and ±45° therefrom. Three such filter elements are mutually displaced by $\underline{a}$ μm in the horizontal direction and by SQRT(½)×$\underline{a}$ in the ±45° direction for the purpose of moiré control, wherein SQRT means a square root.

Figure 35:
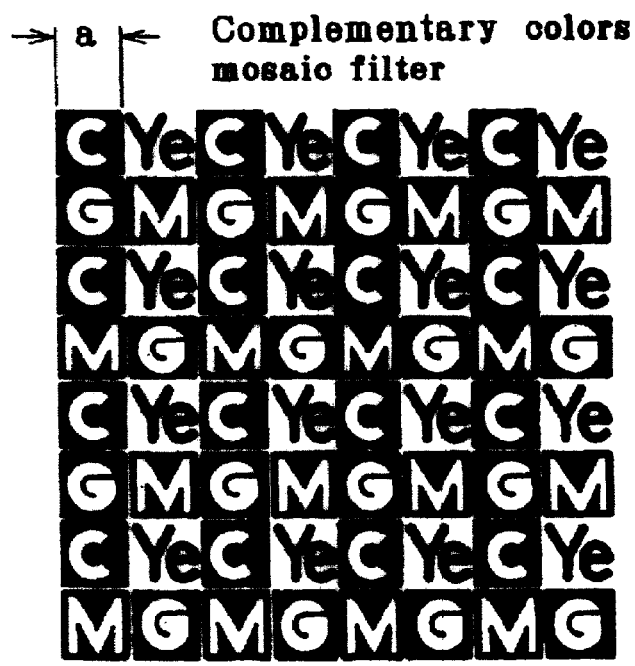
FIG. 35 is a schematic illustrative of how the color filter elements are arranged in the complementary colors filter.

The image pickup plane I of a CCD is provided thereon with a complementary mosaic filter wherein, as shown in FIG. 35, color filter elements of four colors, cyan, magenta, yellow and green are arranged in a mosaic fashion corresponding to image pickup pixels. More specifically, these four different color filter elements, used in almost equal numbers, are arranged in such a mosaic fashion that neighboring pixels do not correspond to the same type of color filter elements, thereby ensuring more faithful color reproduction.

To be more specific, the complementary colors mosaic filter is composed of at least four different color filter elements as shown in FIG. 35, which should preferably have such characteristics as given below.

Each green color filter element G has a spectral strength peak at a wavelength $G_P$, each yellow filter element $Y_e$ has a spectral strength peak at a wavelength $Y_P$, each cyan filter element C has a spectral strength peak at a wavelength $C_P$, and each magenta filter element M has spectral strength peaks at wavelengths $M_{P1}$ and $M_{P2}$, and these wavelengths satisfy the following conditions.

$510 \text{ nm} < G_P < 540 \text{ nm}$ $5 \text{ nm} < Y_P - G_P < 35 \text{ nm}$ $-100 \text{ nm} < C_P - G_P < -5 \text{ nm}$ $430 \text{ nm} < M_{P1} < 480 \text{ nm}$ $580 \text{ nm} < M_{P2} < 640 \text{ nm}$ To ensure higher color reproducibility, it is preferred that the green, yellow and cyan filter elements have a strength of at least 80% at 530 nm wavelength with respect to their respective spectral strength peaks, and the magenta filter elements have a strength of 10% to 50% at 530 nm wavelength with respect to their spectral strength peak.

Figure 36:
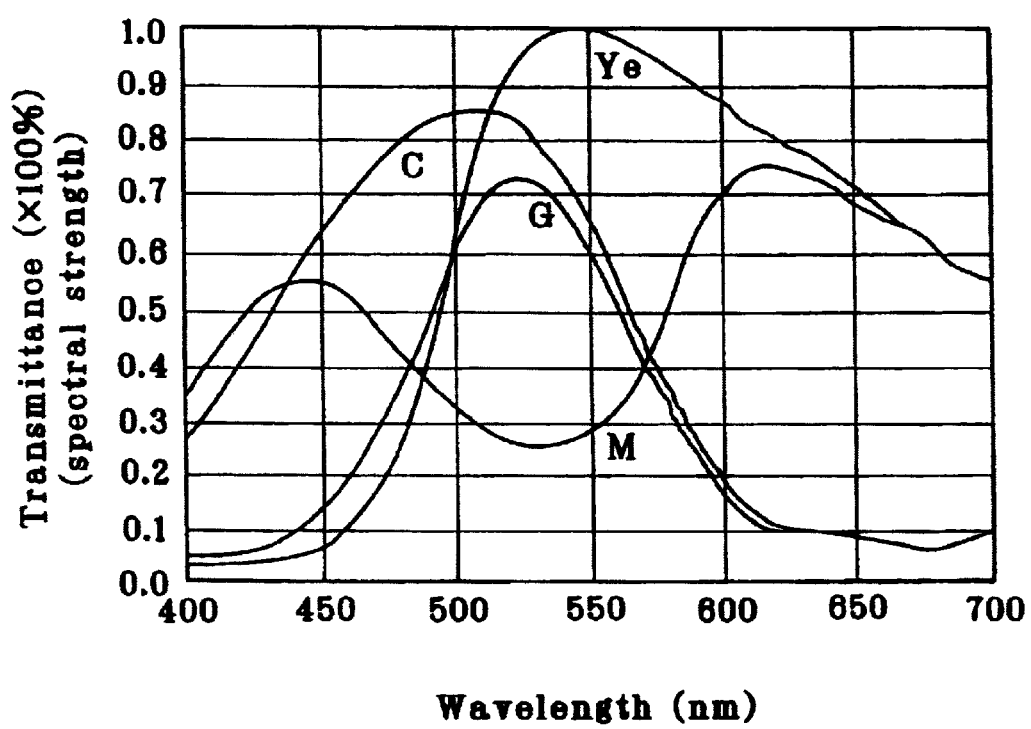
FIG. 36 is a diagram indicative of one example of the wavelength characteristics of the complementary colors mosaic filter.

One example of the wavelength characteristics in the aforesaid respective examples is shown in FIG. 36. The green filter element G has a spectral strength peak at 525 nm. The yellow filter element $Y_e$ has a spectral strength peak at 555 nm. The cyan filter element C has a spectral strength peak at 510 nm. The magenta filter element M has peaks at 445 nm and 620 nm. At 530 nm, the respective color filter elements have, with respect to their respective spectral strength peaks, strengths of 99% for G, 95% for $Y_e$, 97% for C and 38% for M.

For such a complementary colors filter, such signal processing as mentioned below is electrically carried out by means of a controller (not shown) (or a controller used with digital cameras).

For luminance signals, $Y = |G + M + Y_e + C| \times \frac{1}{4}$

For chromatic signals, $R - Y = |(M + Y_e) - (G + C)|$ $B - Y = |(M + C) - (G + Y_e)|$ Through this signal processing, the signals from the complementary colors filter are converted into R (red), G (green) and B (blue) signals.

In this regard, it is noted that the aforesaid near-infrared sharp cut coat may be located anywhere on the optical path, and that the number of low-pass filters may be either two as mentioned above or one.

The electronic imaging system of the present invention constructed as described above may be applied to phototaking systems where object images formed through zoom lenses are received at image pickup devices such as CCDs, inter alia, digital cameras or video cameras as well as PCs and telephone sets which are typical information processors, in particular, easy-to-carry cellular phones. A specific embodiment is now given.

Figure 37:
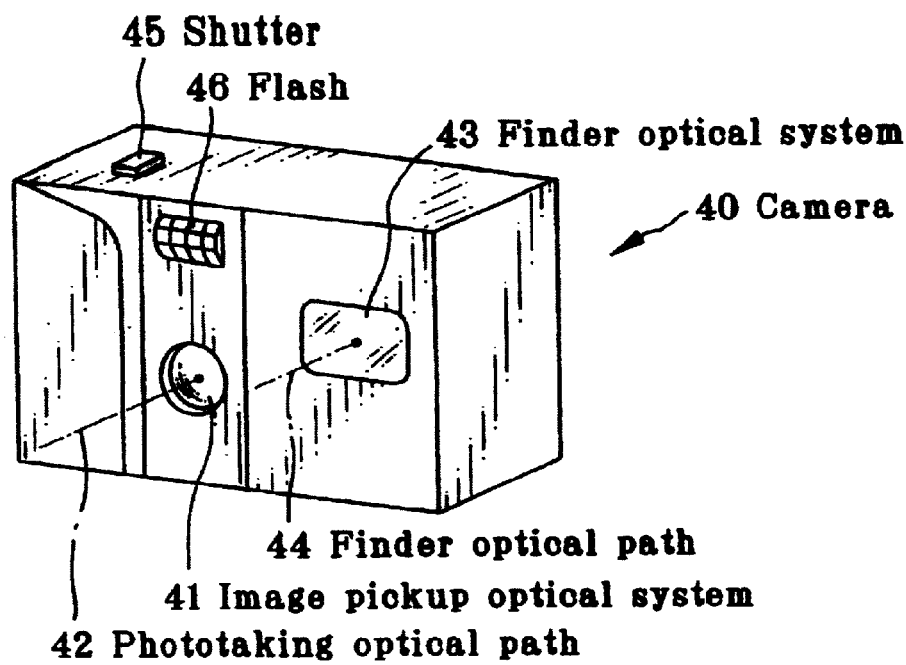
FIG. 37 is a front perspective schematic illustrative of the outside shape of a digital camera with the inventive zoom lens built therein.
Figure 38:
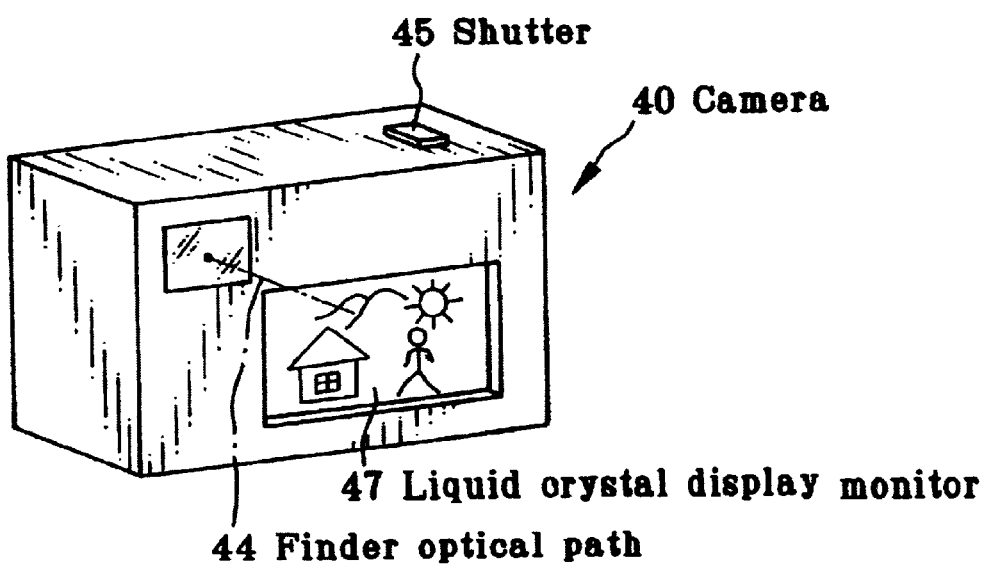
FIG. 38 is a rear perspective schematic of the digital camera of FIG. 37.
Figure 39:
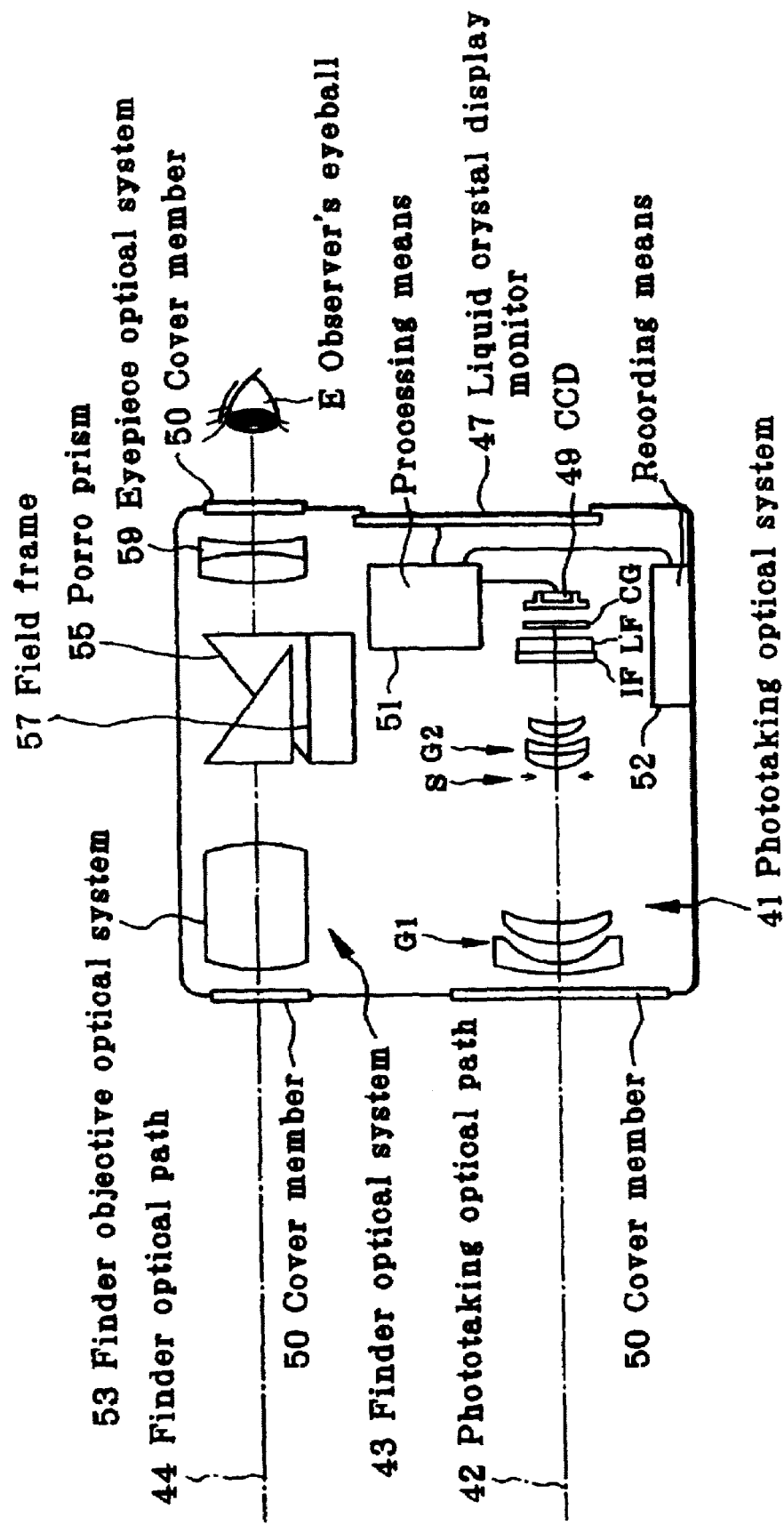
FIG. 39 is a sectional schematic of the digital camera of FIG. 37.

FIGS. 37, 38 and 39 are conceptual illustrations of a phototaking optical system 41 for digital cameras, in which the zoom lens of the present invention is incorporated. FIG. 37 is a front perspective view of the outside shape of a digital camera 40, and FIG. 38 is a rear perspective view of the same. FIG. 39 is a sectional view of the construction of the digital camera 40. In this embodiment, the digital camera 40 comprises a photo-taking optical system 41 including a phototaking optical path 42, a finder optical system 43 including a finder optical path 44, a shutter 45, a flash 46, a liquid crystal monitor 47 and so on. As the shutter 45 mounted on the upper portion of the camera 40 is pressed down, phototaking takes place through the phototaking optical system 41, for instance, the zoom lens according to Example 1. An object image formed by the phototaking optical system 41 is formed on the image pickup plane of a CCD 49 via an infrared cut absorption filter IF comprising a dummy transparent plane plate provided thereon with a near-infrared cut coat and an optical low-pass filter LF. The object image received at CCD 49 is shown as an electronic image on the liquid crystal monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver-halide camera using a silver-halide film in place of CCD 49.

Moreover, a finder objective optical system 53 is located on the finder optical path 44. An object image formed by the finder objective optical system 53 is in turn formed on the field frame 57 of a Porro prism 55 that is an image-erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus set up digital camera 40, it is possible to achieve high performance and cost reductions, because the phototaking optical system 41 is constructed of a fast zoom lens having a high zoom ratio at the wide-angle end with satisfactory aberrations and a back focus large enough to receive a filter, etc. therein.

Figure 23A:
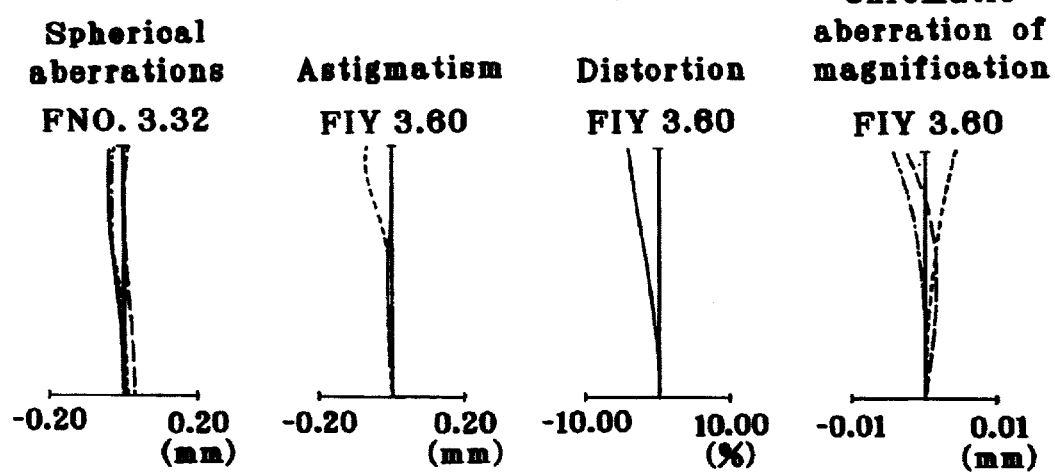
FIGS. 23(a), 23(b) and 23(c) are aberration diagrams for Example 6 upon focused on an object point at infinity.
Figure 23B:
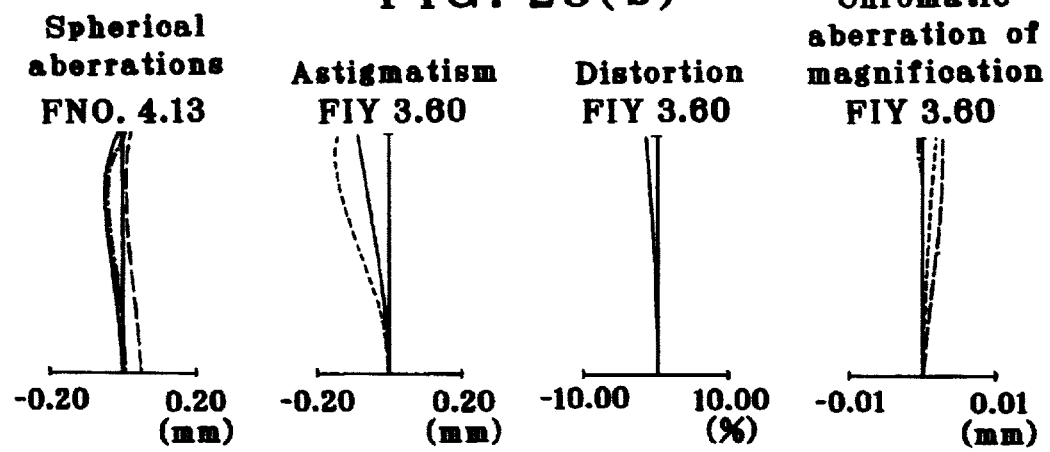
Figure 23C:
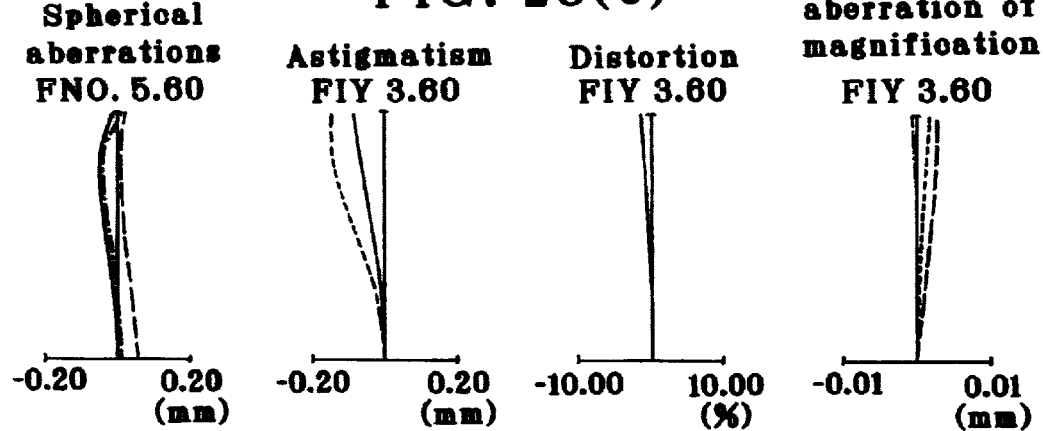
Figure 24A:
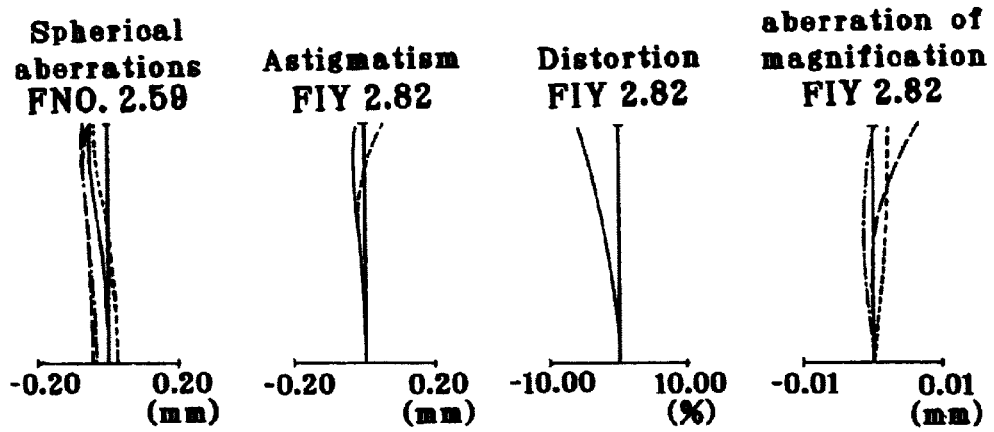
FIGS. 24(a), 24(b) and 24(c) are aberration diagrams for Example 7 upon focused on an object point at infinity.
Figure 24B:
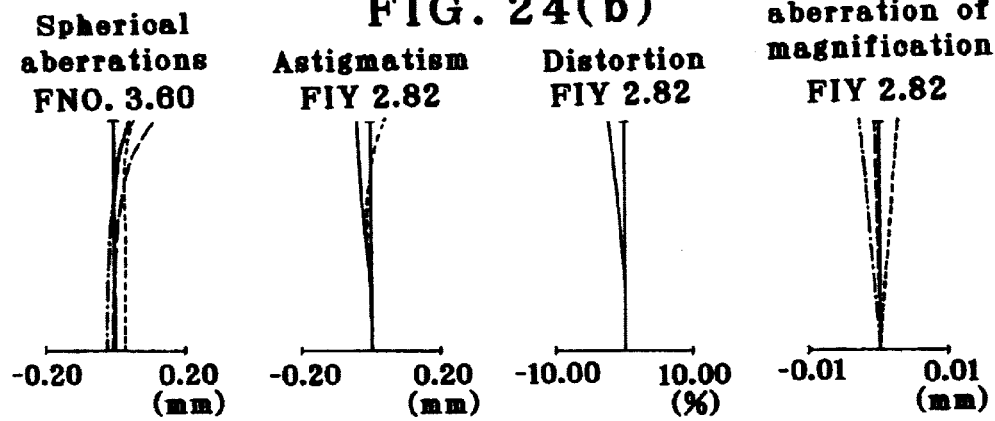
Figure 24C:
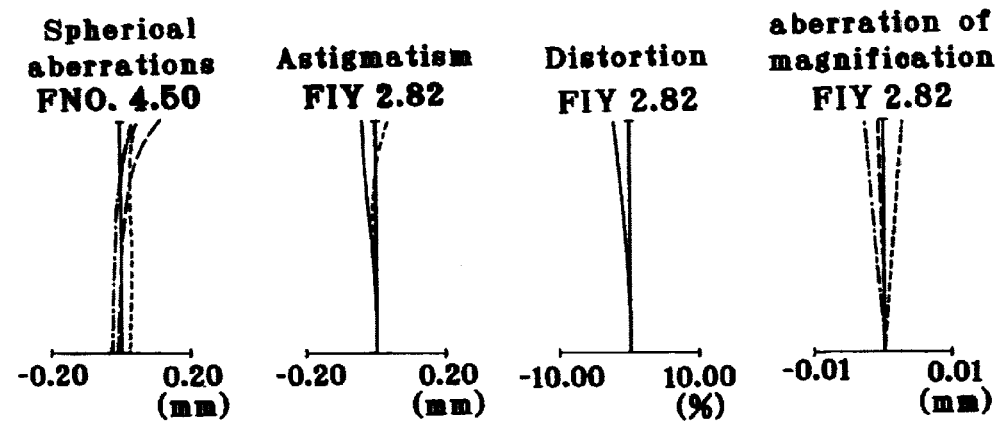
Figure 25A:
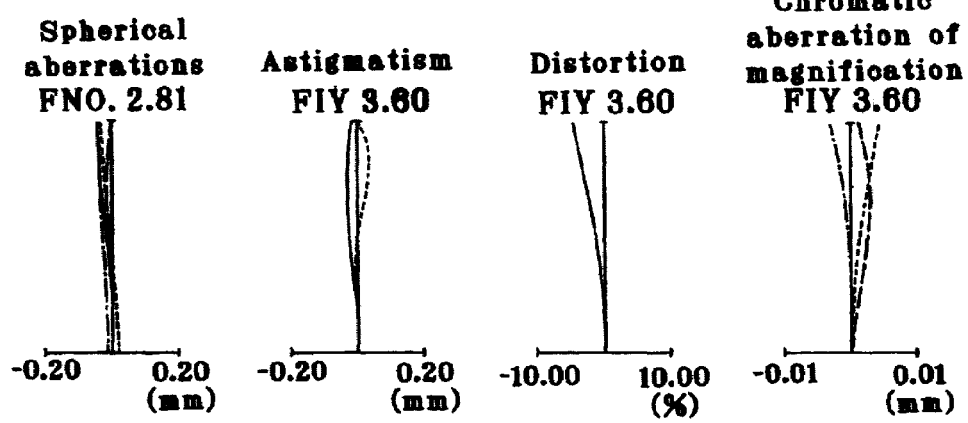
FIGS. 25(a), 25(b) and 25(c) are aberration diagrams for Example 8 upon focused on an object point at infinity.
Figure 25B:
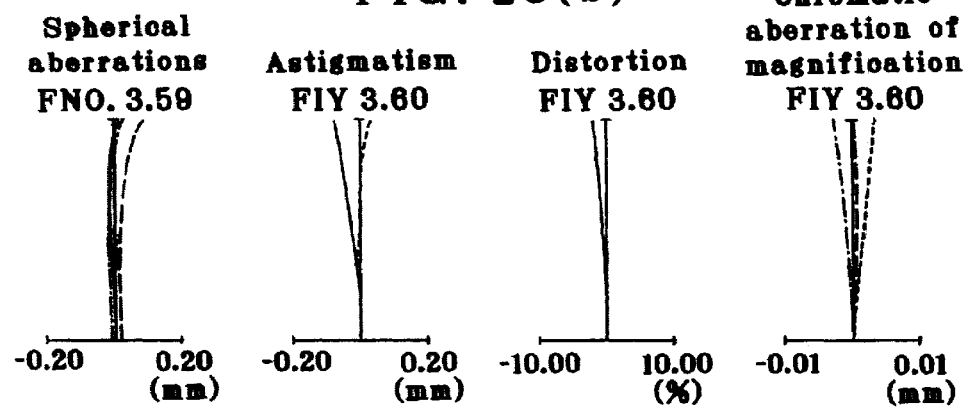
Figure 25C:
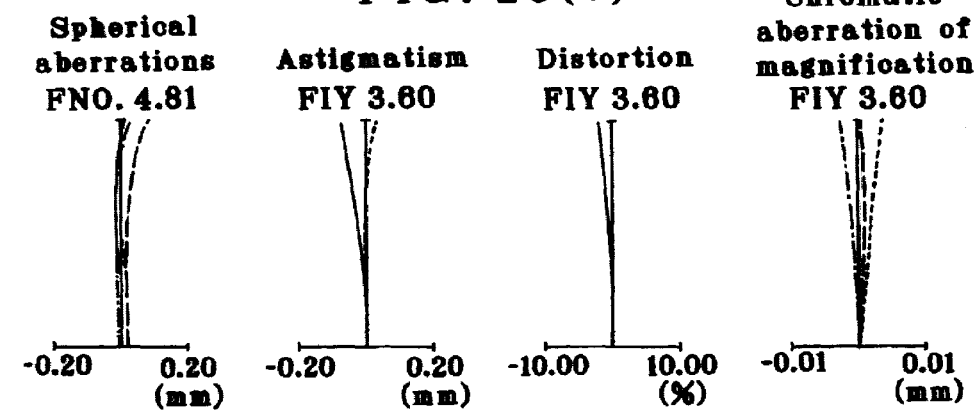
Figure 27A:
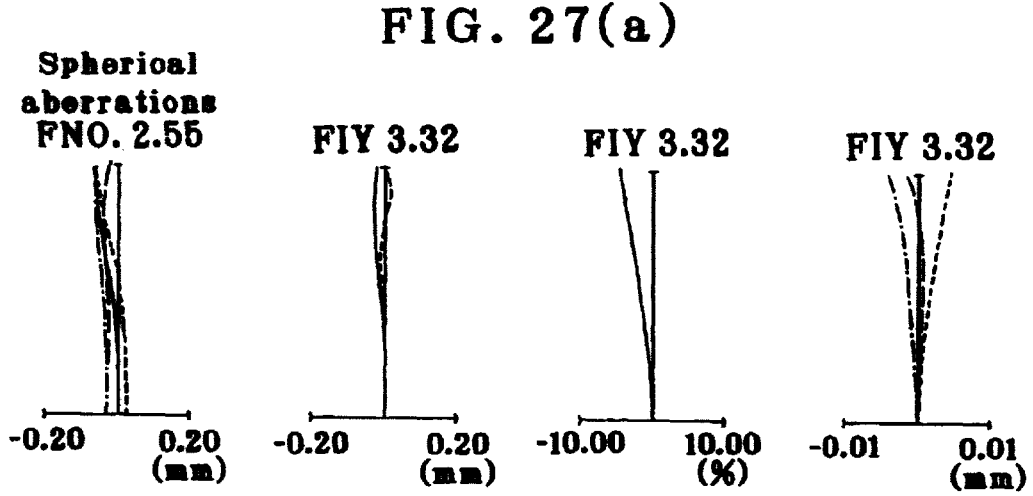
FIGS. 27(a), 27(b) and 27(c) are aberration diagrams for Example 10 upon focused on an object point at infinity.
Figure 27B:
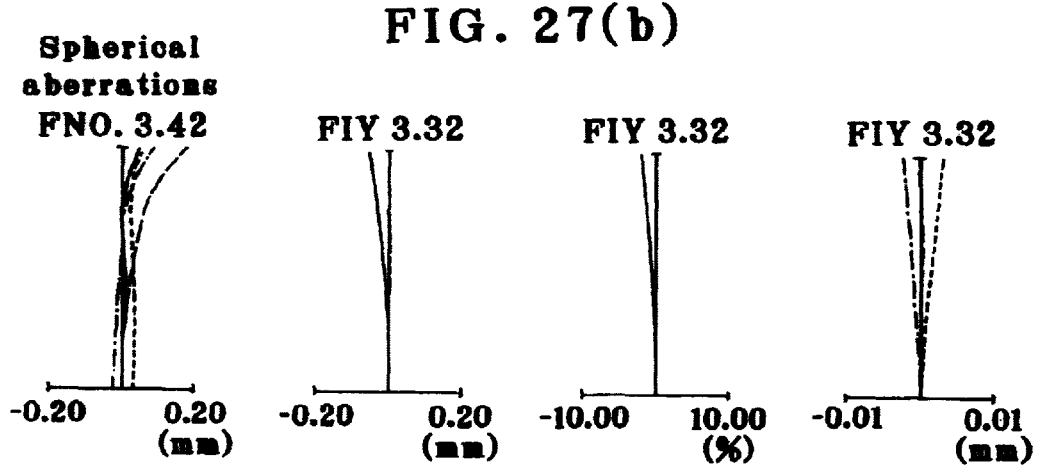
Figure 27C:
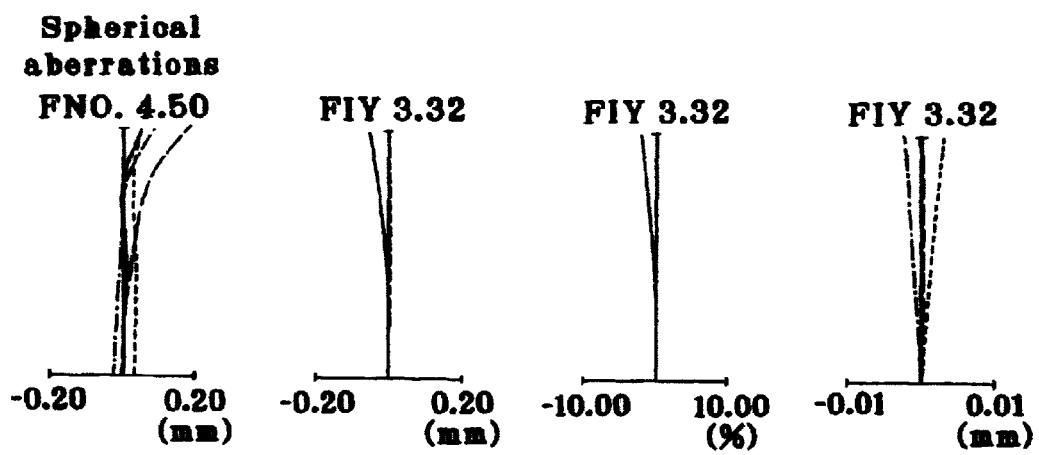
Figure 28A:
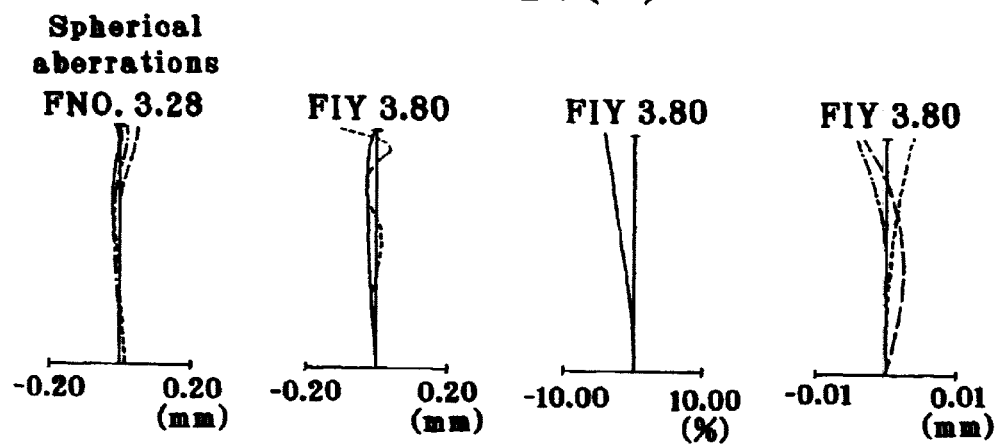
FIGS. 28(a), 28(b) and 28(c) are aberration diagrams for Example 11 upon focused on an object point at infinity.
Figure 28B:
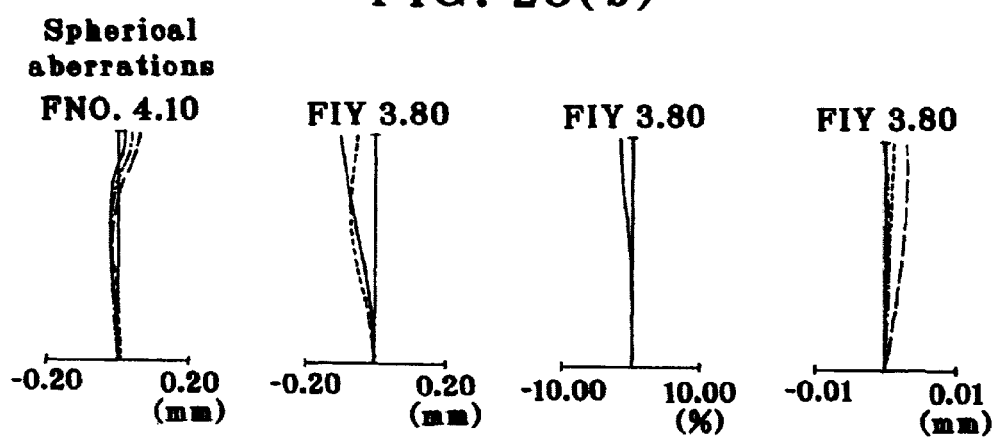
Figure 28C:
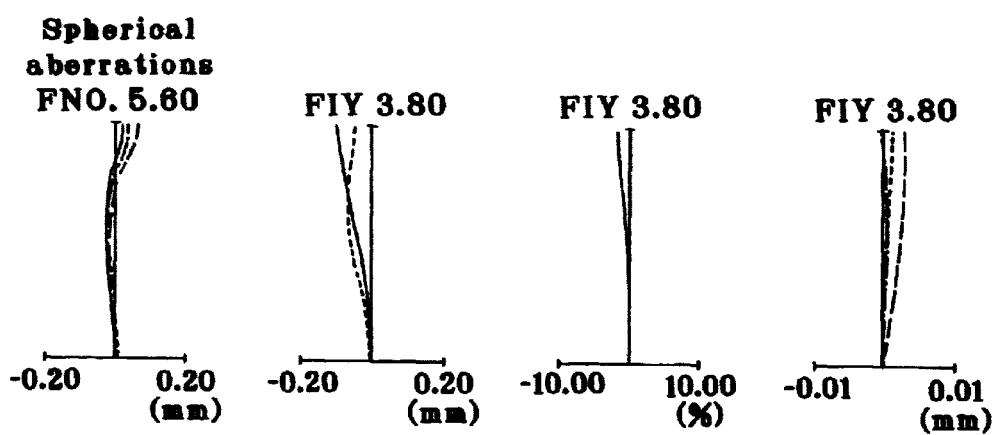
Figure 29A:
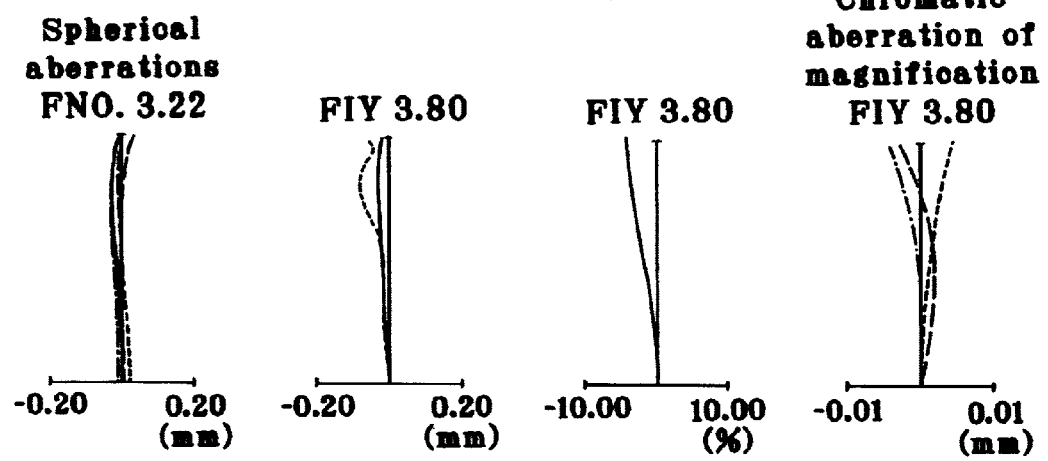
FIGS. 29(a), 29(b) and 29(c) are aberration diagrams for Example 12 upon focused on an object point at infinity.
Figure 29B:
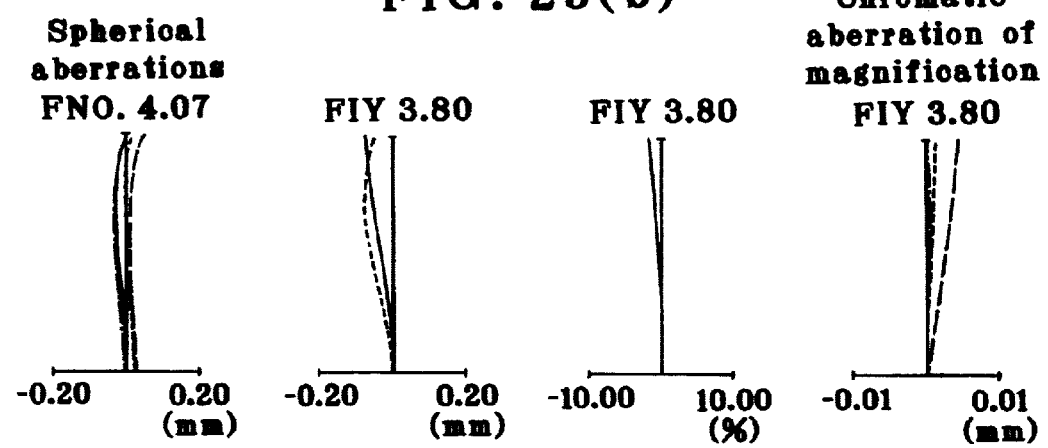
Figure 29C:
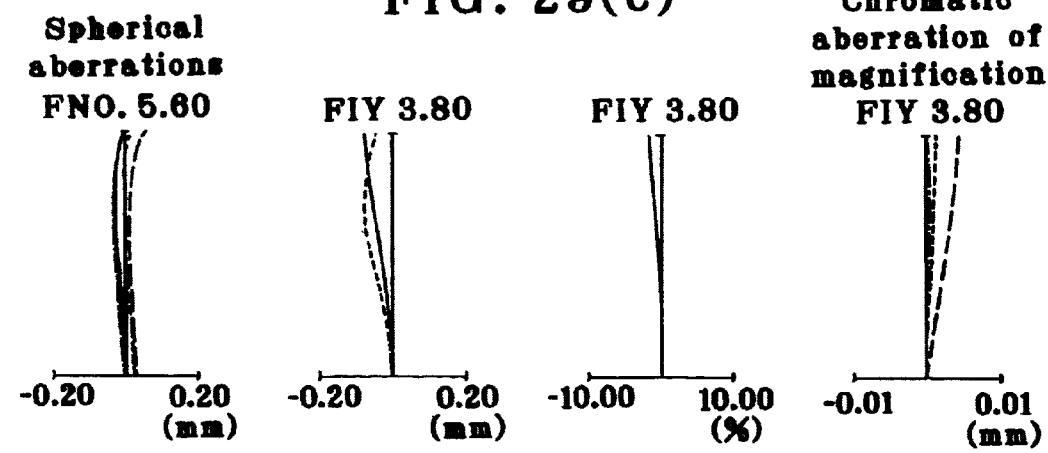
Figure 30A:
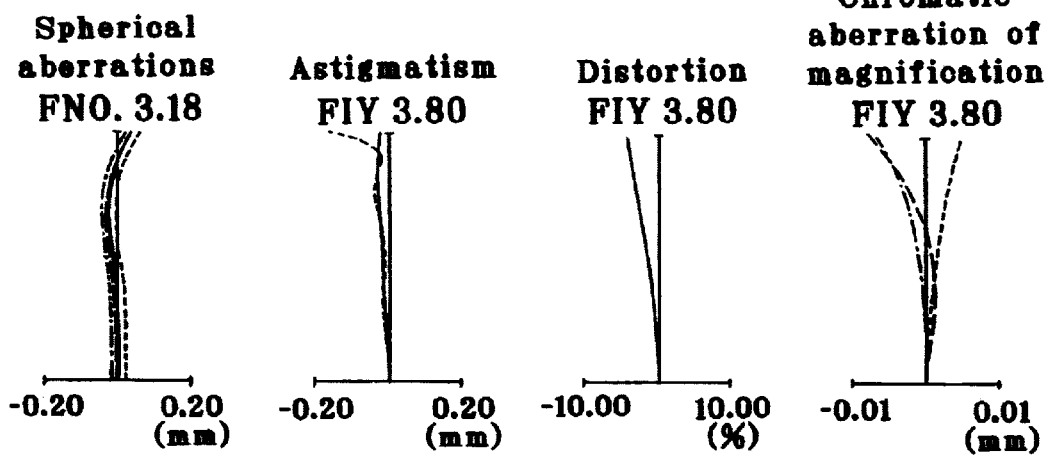
FIGS. 30(a), 30(b) and 30(c) are aberration diagrams for Example 13 upon focused on an object point at infinity.
Figure 30B:
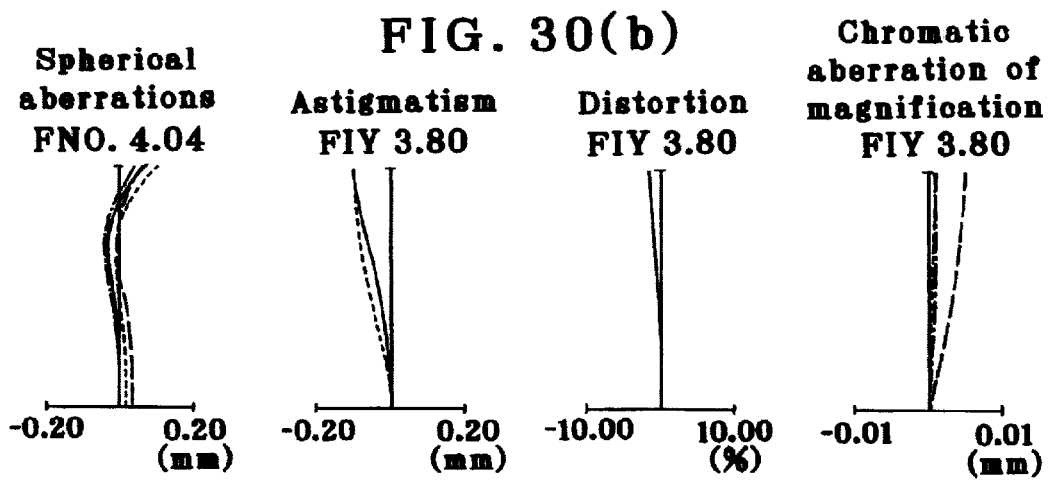
Figure 30C:
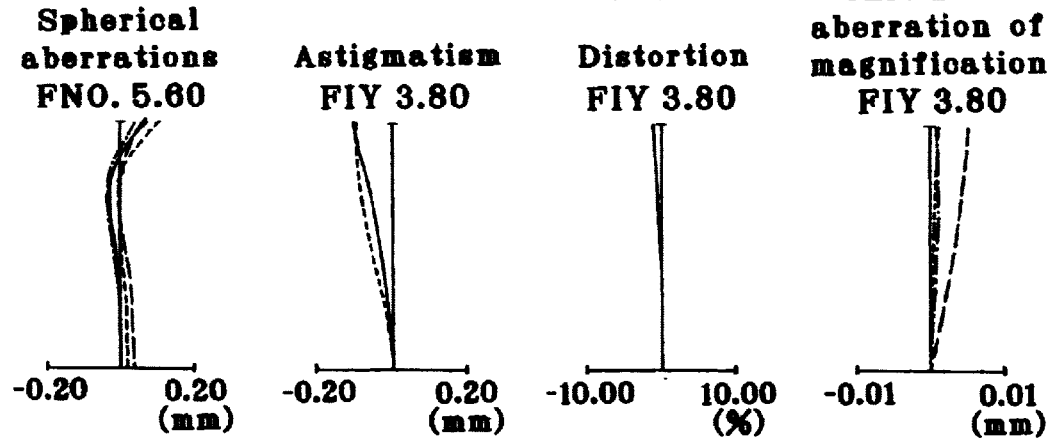
Figure 31A:
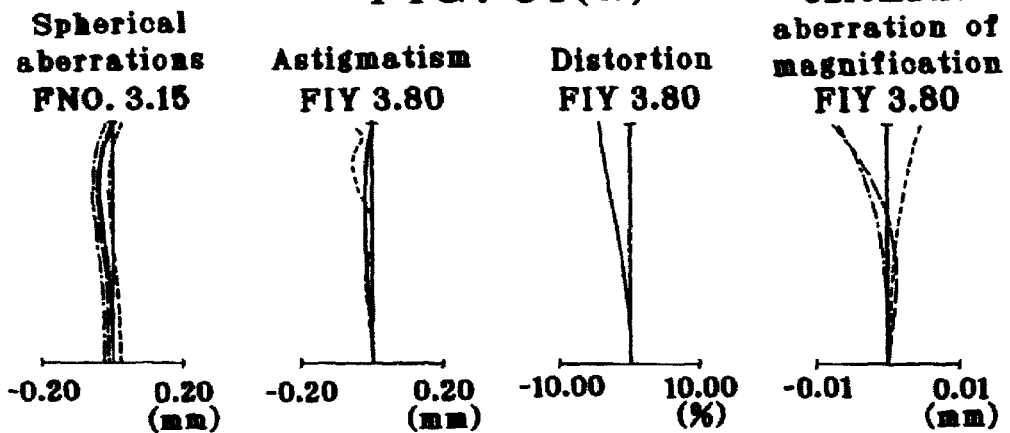
FIGS. 31(a), 31(b) and 31(c) are aberration diagrams for Example 14 upon focused on an object point at infinity.
Figure 31B:
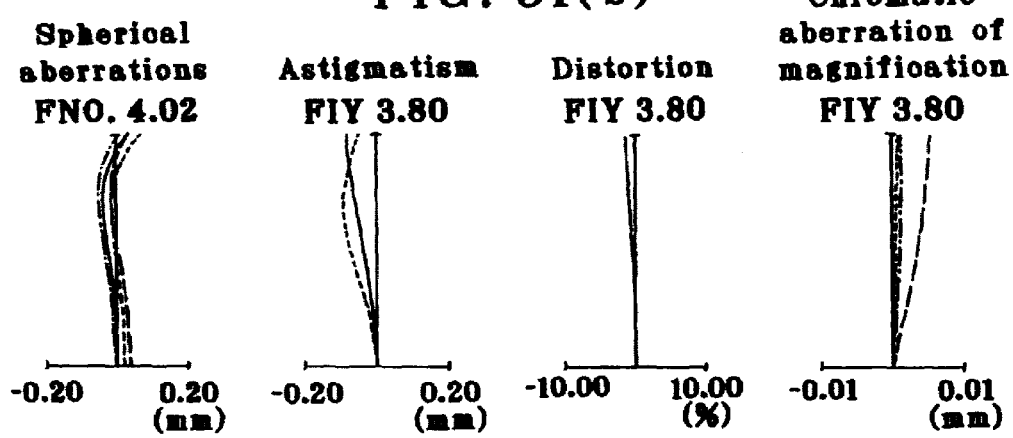
Figure 31C:
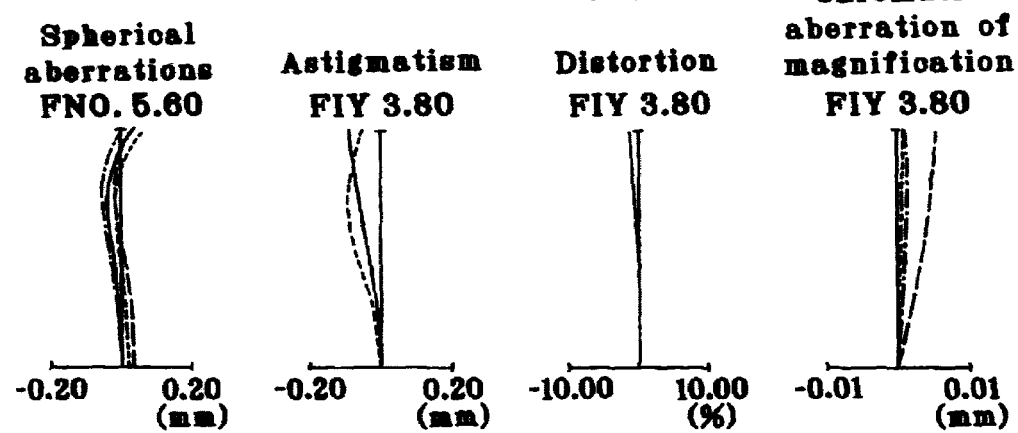

In the embodiment of FIG. 23, plane-parallel plates are used as the cover members 39; however, it is acceptable to use powered lenses.

As can be appreciated from the foregoing explanation, the present invention can provide a zoom lens that is received in a collapsible lens mount with smaller thickness and efficiency, has high magnifications and is excellent in image-formation capability, and enables video cameras or digital cameras to be thoroughly slimmed down.

What we claim is:

1. A zoom lens comprising, in order from an object side thereof, a lens group A having negative refracting power and a lens group B having positive refracting power, in which for zooming at least the lens group A and the lens group B move with a varying spacing between the lens group A and the lens group B, wherein:

the lens group B consists of three meniscus lens elements, each in a convex form on an object side thereof.

2. A zoom lens comprising, in order from an object side thereof, a lens group A having negative refracting power and a lens group B having positive refracting power, in which for zooming at least the lens group A and the lens group B move with a varying spacing between the lens group A and the lens group B, wherein:

the lens group B includes at least one aspheric surface and consists of three lens elements inclusive of a cemented lens component, wherein all refracting surfaces of the cemented lens component are configured to be convex in the same direction, and upon zooming from a wide-angle end to a telephoto end of the zoom lens, the lens group A moves in a convex locus toward an image plane side of the zoom lens.

3. A zoom lens comprising, in order from an object side thereof, a lens group A having negative refracting power and a lens group B having positive refracting power, in which for zooming at least the lens group A and the lens group B move with a varying spacing between the lens group A and the lens group B, wherein:

the lens group B comprises, in order from an object side thereof, a cemented lens component comprising a positive meniscus lens element convex on an object side thereof and a negative meniscus lens element convex on an object side thereof and a positive meniscus single lens component convex on an object side thereof, two components/three lens elements in all.

4. A zoom lens comprising, in order from an object side thereof, a lens group A having negative refracting power and a lens group B having positive refracting power, in which for zooming at least the lens group A and the lens group B move with a varying spacing between the lens group A and the lens group B, wherein:

the lens group B comprises, in order from an object side thereof, a cemented lens component comprises of a positive meniscus lens element convex on an object side thereof and a negative meniscus lens element convex on an object side thereof and a positive single lens component, two components/three lens elements in all, and upon zooming from a wide-angle end to a telephoto end of the zoom lens, the lens group A moves in a convex locus toward an image plane side of the zoom lens.

5. A zoom lens comprising, in order from an object side thereof, a lens group A having negative refracting power and a lens group B having positive refracting power, in which for zooming at least the lens group A and the lens group B move with a varying spacing between the lens group A and the lens group B, wherein:

the lens group B comprises, in order from an object side thereof, a positive meniscus lens element an object side-surface of which is defined by an aspheric surface and which is configured to be convex on an object side thereof, a negative lens element and a positive lens element, wherein the lens group B has a total of three lens elements in all, and upon zooming from a wide-angle end to a telephoto end of the zoom lens, the lens group A moves in a convex locus toward an image plane side of the zoom lens.

6. A zoom lens in which a lens group having refracting power comprises, in order from an object side thereof, a lens group A having negative refracting power and a lens group B having positive refracting power, and for zooming the lens group A and the lens group B move with a varying spacing between the lens group A and the lens group B, wherein:

the zoom lens is a two-group type zoom lens, the lens group B consists of a total of three lens elements inclusive of a cemented lens component in a meniscus form convex on an object side thereof, and upon zooming from a wide-angle end to a telephoto end of the zoom lens, the lens group A moves in a convex locus toward an image plane side of the zoom lens.

7. A zoom lens in which a lens group having refracting power comprises, in order from an object side thereof, a lens group A having negative refracting power and a lens group B having positive refracting power, and for zooming the lens group A and the lens group B move with a varying spacing between the lens group A and the lens group B, wherein:

the zoom lens is a two-group type zoom lens, the lens group B consists of a total of three lens elements inclusive of a cemented lens component, wherein all refracting surfaces of the cemented lens component are configured to be convex in the same direction, and upon zooming from a wide-angle end to a telephoto end of the zoom lens, the lens group A moves in a convex locus toward an image plane side of the zoom lens.

8. A zoom lens comprising in order from an object side thereof, a lens group A having negative refracting power and a lens group B having positive refracting power, and consisting of a total of three lens groups each having refracting power, in which for zooming at least the lens group A and the lens group B move with a varying spacing between the lens group A and the lens group B, wherein:

the zoom lens is a three-group type zoom lens, the lens group B comprises, in order from an object side thereof, a cemented lens component and a double-convex single lens component, and said zoom lens comprises a stop on an object side with respect to an entrance refracting surface of said cemented lens component.

9. A zoom lens comprising in order from an object side thereof, a lens group A having negative refracting power and a lens group B having positive refracting power, and consisting of a total of three lens groups each having refracting power, in which for zooming at least the lens group A and the lens group B move while a plurality of air separations in said three lens groups vary for zooming, wherein:

the zoom lens is a three-group type zoom lens, the lens group B comprises, in order from an object side thereof, a cemented lens component consisting of a positive meniscus lens element configured to be convex on an object side thereof and a negative meniscus lens element configured to be convex on an object side thereof and a positive single lens component, two components/three lens elements in all.

10. A zoom lens comprising in order from an object side thereof, a lens group A having negative refracting power and a lens group B having positive refracting power, and consisting of a total of three lens groups each having refracting power, in which for zooming at least the lens group A and the lens group B move while a plurality of air separation in said three lens groups vary for zooming, wherein:

the lens group B comprises, in order from an object side thereof, a positive meniscus lens element at least an object side-surface of which is defined by an aspheric surface and which is configured to be convex on an object side thereof, a negative lens element and a positive lens element, where the lens group B has a total of three lens elements and said zoom lens comprises a stop on an object side with respect to an entrance refracting surface positive meniscus lens element.

11. A zoom lens, wherein a lens group that moves upon zooming includes a cemented lens component having at least two cemented surfaces, wherein said at least two cemented surfaces are convex in the same direction and cemented together on an optical axis, and said cemented lens component comes in contact with a variable separation.

12. The zoom lens according to claim 11, wherein said cemented lens component is a cemented triplet lens component.

13. A zoom lens, in which a lens group that moves upon zooming includes a cemented lens component having at least three lens elements that are cemented one upon another, wherein opposite surfaces in said at least three lens elements are convex in the same direction and cemented together on an optical axis, and said cemented lens components comes in contact with a variable separation, and wherein air contact surfaces of the cemented lens component are each defined by an aspheric surface.

14. The zoom lens according to claim 13, wherein said cemented lens component is a cemented triplet lens component.

15. A zoom lens, wherein a lens group that moves upon zooming includes a cemented lens component comprising, in order from an object side thereof, a positive lens element, a negative lens element and a positive lens element, wherein said positive lens element, said negative lens element and said positive lens element are cemented one upon another on an optical axis, said cemented lens component comes in contact with a variable separation.

16. The zoom lens according to claim 15, wherein said cemented lens component is a cemented triplet lens component.

17. A zoom lens comprising, in order from an object side, a lens group A having negative refracting power and a lens group B having positive refracting power, in which for zooming at least the lens group A and the lens group B move, wherein:
the lens group B includes a cemented lens component in which at least three lens elements are cemented one upon another, and
said at least three elements element are cemented one upon another on an optical axis.

18. The zoom lens according to claim 17, wherein said cemented lens component is a cemented triplet lens component.

19. An electronic imaging system, comprising a zoom lens as recited in any one of claims 1 to 17 and an electronic image pickup device located on an image side of the zoom lens.

20. A zoom lens, wherein a lens group that moves upon zooming includes a cemented lens component in which at least three lens elements that are cemented one upon another wherein a plurality of cementing surfaces in the cemented lens component is each coated to reduce reflection thereat.

21. A zoom lens, in which a lens group that moves upon zooming includes a cemented lens component in which at least three lens elements that are cemented one upon another, wherein air contact surfaces of the cemented lens component are each defined by an aspheric surface, and wherein a plurality of cementing surfaces in the cemented lens component is each coated to reduce reflection thereat.

22. A zoom lens, wherein a lens group that moves upon zooming includes a cemented lens component consisting of, in order from an object side thereof, a positive lens element, a negative lens element and a positive lens element, wherein a plurality of cementing surfaces in the cemented lens component is each coated to reduce reflection thereat.

23. A zoom lens comprising, in order from an object side, a lens group A having negative refracting power and a lens group B having positive refracting power, in which for zooming at least the lens group A and the lens group B moves, wherein:
the lens group B includes a cemented lens component in which at least three lens elements are cemented one upon another, and
a plurality of cementing surfaces in the cemented lens component is each coated to reduce reflection thereat.

24. A zoom lens, wherein a lens group that moves upon zooming includes at least three lens elements that are cemented one upon another wherein a plurality of cementing surfaces in the cemented lens component is each coated with a coating formed of a multilayer film to reduce reflection thereat.

25. A zoom lens, in which a lens group that moves upon zooming includes at least three lens elements that are cemented one upon another, wherein air contact surfaces of the cemented lens component are each defined by an aspheric surface, and wherein a plurality of cementing surfaces in the cemented lens component is each coated with a coating formed of a multilayer film to reduce reflection thereat.

26. A zoom lens, wherein a lens group that moves upon zooming includes a cemented lens component consisting of, in order from an object side thereof, a positive lens element, a negative lens element and a positive lens element, wherein a plurality of cementing surfaces in the cemented lens component is each coated with a coating formed of a multilayer film to reduce reflection thereat.

27. A zoom lens comprising, in order from an object side, a lens group A having negative refracting power and a lens group B having positive refracting power, in which for zooming at least the lens group A and the lens group B moves, wherein:
the lens group B includes a cemented lens component in which at least three lens elements are cemented one upon another, and
a plurality of cementing surfaces in the cemented lens component is each coated with a coating formed of a multilayer film to reduce reflection thereat.

28. A zoom lens, wherein a lens group that moves upon zooming includes a cemented lens component comprising, in order from an object side thereof, a positive lens element, a negative lens element and a positive lens element, wherein said positive lens element, said negative lens element and said positive lens element are cemented one upon another on an optical axis, said cemented lens component comes in contact with a variable separation, and said zoom lens comprises a stop on an object side with respect to an entrance refracting surface of said cemented lens component.

29. The zoom lens according to claim 28, wherein the zoom lens is a three-group type zoom lens.

30. A zoom lens comprising, in order from an object side, a lens group A having negative refracting power and a lens group B having positive refracting power, in which for zooming at least the lens group A and the lens group B move, wherein:
the lens group B includes a cemented lens component in which at least three lens elements are cemented one upon another, and
said at least three elements element are cemented one upon another on an optical axis, and said zoom lens comprises a stop on an object side with respect to an entrance refracting surface of said cemented lens component.

31. The zoom lens according to claim 30, wherein the zoom lens is a three-group type zoom lens.

32. The zoom lens according to claim 30, wherein the lens group A comprises two lens elements.

33. The zoom lens according to claim 32 further comprising a lens group comprising a positive lens element located on an image side of the lens group B.

34. The zoom lens according to claim 32, wherein the lens group A consists of, in order from an object side thereof, a negative lens element and a positive lens element, two lens elements in all.

35. A zoom lens comprising, in order from an object side thereof, a first lens group having negative refracting power, a second lens group having positive refracting power and a third lens group having positive refracting power, wherein:
the first lens group consists of two lens elements, the second lens group consists of a cemented lens component consisting of, in order from an object side thereof, a positive lens element, a negative lens element and a positive lens element, said positive lens element, said negative lens element and said positive lens element being cemented one upon another on an optical axis, and the third lens group consists of one lens element.

36. An electronic imaging system, comprising a zoom lens as recited in any one of claims 20 to 27, 28 to 35 and an electronic image pickup device located on an image side of the zoom lens.

* * * * *